(12) United States Patent
Ceylan et al.

(10) Patent No.: US 11,753,337 B2
(45) Date of Patent: Sep. 12, 2023

(54) ELECTRICALLY CONDUCTIVE CONCRETE COMPOSITION AND SYSTEM DESIGN FOR RESISTIVE HEATING OF PAVEMENTS WITH LOW VOLUME FRACTIONS OF CARBON MICROFIBER

(71) Applicant: Iowa State University Research Foundation, Inc., Ames, IA (US)

(72) Inventors: Halil Ceylan, Ames, IA (US); Alireza Sassani, Ames, IA (US); Hesham Abdualla, Champaign, IL (US); Sunghwan Kim, Ames, IA (US); Ali Arabzadeh, Ames, IA (US); Peter C. Taylor, Ames, IA (US); Kasthurirangan Gopalakrishnan, Minneapolis, MN (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 799 days.

(21) Appl. No.: 16/705,443

(22) Filed: Dec. 6, 2019

(65) Prior Publication Data
US 2020/0262753 A1 Aug. 20, 2020

Related U.S. Application Data

(60) Provisional application No. 62/840,989, filed on Apr. 30, 2019, provisional application No. 62/805,518, filed on Feb. 14, 2019.

(51) Int. Cl.
| | |
|---|---|
| *C04B 14/38* | (2006.01) |
| *C04B 28/04* | (2006.01) |
| *C04B 22/08* | (2006.01) |
| *C04B 40/00* | (2006.01) |
| *C04B 24/38* | (2006.01) |
| *C04B 111/94* | (2006.01) |
| *C04B 103/40* | (2006.01) |

(52) U.S. Cl.
CPC .......... *C04B 14/386* (2013.01); *C04B 22/085* (2013.01); *C04B 24/383* (2013.01); *C04B 28/04* (2013.01); *C04B 40/0042* (2013.01); *C04B 2103/408* (2013.01); *C04B 2111/94* (2013.01)

(58) Field of Classification Search
CPC ... C04B 14/386; C04B 22/085; C04B 24/383; C04B 28/04; C04B 40/0042; C04B 2103/408; C04B 2111/94; C04B 2111/00612; Y02W 30/91
See application file for complete search history.

(56) References Cited

U.S. PATENT DOCUMENTS

| | | | |
|---|---|---|---|
| 3,166,518 A | 1/1965 | Barnard | |
| 3,573,427 A | 4/1971 | Minsk | |
| 3,962,142 A | 6/1976 | Freeman et al. | |
| 4,564,745 A | 1/1986 | Deschenes | |
| 4,571,860 A | 2/1986 | Long | |
| 5,032,181 A | 7/1991 | Chung | |
| 5,346,547 A | 9/1994 | McCormack | |
| 5,447,564 A | 9/1995 | Xie et al. | |
| 5,590,832 A | 1/1997 | Fiedrich | |
| 5,707,171 A | 1/1998 | Zaleski et al. | |
| 5,759,259 A * | 6/1998 | Sychra ................... | C04B 24/34 106/659 |
| 5,908,584 A | 6/1999 | Bennett | |
| 6,193,793 B1 | 2/2001 | Long et al. | |
| 6,461,424 B1 | 10/2002 | Ramme et al. | |
| 6,503,318 B2 | 1/2003 | Pye et al. | |
| 6,821,336 B1 | 11/2004 | Ramme et al. | |
| 6,825,444 B1 | 11/2004 | Tuan et al. | |
| 7,578,881 B2 | 8/2009 | Ramme | |
| 9,681,592 B2 | 6/2017 | Tuan et al. | |
| 9,775,196 B2 | 9/2017 | Song et al. | |
| 2004/0099982 A1 | 5/2004 | Sirola et al. | |
| 2005/0013661 A1 | 1/2005 | Saito et al. | |
| 2006/0231966 A1 | 10/2006 | Tsung | |
| 2007/0240620 A1 | 10/2007 | Ramme | |
| 2007/0242620 A1 | 10/2007 | Ramme | |
| 2017/0260747 A1 | 9/2017 | Gentry et al. | |
| 2021/0024418 A1 | 1/2021 | Ceylan et al. | |

FOREIGN PATENT DOCUMENTS

| | | | | |
|---|---|---|---|---|
| CN | 102432239 A | * | 5/2012 | |
| CN | 108358556 A | * | 8/2018 | ............. C04B 28/04 |
| DE | 3420729 A1 | | 12/1984 | |
| JP | H06101206 A | | 4/1994 | |
| WO | WO-9014321 A1 | * | 11/1990 | ............. C04B 14/06 |
| WO | WO-2006091185 A1 | * | 8/2006 | ........... C04B 14/386 |
| WO | 2010/059169 A1 | | 5/2010 | |

OTHER PUBLICATIONS

Ivorra et al, "Effect of silica fume particle size on mechanical properties of short carbon fiber reinforced concrete", Materials and Design 31 (2010) 1553-1558 (Year: 2010).*

(Continued)

*Primary Examiner* — Anthony J Green
(74) *Attorney, Agent, or Firm* — Troutman Pepper Hamilton Sanders LLP (Rochester)

(57) ABSTRACT

The present application relates to a concrete pre-mix composition comprising a cementitious material and a plurality of conductive carbon microfibers mixed with said cementitious material, where said conductive carbon microfibers are present in the concrete pre-mix composition in an amount such that, when said concrete pre-mix composition is hydrated to form concrete and cured, the conductive carbon microfibers are dispersed in the cured concrete in an amount of 0.75% to 2.00% of total mass of the concrete. The present application further relates to a concrete composition, a method of producing an electrically conductive concrete composition, an electrically conductive cured concrete form, and a system for heating pavement.

10 Claims, 31 Drawing Sheets

(56) References Cited

OTHER PUBLICATIONS

Prof. B. V. Venkatarama Reddy, "Stability of Manufactured Sand (M-Sand) As Fine Aggregate In Mortars and Concrete", CSIC Project: CP 6597/0505/11-330. (Year: 2012).*
Notani et al., "Effect of Carbon-Fiber Properties on Volumetries and Ohmic Heating of Electrically Conductive Asphalt Concrete," J. Mater. Civ. Eng. 31(9):04019200 (2019).
Arabzadeh, "Nano-Engineered Heated Pavements," Thesis (Jul. 31, 2019).
Sassani et al., "Carbon Fiber-Based Electrically Conductive Concrete for Salt-Free Deicing of Pavements," Journal of Cleaner Production 203:799-809 (2018).
Anand et al., "Economic Assessment of Heated Pavements for the Minneapolis—St. Paul International Airport," International Conference on Transportation and Development p. 128-139 (2016).
Anand et al., "Cost Comparison of Alternative Airfield Snow Removal Methodologies," 2014 FAA Worldwide Airport Technology Transfer Conference, Galloway, New Jersey, Aug. 5-7, 2014.
Dean, A. "1st Full-Scale Heated Pavement Slabs Installed at American International Airport," International Society for Concrete Pavements, Mar. 30, 2017.
Abdualla et al., "Design and Construction of the World's First Full-Scale Electrically Conductive Concrete Heated Airport Pavement System at a U.S. Airport," Transportation Research Record 2672(23):82-94 (2018).
Ceylan et al., "Project 01 Heated Airport Pavements," PEGASAS Quarterly Meeting, Ames, Iowa, Jul. 25-26, 2013.
Arabzadeh et al., "Electrically-Conductive Asphalt Mastic: Temperature Dependence and Heating Efficiency," Materials and Design 157:303-313 (2018).
Arabzadeh et al., "Investigating the Heat Generation Efficiency of Electrically-Conductive Asphalt Mastic Using Infrared Thermal Imaging," International Conference on Transportation and Development 206-214 (2018).
Liu et al., "Induction Healing of Asphalt Mastic and Porous Asphalt Concrete," Construction and Building Materials 25:3746-3752 (2011).
Liu et al., "Self-Monitoring Application of Conductive Asphalt Concrete Under Indirect Tensile Deformation," Case Studies in Construction Materials 3:70-77 (2015).
Pan et al., "Conductive Asphalt Concrete: A Review on Structure Design, Performance, and Practical Applications," Journal of Intelligent Material Systems and Structures 26(7):755-769 (2015).
Liu et al., "Study on the Graphite and Carbon Fiber Modified Asphalt Concrete," Construction and Building Materials 25:1807-1811 (2011).
Wu et al., "Analysis of Characteristics of Elecli ically Conductive Asphalt Concrete Prepared by Multiplex Conductive Materials," J. Mater. Civ. Eng. 25(7):871-879 (2013).
Wu et al., "Investigation of the Conductivity of Asphalt Concrete Containing Conductive Fillers," Carbon 43:1358-1363 (2005).
Arabzadeh et al., "Mitigating the Winter Maintenance Problems of Airports Through Optimizing the Resistive Heating Capability of Electrically Conductive Asphalt Concrete," Transportation Research Board 97thAnnual Meeting, AFD60 subcommittee meeting, Jan. 8, 2018, Washington DC, USA.
Arabzadeh et al., "Comparison Between Cement Paste and Asphalt Mastic Modified by Carbonaceous Materials: Electrical and Thermal Properties," Construction and Building Materials 213:121-130 (2019).
Liu et al., "Self-Monitoring Application of Asphalt Concrete Containing Graphite and Carbon Fibers," Journal of Wuhan University of Technology—Mater. Sci. Ed. 23(2):268-271 (2008).
Sadati et al., "Energy and Thermal Performance Evaluation of an Automated Snow and Ice Removal System at Airports Using Numerical Modeling and Field Measurements," Sustainable Cities and Society 43:238-250 (2018).
Sassani et al., "Factorial Study on Electrically Conductive Concrete Mix Design for Heated Pavement Systems," 96th Annual Meeting of Transportation Research Board, Transportation Research Board, NRC, TRB Paper 17-05347:1-16, Washington, D.C., Jan. 8-12 (2017).
Abdualla et al., "Development of A Finite Element Model for Electrically Conductive Concrete Heated Pavements," 96th Annual Meeting of Transportation Research Board, Transportation Research Board, NRC, TRB Paper 17-05389:1-13, Washington, D.C., Jan. 8-12 (2017).
Abdualla et al., "System Requirements for Electrically Conductive Concrete Heated Pavements," Transportation Research Record: Journal of the Transportation Research Board, No. 2569, pp. 70-79, Transportation Research Board, Washington, D.C. (2016).
Gopalakrishnan et al., "Self-Heating Electrically Conductive Concrete for Pavement Deicing: A Revisit," 94rd Annual Meeting of the Transportation Research Board, Transportation Research Board, NRC, TRB Paper 15-4764:1-15, Washington, D.C., Jan. 11-15 (2015).
Abdullah et al., "Electrically Heated Concrete Pavement System at Des Moines International Airport," Poster presentation, 2017 Mid-Continent Transportation Research Symposium, Ames, Iowa, Aug. 16-17, 2017.
Sadati et al., "Numerical Modeling of Electrically Conductive Concrete," Poster presentation, FAA PEGASAS COE 5th Annual Meeting, Texas A&M University, College Station, Texas, May 23-25, 2017.
Abdualla et al., "Full-Scale Demonstration of Electrically Conductive Concrete at Des Moines International Airport," Poster presentation, FAA PEGASAS COE 5th Annual Meeting, Texas A&M University, College Station, Texas, May 23-25, 2017.
Sassani et al., "Electrically Conductive Concrete (ECON) for Application in Airport Heated Pavement Systems," Poster presentation, 11th International Conference on Concrete Pavements (ICCP11), San Antonio, Texas, Aug. 28-31, 2016.
Abdualla et al., "Electrically Conductive Concrete Based Heated Pavements: Design, Construction, and Evaluation," Poster presentation, FAA PEGASAS COE 4th Annual Meeting, Iowa State University, Ames, Iowa, Jun. 7-9, 2016.
Sassani et al., "Optimization of Electrically Conductive Concrete (ECON) for Heated Pavement Systems," Poster presentation, FAA PEGASAS COE 4th Annual Meeting, Iowa State University, Ames, Iowa, Jun. 7-9, 2016.
Abdualla et al., "System Level Design and Performance Evaluation of Electrical Heated Pavement Systems," Poster presentation, 5th Annual Civil, Construction and Environmental Engineering (CCEE) Graduate Research Showcase and Poster Competition, Iowa State University, Ames, Iowa, Dec. 3, 2015.
Sassani et al., "Application of Nano-Engineered Materials in Heated Concrete Pavement Systems," Poster presentation, 5th Annual Civil, Construction and Environmental Engineering (CCEE) Graduate Research Showcase and Poster Competition, Iowa State University, Ames, Iowa, Dec. 3, 2015.
Sassani et al., "Optimization of Electrically Conductive Concrete (ECC) Mix Design for Self-Heating Pavement Systems," Mid-Continent Transportation Research Symposium, ISU, Ames, Iowa, Aug. 19-20, 2015.
Abdualla et al., "Design and Construction Requirements for Electrically Heated Pavement Systems," Poster presentation, Mid-Continent Transportation Research Symposium, ISU, Ames, Iowa, Aug. 19-20, 2015.
Abdalla et al., "Advanced Construction Techniques for Heated Pavement Systems," Poster presentation, 3rd Annual Meeting, Purdue University, West Lafayette, Indiana, May 27-28, 2015.
Sassani et al., "Use of Nano-Engineered Materials for Functional Enhancements of Pavement Systems," Poster presentation, 3rd Annual Meeting, Purdue University, West Lafayette, Indiana, May 27-28, 2015.
Sassani et al., "A Functional Electrically Conductive Concrete (ECON) for Heated Pavement Systems," Poster presentation, 3rd Annual Meeting, Purdue University, West Lafayette, Indiana, May 27-28, 2015.
Shen et al., "Sustainability Assessment of Heated Pavements: Operations for Snow Removal Applications," Poster presentation, 3rd Annual Meeting, Purdue University, West Lafayette, Indiana, May 27-28, 2015.

(56) References Cited

OTHER PUBLICATIONS

Anand et al., "Energy and Financial Viability of Heated Airport Pavements," Poster presentation, 3rd Annual Meeting, Purdue University, West Lafayette, Indiana, May 27-28, 2015.
Sassani et al., "Mix Design Development of Electrically Conductive Concrete," Poster presentation, 4th Annual Civil, Construction and Environmental Engineering (CCEE) Graduate Research Showcase and Poster Competition, Iowa State University, Ames, Iowa, Dec. 2, 2014.
Abdualla et al., "Advanced Construction Techniques for Heated Pavements," Poster presentation, 4th Annual Civil, Construction and Environmental Engineering (CCEE) Graduate Research Showcase and Poster Competition, Iowa State University, Ames, Iowa, Dec. 2, 2014.
Yang et al., "Conductive Concrete for Heated Airport Pavement Systems," Poster presentation, 2nd Annual Meeting of PEGASAS, Georgia Institute of Technology, Atlanta, Georgia, Jun. 3-5, 2014.
Shen et al., "Greenhouse Gas Emission Analysis for Operation of Geothermal Heated Pavement Systems," Poster presentation, 2nd Annual Meeting of PEGASAS, Georgia Institute of Technology, Atlanta, Georgia, Jun. 3-5, 2014.
Anand et al., "Economic Analysis Framework of Heated Airport Pavement Systems," Poster presentation, 2nd Annual Meeting of PEGASAS, Georgia Institute of Technology, Atlanta, Georgia, Jun. 3-5, 2014.
Shen et al. "Heated Pavement System Operations: Analysis of Carbon Emissions," Poster presentation, 2014 Iowa State University Symposium on Sustainability: Celebrating Our STARS, Charting Our Course, Ames, Iowa, Feb. 24-25, 2014.
Cord et al. "Achieving Ice-Free Pavement Surfaces Through the Use of Sustainable Technologies," Poster presentation, 2014 Iowa State University Symposium on Sustainability: Celebrating Our STARS, Charting Our Course, Ames, Iowa, Feb. 24-25, 2014.
Theh et al., "Electrical Safety of Electrically Conductive Concrete at Des Moines International Airport," Poster presentation, FAA PEGASAS COE 6th Annual Meeting, Purdue University, West Lafayette, Indiana May 22-24, 2018.
Ceylan et al., "Snow and Ice Preventive Pavement Systems: PEGASAS FAA COE Project No. 1 Heated Airport Pavements," Purdue Road School Transportation Conference and Expo, Mar. 10-12, 2015.
Ceylan, H., "PEGASAS FAA COE Project 1: Heated Airport Pavements", 2015 PEGASAS Annual Meeting, May 28, 2015.
Abdualla et al., "Development of Construction Techniques for Electrically Conductive Heated Concrete Pavements," 98th Annual meeting of Transportation Research Board, Transportation Research Board, NRC, Paper No. 19-01184; 1-7, Washington, D.C., Jan. 13-17, 2019.
Abdualla et al., "Hydronic Heated Pavement System Using Precast Concrete Pavement for Airport Applications," International Conference on Transportation and Development 2018, Pittsburgh, Pennsylvania, Jul. 15-18, p. 16-24 (2018).
Abdualla et al., "Electrically Conductive Concrete Heated Pavement System Using Two-Lift Construction Technology," 13th International Symposium on Concrete Roads, Berlin, Germany, Jun. 19-22, 2018.
Ceylan, H., "PEGASAS FAA COE Project No. 1: Heated Airport Pavements," PEGASAS Annual Meeting, Texas A&M University, May 23-25, 2017.
Ceylan, H., "PEGASAS FAA COE Project No. 1: Heated Airport Pavements," PEGASAS Annual Meeting, Iowa State University, Jun. 7-9, 2016.
Ceylan, H., "Heated Pavements," 2015 Iowa Better Concrete Conference, Iowa State University, Ames, IA, Nov. 12, 2015.
Ceylan, H. "First Large Scale Demonstration Project Electrically Conductive Concrete Heated Airport Pavement System at Des Moines International Airport: Design, Construction and Performance," 2017 Better Concrete Conference, Iowa State University, Ames, Iowa, Nov. 9, 2017.
Ceylan, H. "PEGASAS FAA COE Project No. 1: Heated Airport Pavements," 2014 PEGASAS Annual Meeting, Jun. 4, 2014.
Ceylan et al., "PEGASAS FAA COE Project No. 1: Heated Airport Pavements," Site Visit by Dave Atwood (Program Lead, NextGen Alternative Fuels for General Aviation), Iowa State University, Ames, Iowa, Nov. 25-26, 2013.
Ceylan, H. "PEGASAS: FAA COE Project 1: Heated Airport Pavements," PEGASAS: FAA COE 1st Annual Meeting, Ohio State University, Columbus, Ohio, Sep. 16-19, 2013.
Ceylan et al., "Heated Transportation Infrastructure: Prevention of Ice Formation on Paved Surfaces," 2013 Mid-Continent Transportation Research Symposium, Ames, Iowa, Aug. 15-16, 2013.
Ceylan et al., "Hybrid Heated Airport Pavement System," ISU PEGASAS site visit, Ames, Iowa, Mar. 22, 2013.
Sassani, A. "Smart Materials for Heated Concrete Pavement Systems," Thesis (2018).
Anand et al., "Energy and Financial Viability of Hydronic Heated Pavement Systems," DOT/FAA/TC-17/47, Federal Aviation Administration (2017).
Shen et al., "Sustainability Assessment of Alternative Snow-Removal Methods for Airport Apron Paved Surfaces," DOT/FAA/TC-17/34, Federal Aviation Administration (2017).
Sassani et al., "Designing and Proportioning Electrically Conductive Concrete for Des Moines International Airport Heated Pavement System," 97th Annual meeting of Transportation Research Board, Transportation Research Board, NRC, Washington, D.C., Jan. 7-11, 2018.
Vigar, L., "FAA Grant Funds Research for Heated Airport Pavements," Iowa State Daily, Oct. 9, 2013.
Rantala, J., "Researchers Work to Eliminate the Snow Shovel," KCCI 8 News, Mar. 4, 2015.
"Iowa State Researchers Study Heated Pavement as Possible Solution to Flight Delays," The Gazette, Mar. 4, 2015.
Rantala, J., "See How New Melting Technologies Work," KCCI 8 News, Mar. 3, 2015.
"Iowa State Engineers Developing Pavement Technologies to Clear Snow and Ice from Runways," Iowa State University News Service, Mar. 2, 2015.
Iowa State University, "Electrically Conductive Concrete to Clear Snow and Ice From Runways," ScienceDaily, Mar. 2, 2015.
Abdualla, "Design, Construction, and Performance of Heated Concrete Pavements System," Thesis, May 2018.
Yehia et al., "Thin Conductive Concrete Overlay for Bridge Deck Deicing and Anti-Icing," Transp. Res. Rec.1698:45-53 (2000).
Yehia et al., "Airfield Pavement Deicing with Conductive Concrete Overlay," Civil Engineering Faculty Proceedings & Presentations. 2 (2002).
Chang et al., "Improvement of Electrical Conductivity in Carbon Fiber-Concrete Composites Using Self Consolidating Technology," Earth Sp. 2010 Eng. Sci. Constr. Oper. Challenging Environ. ASCE 3553-3558 (2010).
Sun et al., "Deicing Concrete Pavement Containing Carbon Black/Carbon Fiber Conductive Lightweight Concrete Composites," ICTIS 2011 Multimodal Approach to Sustain. Transp. Syst.Dev. Information, Technol. Implement., 662-668 (2011).
Chen et al., "Performances of Electrically Conductive Concrete with Layered Stainless Steel Fibers," Sustain. Constr. Mater. 163-171 (2012).
Won et al.,"Thermal Characteristics of a Conductive Cement-Based Composite for a Snow-Melting Heated Pavement System," Compos. Struct. 118:106-111 (2014).
Tumidajski et al., "Overlay Current in a Conductive Concrete Snow Melting System," Cem. Concr. Res. 33:1807-1809 (2003).
C.Y. Tuan, "Roca Spur Bridge: The Implementation of an Innovative Deicing Technology," J. Cold Reg. Eng. 22:1-15 (2008).
Maggenti et al., "Development of Conductive Polyester Concrete for Bridge-Deck Cathodic Protection and Ice Control," Transp. Res. Rec. 1597:61-69 (1997).
Heymsfield et al., "Feasibility of Anti-Icing Airfield Pavements Using Conductive Concrete and Renewable Solar Energy," Final Report, 1-65 (2013).
Galao et al., "Highly Conductive Carbon Fiber Reinforced Concrete for Icing Prevention and Curing," Materials 9:281 (2016).
Wu et al., "Three-Phase Composite Conductive Concrete for Pavement Deicing," Constr. Build. Mater. 75:129-135 (2015).

(56) References Cited

OTHER PUBLICATIONS

Chung, "Electrically Conductive Cement-Based Materials," Adv. Cem. Res. 4:167-176 (2004).
Hambach et al., "Carbon Fibre Reinforced Cement-Based Composites as Smart Floor Heating Materials," Composits Part B 90:465-470 (2016).
Abdualla et al., "Design and Construction of the World's First Full-Scale Electrically Conductive Concrete Heated Airport Pavement System at A US Airport," Journal of the Transportation Research Board 2672(23):82-94 (2018).
Nahvi et al., "Towards Resilient Infrastructure Systems for Winter Weather Events: Integrated Stochastic Economic Evaluation of Electrically Conductive Heated Airfield Pavements," Sustainable Cities and Society 41:195-204 (2018).
Sassani et al., "Development of Carbon Fiber-Modified Electrically Conductive Concrete for Implementation in Des Moines International Airport," Case Studies in Construction Materials 8:277-291 (2018).
Sassani et al., "Influence of Mix Design Variables on Engineering Properties of Electrically Conductive Concrete," Construction & Building Materials, 152:168-181 (2017).
Shen et al., "Life Cycle Assessment of Heated Apron Pavement System Operations," Transportation Research Part D 48:316-331 (2016).
Abdualla et al., "System Requirements for Electrically Conductive Concrete Heated Pavements," Transportation Research Record: Journal of the Transportation Research Board 2569:70-79 (2016).
Gopalakrishnan et al., "Electrically Conductive Mortar Characterization for Self-Heating Airfield Concrete Pavement Mix Design," Int. J. Pavement Res.Technol. 8(5):315-324 (2015).
Abdualla et al., "Construction Techniques for Electrically Conductive Heated Pavement Systems," Construction Research Congress 2018, New Orleans, Louisiana, Apr. 2-5, 2018.
Sadati et al., "Numerical Modeling of Electrically Conductive Pavement Systems," ASCE Congress on Technical Advancement 2017, Duluth, MN, Sep. 10-13, 2017.
Abdualla et al., "Configuration of Electrodes for Electrically Conductive Concrete Heated Pavements," ASCE International Conference on Highway Pavements and Airfield Technology 2017, Philadelphia, PA, Aug. 27-30, 2017.
Shen et al., "Airport Apron Heated Pavement System Operations: Analysis of Energy Consumption, Greenhouse Gas Emissions, and Operating Costs," Geo-Chicago 2016 Conference, Chicago, Illinois, Aug. 14-18, 2016, pp. 513-522.
Ceylan et al., "Heated Transportation Infrastructure Systems: Existing and Emerging Technologies," 12th International Symposium on Concrete Roads, Prague, Czech Republic, Sep. 23-26, 2014.
Shen et al., "Greenhouse Gas Emission Analysis for Heated Pavement System," The 2014 FAA Worldwide Airport Technology Transfer Conference, Galloway, New Jersey, Aug. 5-7, 2014.

Quirke, J., "Electric Concrete Tested at US Airport to Melt Snow", Global Construction Review, Mar. 22, 2018.
Watts, A., "New Heated Airport Runway Concept May Sharply Bias 'Global Warming' Signal in the Global Climate Monitoring Network," Watts Up With That? Feb. 23, 2018.
Rossen et al., "Could Heated Airport Runways Melt Away your Winter Travel Headaches?," NBC Today, Jan. 26, 2018.
"Safer, More Sustainable Aviation. Iowa State's Partnership in FAA Program Advances Airport Runways, Operating Technology," Iowa State University College of Engineering Research, Jan. 8, 2018.
Aguirre, J., "Middle Bit: Heated Pavement Technology Tests Well at Des Moines Airport," Clay and Milk, Jan. 5, 2018.
"Des Moines Airport Testing Heated Pavement," WHO-TV, Jan. 5, 2018.
Magel,T., "Heated Pavement Tech Could be Travelers' Dream Come True," KCCI 8 News, Jan. 5, 2018.
"Heated Pavements Working at Des Moines Airport," KCRG News, Jan. 5, 2018.
Ford, G., "Iowa Airports Going Green, Saving on Energy Costs," The Gazette, Nov. 25, 2017.
Yu, A.,"Winter is Coming. What if Roads and Runways Could De-Ice Themselves?," NPR, Oct. 1, 2017.
Rizzo C., "Electric Concrete at Airports Could Save US all From Winter Fight Delays," Travel+Leisure, Apr. 18, 2017.
Davis, A., "Iowa State Engineers Test Heated Pavement Technology at Des Moines International Airport," Highway Today, Apr. 1, 2017.
Coxworth, B., "Electrified Concrete May Keep Airports Ice-Free," News ATLAS, Mar. 30, 2017.
"Iowa State Engineers Test Heated Pavement Technology at Des Moines International Airport," Newswise, Mar. 28, 2017.
"Iowa State Engineers Test Heated Pavement Technology at Des Moines International Airport," Iowa State News Service, Mar. 28, 2017.
"Heat Pavement Technology Could Melt Away Airport Headaches," WHO-TV, Mar. 28, 2017.
Iowa State University, "Heated Pavement Technology Tested at Des Moines International Airport," ScienceDaily, Mar. 28, 2017.
Ceylan et al., "Innovative and Sustainable Airfield Pavement Engineering Solutions," International Airport Review, May 24, 2016.
Ceylan, H., "Iowa State Engineers Developing Pavement Technologies to Clear Snow and Ice From Runways," Innovations Report, Apr. 3, 2015.
Moore, J., "Just Melt it. Iowa State Tests New Snow Removal Methods," AOPA, Mar. 18, 2015.
Satre, Z., "ISU Researchers Develop Snow-Free Pavement Technologies," Iowa State Daily, Mar. 12, 2015.
"ISU Researchers Hope to Prevent Icy Airport Runways," Ames Tribune, Mar. 7, 2015.
Chandler, R., "Iowa State University Students Developing Heated Pavement Technology," WHO-TV, Mar. 5, 2015.

* cited by examiner

A
Poor-cohesion ECON beam (80V, 3-minutes)
Resistivity= 17 Ω-cm

B
Poor-cohesion ECON beam (80V, 8-minutes)
Resistivity= 17 Ω-cm

C
Good-cohesion ECON beam (80V, 3 minutes)
Resistivity= 43 Ω-cm

D
Good-cohesion ECON beam (80V, 8 minutes)
Resistivity= 43 Ω-cm

ELECTRICALLY CONDUCTIVE CONCRETE COMPOSITION AND SYSTEM DESIGN FOR RESISTIVE HEATING OF PAVEMENTS WITH LOW VOLUME FRACTIONS OF CARBON MICROFIBER

This application claims the benefit of U.S. Provisional Patent Application Ser. No. 62/805,518, filed Feb. 14, 2019, and U.S. Provisional Patent Application Ser. No. 62/840,989, filed Apr. 30, 2019, which are hereby incorporated by reference in their entirety.

This invention was made with government support under Grant No. 12-C-GA-ISU awarded by Federal Aviation Administration. The government has certain rights in the invention.

FIELD

The present application relates to an electrically conductive concrete composition and system designed for resistive heating of pavements with low volume fractions of carbon microfiber. The present application also relates to prefabricated precast heated concrete panels for melting or preventing ice and snow accumulation on paved surfaces for airport and highway applications.

BACKGROUND

Traditional methods of ice/snow removal from pavements use deicing chemicals combined with mechanical removal that are associated with large manpower, sophisticated machinery, environmentally harmful chemicals, and damage to pavement. Sassani et al., "Factorial Study on Electrically Conductive Concrete Mix Design for Heated Pavement Systems," in: Transp. Res. Board 96th Annual Meeting, Washington D.C., pp. 17-05347 (2017); Arabzadeh et al., "Influence of Deicing Salts on the Water-Repellency of Portland Cement Concrete Coated with Polytetrafluoroethylene and Polyetheretherketone," in: ASCE Int. Conf. Highw. Pavements Airf. Technol., Philadelphia, Pa. (2017); Arabzadeh et al., "Superhydrophobic Coatings on Asphalt Concrete Surfaces," Transp. Res. Rec. J. Transp. Res. Board. No. 2551 (2016); Lai et al., "Automatically Melting Snow on Airport Cement Concrete Pavement with Carbon Fiber Grille," Cold Reg. Sci. Technol. 103:57-62 (2014); Yang et al., "Experimental Study on Carbon Fiber Tape-Based Deicing Technology," J. Cold Reg. Eng. 26:55-70 (2012); Ceylan et al., "Heated Transportation Infrastructure Systems: Existing and Emerging Technologies," in: Civil, Constr. Environ. Eng. Conf. Present. Proceedings. 23, Iowa State University (2014). Application of deicing chemicals is especially associated with negative environmental impacts. Christopher et al., "Effect of Deicing Salts on Metal and Organic Matter Mobilization in Roadside Soils," Environ. Sci. Technol. 26:703-709 (1992); Bäckström et al., "Mobilisation of Heavy Metals by Deicing Salts in a Roadside Environment," Water Res. 38:720-732 (2004); Cunningham et al., "Accumulation of Deicing Salts in Soils in an Urban Environment," Urban Ecosyst. 11:17-31 (2008); Sanzo et al., "Effects of Road De-Icing Salt (NaCl) on Larval Wood Frogs (Rana sylvatica)," Environ. Pollut. 140:247-256 (2006); Czerniawska-Kusza et al., "Effect of Deicing Salts on Urban Soils and Health Status of Roadside Trees in the Opole Region," Environ. Toxicol. 19:296-301 (2004); Karraker et al., "Impacts of Road Deicing Salt on the Demography of Vernal Pool-Breeding Amphibians," Ecol. Appl. 18:724-734 (2016). The salty runoff from pavement deicing operations is responsible for soil and water contamination (Christopher et al., "Effect of Deicing Salts on Metal and Organic Matter Mobilization in Roadside Soils," Environ. Sci. Technol. 26:703-709 (1992); Bäckström et al., "Mobilisation of Heavy Metals by Deicing Salts in a Roadside Environment," Water Res. 38:720-732 (2004); Cunningham et al., "Accumulation of Deicing Salts in Soils in an Urban Environment," Urban Ecosyst. 11:17-31 (2008); Czerniawska-Kusza et al., "Effect of Deicing Salts on Urban Soils and Health Status of Roadside Trees in the Opole Region," Environ. Toxicol. 19:296-301 (2004)) and adverse health effects on plant life, aquatic life, and human societies (Cunningham et al., "Accumulation of Deicing Salts in Soils in an Urban Environment," Urban Ecosyst. 11:17-31 (2008); Sanzo et al., "Effects of Road De-Icing Salt (NaCl) on Larval Wood Frogs (Rana sylvatica)," Environ. Pollut. 140:247-256 (2006); Czerniawska-Kusza et al., "Effect of Deicing Salts on Urban Soils and Health Status of Roadside Trees in the Opole Region," Environ. Toxicol. 19:296-301 (2004); Karraker et al., "Impacts of Road Deicing Salt on the Demography of Vernal Pool-Breeding Amphibians," Ecol. Appl. 18:724-734 (2016); and Ramakrishna et al., "Environmental Impact of Chemical Deicers—A Review," Water. Air. Soil Pollut. 166:49-63 (2005)). Deicing chemicals constitute the majority of greenhouse gas emission associated with traditional deicing methods. Shen et al., "Life Cycle Assessment of Heated Apron Pavement System Operations," Transp. Res. Part D Transp. Environ. 48:316-331 (2016) and Wang et al., "Life-Cycle Assessment of Airport Pavement Design Alternatives for Energy and Environmental Impacts," J. Clean. Prod. 133:163-171 (2016). Electrically heated pavement systems using electrically conductive concrete (also referred to herein as "ECON") are based on the resistive heating concept, where, the current flow through the conductive pavement materials is used for generating heat by conversion of electrical energy into heat. The fraction of electrical energy lost due to the resistance of the system is converted into heat and increases the pavement temperature.

The basic mixture components of ECON are cementitious materials, coarse and fine aggregates, water, electrically conductive additive ("ECA"), and possibly chemical admixtures. Gopalakrishnan et al., "Self-Heating Electrically Conductive Concrete for Pavement Deicing: A Revisit," in: Transp. Res. Board 94th Annual Meeting, p. No. 15-4764 (2015). Air-dried normal portland cement concrete ("PCC") has an electrical resistivity in a range between $6.54 \times 10^5$ and $11.4 \times 10^5$ Ω-cm (Forde et al., "The Conduction of Electricity Through Concrete," Mag. Concr. Res. 33:48-60 (1981)), while, electrical resistivity of ECON is orders of magnitude lower (30 Ω-cm to $1.00 \times 10^4$ Ω-cm). D. D. L. Chung, "Electrically Conductive Cement-Based Materials," Adv. Cem. Res. 4:167-176 (2004); Wu et al., "Three-Phase Composite Conductive Concrete for Pavement Deicing," Constr. Build. Mater. 75:129-135 (2015); U.S. Pat. No. 3,166,518 to Barnard; U.S. Pat. No. 5,346,547 to McCormack; J. Farrar, "Electrically Conductive Concrete," GEC J. Sci. Technol. (1978); and Hou et al., "Electrical Conductivity of the Carbon Fiber Conductive Concrete," J. Wuhan Univ. Technol. Sci. Ed. 22:346-349 (2007)). ECON is a smart cementitious composite which is produced by modification of plain PCC. U.S. Pat. No. 5,447,564 to Xie et al. Unlike plain cementitious composites in which electricity is mainly conducted through electrolytic conduction, the dominant conduction mechanism in ECON is the motion of electrons instead of ions (Yehia et al., "Thin Conductive Concrete Overlay for Bridge Deck Deicing and Anti-Icing," Transp.

Res. Rec. *J. Transp. Res. Board.* 1698:45-53 (2000)) which is boosted by introducing an electrically conductive additive phase into the cementitious matrix. Previous studies have used various electrically conductive materials such as carbon-based and metallic fibers, powders, and granular solid particles to form the path of electronic conduction in cementitious composites, and suggested that carbonaceous fiber-shaped materials with micrometer-scale diameter and 3-15 mm length provide superior performance. D. D. L. Chung, "Electrically Conductive Cement-Based Materials," *Adv. Cem. Res.* 4:167-176 (2004); Wu et al., "Three-Phase Composite Conductive Concrete for Pavement Deicing," *Constr. Build. Mater.* 75:129-135 (2015); Hou et al., "Electrical Conductivity of the Carbon Fiber Conductive Concrete," *J. Wuhan Univ. Technol. Sci. Ed.* 22:346-349 (2007); Cao et al., "Carbon Fiber Reinforced Cement Mortar Improved by Using Acrylic Dispersion as an Admixture," *Cem. Concr. Res.* 31:1633-1637 (2001); Gao et al., "Electrical Resistance of Carbon-Nanofiber Concrete," *Smart Mater. Struct.* 20:49501 (2011); Yu et al., "Carbon Nanotube Based Self-Sensing Concrete for Pavement Structural Health Monitoring," Research Report—Contract Number: US DOT: DTFH61-10-C-00011, Duluth, Minn. (2012); Chang et al., "Temperature and Mixing Effects on Electrical Resistivity of Carbon Fiber Enhanced Concrete," *Smart Mater. Struct.* 22:35021 (2013); Wen et al., "A Comparative Study of Steel- and Carbon-Fiber Cement as Piezoresistive Strain Sensors," *Adv. Cem. Res.* 15:119-128 (2003); Pérez et al., "Electrochemical Extraction of Chlorides from Reinforced Concrete Using a Conductive Cement Paste as the Anode," *Corros. Sci.* 52:1576-1581 (2010); Gomis et al., "Self-Heating and Deicing Conductive Cement. Experimental Study and Modeling," *Constr. Build. Mater.* 75:442-449 (2015); Kraus et al., "Testing and Evaluation of Concrete Using High-Carbon Fly Ash and Carbon Fibers," Milwaukee, Wis. (2006); Carmona et al., "Efficiency of a Conductive Cement-Based Anodic System for the Application of Cathodic Protection, Cathodic Prevention and Electrochemical Chloride Extraction to Control Corrosion in Reinforced Concrete Structures," *Corros. Sci.* 96:102-111 (2015); Fu et al., "Submicron-Diameter-Carbon-Filament Cement-Matrix Composites," Carbon N. Y. 36:459-462 (1998); and Galao et al., "Highly Conductive Carbon Fiber Reinforced Concrete for Icing Prevention and Curing," *Materials (Basel).* 9:281 (2016). Powder and granular materials are associated with high dosage, reduction of cementitious composite's strength (Wu et al., "Study on Three-Phase Composite Conductive Concrete for Pavement Deicing," in: Transp. Res. Board 93rd Annual Meeting, p. No. 14-2684 (2014)), and high cost especially in the case of nano-particles. Although steel fiber is more effective in achieving resistive heating (Wang et al., "Chung, Resistance Heating Using Electrically Conductive Cements," *Adv. Cem. Res.* 16:161-166 (2004)), addition of steel fiber to concrete mix is associated with drawbacks such as corrosion (Wu et al., "Study on Three-Phase Composite Conductive Concrete for Pavement Deicing," in: Transp. Res. Board 93rd Annual Meeting, p. No. 14-2684 (2014)), high dosage (C. Y. Tuan, "Implementation of Conductive Concrete For Deicing," Omaha, Nebr. (2008)), and prohibitions in critical infrastructures such as airports (Standards for Specifying Construction of Airports, FAA Advisory circular No. 150/5370-10G (2014) and Sassani et al., "Development of Carbon Fiber-modified Electrically Conductive Concrete for Implementation in Des Moines International Airport," *Case Stud. Constr. Mater.* 8 (2018)). Also, modification of PCC with carbon fiber provides benefits in terms of mechanical performance and durability (Cao et al., "Carbon Fiber Reinforced Cement Mortar Improved by Using Acrylic Dispersion as an Admixture," *Cem. Concr. Res.* 31:1633-1637 (2001); Chen et al., "Effect of Fibers on Expansion of Concrete with a Large Amount of High f-CaO Fly Ash," *Cem. Concr. Compos.* 33:1549-1552 (2003); Peyvandi et al., "Enhancement of the Durability Characteristics of Concrete Nanocomposite Pipes with Modified Graphite Nanoplatelets," *Constr. Build. Mater.* 47:111-117 (2013); Shu et al., "Hybrid Effects of Carbon Fibers on Mechanical Properties of Portland Cement Mortar," *Mater. Des.* 65:1222-1228 (2015); and Graham et al., "Laboratory Evaluation of Tensile Strength and Energy Absorbing Properties of Cement Mortar Reinforced with Micro- and Meso-Sized Carbon Fibers," *Constr. Build. Mater.* 44:751-756 (2013)).

Achieving high electrical conductivity in cementitious composites requires fiber percolation through the cementitious matrix; meaning that the volume fraction of fibers should be equal to or greater than the value which forms a continuous path of fibers touching one another. Chen et al., "Improving the Electrical Conductivity of Composites Comprised of Short Conducting Fibers in a Nonconducting Matrix: The Addition of a Nonconducting Particulate Filler" in: MRS Proc., pp. 141-146 (1995); Wen et al., "Double Percolation in the Electrical Conduction in Carbon Fiber Reinforced Cement-Based Materials," *Carbon N. Y.* 45:263-267 (2007); Xie et al., "Electrical Percolation Phenomena in Cement Composites Containing Conductive Fibers," *J. Mater. Sci.* 31:4093-4097 (1996); Cao et al., "Electric Polarization and Depolarization in Cement-Based Materials, Studied by Apparent Electrical Resistance Measurement," *Cem. Concr. Res.* 34:481-485 (2004); Sun et al., "Study on the Hole Conduction Phenomenon in Carbon Fiber-Reinforced Concrete," *Cem. Concr. Res.* 28:549-554 (1998); and Wen et al., "Seebeck Effect in Carbon Fiber-Reinforced Cement," *Cem. Concr. Res.* 29:1989-1993 (1999). The range of fiber content at which electrical conductivity abruptly increases is known as the percolation transition zone (or percolation threshold). F. Vossoughi, "Electrical Resistivity of Carbon Fiber Reinforced Concrete," Berkeley, Calif., (2004). However, using electrically conductive additives beyond the percolation threshold is costly without added benefit. Therefore, knowing the percolation threshold is critical to designing an ECON HPS. Chang et al., "Temperature and Mixing Effects on Electrical Resistivity of Carbon Fiber Enhanced Concrete," *Smart Mater. Struct.* 22:35021 (2013). Percolation threshold of carbon fiber with different aspect ratios have been investigated by numerous studies. Wen et al., "Double Percolation in the Electrical Conduction in Carbon Fiber Reinforced Cement-Based Materials," *Carbon N. Y.* 45:263-267 (2007); Xie et al., "Electrical Percolation Phenomena in Cement Composites Containing Conductive Fibers," *J. Mater. Sci.* 31:4093-4097 (1996); Baeza et al., "Triple Percolation in Concrete Reinforced with Carbon Fiber," *ACI Mater. J.* 107:396-402 (2010); Sun et al., "Thermoelectric Percolation Phenomena in Carbon Fiber-Reinforced Concrete," Cem. *Concr. Res.* 28:1707-1712 (1998); D. D. Chung, "Dispersion of Short Fibers in Cement," *J. Mater. Civ. Eng.* 17:379-383 (2005); and Hambach et al., "Carbon Fibre Reinforced Cement-Based Composites as Smart Floor Heating Materials," *Compos. Part B Eng.* 90:465-470 (2016). With respect to percolation behavior, the effective carbon fiber dosage for producing electrically conductive cementitious composites is between 0.5% and 1% (Vol.) (Wu et al., "Three-Phase Composite Conductive Concrete for Pavement Deicing," *Constr. Build. Mater.* 75:129-135 (2015); Hou et al., "Electrical Conductivity of the Carbon Fiber Conductive Concrete," *J. Wuhan Univ. Technol. Sci. Ed.* 22:346-349 (2007); Cao et al., "Carbon Fiber Reinforced Cement Mortar Improved by Using Acrylic Dispersion as an Admixture," *Cem. Concr. Res.* 31:1633-1637 (2001); Chang et al., "Temperature and Mixing Effects on Electrical Resistivity of Carbon Fiber Enhanced Concrete," *Smart Mater. Struct.* 22:35021 (2013); Wen et al., "A Comparative Study of Steel- and Carbon-Fiber Cement as Piezoresistive Strain Sensors," *Adv. Cem. Res.* 15:119-128 (2003); Kraus et al., "Testing and Evaluation of Concrete Using High-Carbon Fly Ash and Carbon Fibers," Milwaukee, Wis. (2006); Wen et al., "Double Percolation in the Electrical Conduction in Carbon Fiber Reinforced Cement-Based Materials," *Carbon N.Y.* 45:263-267 (2007); Baeza et al., "Triple Percolation in Concrete Reinforced with Carbon Fiber," *ACI Mater. J.* 107:396-402 (2010); Hambach et al., "Carbon Fibre Reinforced Cement-Based Composites as Smart Floor Heating Materials," *Compos. Part B Eng.* 90:465-470 (2016); Wen et al., "Cement as a Thermoelectric Material," *J. Mater. Res.* 15: 2844-2848 (2000); Wen et al., "Carbon Fiber-Reinforced Cement as a Thermistor," *Cem. Concr. Res.* 29:961-965 (1999); Sassani et al., "Influence of Mix Design Variables on Engineering Properties of Carbon Fiber-Modified Electrically Conductive Concrete," *Constr. Build. Mater.* 152:168-181 (2017)) which depends on the type of composite (paste, mortar, or concrete), fiber aspect ratio, and fiber length (D. D. L. Chung, "Electrically Conductive Cement-Based Materials," *Adv. Cem. Res.* 4:167-176 (2004)). In short carbon fibers (represented by approximately 7-15 µm nominal diameter and 1-10 mm length), increasing fiber length decreases percolation threshold (D. D. L. Chung, "Electrically Conductive Cement-Based Materials," *Adv. Cem. Res.* 4:167-176 (2004)), but increasing the fiber length results in fiber dispersion difficulty (D. D. Chung, "Dispersion of Short Fibers in Cement," *J. Mater. Civ. Eng.* 17:379-383 (2005)), and loss of concrete workability (Sassani et al., "Influence of Mix Design Variables on Engineering Properties of Carbon Fiber-Modified Electrically Conductive Concrete," *Constr. Build. Mater.* 152:168-181 (2017)). Excessive carbon fiber content reduces the workability of the mixture and, since carbon fiber is the most expensive component of ECON, is not economically justified. So the carbon fiber dosage should be maintained in the vicinity of percolation threshold, such that sufficient electrical conductivity is achieved with minimum negative effects on workability and cost.

Polyacrylonitrile (PAN)-based carbon fibers (Wu et al., "Three-Phase Composite Conductive Concrete for Pavement Deicing," *Constr. Build. Mater.* 75:129-135 (2015)) with diameters between 7 and 15 µm and nominal lengths of 3-6 mm provided superior effectiveness in improving mechanical properties of concrete and imparting high electrical conductivity to cementitious composites (D. D. L. Chung, "Electrically Conductive Cement-Based Materials," *Adv. Cem. Res.* 4:167-176 (2004) and Banthia et al., "Electrical Resistivity of Carbon and Steel Micro-Fiber Reinforced Cements," *Cem. Concr. Res.* 22:804-814 (1992)). In this embodiment, carbon fibers and carbon microfibers are used interchangeably to refer to carbon fibers with µm-scale diameter and mm-scale length. Shown by previous studies (Ceylan et al., "Heated Transportation Infrastructure Systems: Existing and Emerging Technologies," in: Civil, Constr. Environ. Eng. Conf. Present. Proceedings. 23, Iowa State University (2014); Wu et al., "Three-Phase Composite Conductive Concrete for Pavement Deicing," *Constr. Build. Mater.* 75:129-135 (2015); Galao et al., "Highly Conductive Carbon Fiber Reinforced Concrete for Icing Prevention and Curing," *Materials (Basel)*. 9:281 (2016); Banthia et al., "Electrical Resistivity of Carbon and Steel Micro-Fiber Reinforced Cements," *Cem. Concr. Res.* 22:804-814 (1992); Won et al., "Thermal Characteristics of a Conductive Cement-Based Composite for a Snow-Melting Heated Pavement System," *Compos. Struct.* 118:106-111 (2014); Maggenti et al., "Development of Conductive Polyester Concrete for Bridge-Deck Cathodic Protection and Ice Control," *Transp. Res. Rec. J. Transp. Res. Board.* 61-69 (1996); and Chen et al., "Performances of Electrically Conductive Concrete with Layered Stainless Steel Fibers," *Sustain. Constr. Mater.* 163-171 (2012)), the carbon microfiber is the most effective carbon product for improving electrical conductivity. For example, carbon nano-fibers (CNF) are less effective than carbon microfibers which have length ranges between 3 and 15 mm (D. D. L. Chung, "Electrically Conductive Cement-Based Materials," *Adv. Cem. Res.* 4:167-176 (2004)). Likewise, powder materials such as graphite powder or coke powder exert less effect on electrical resistivity improvement (D. D. L. Chung, "Electrically Conductive Cement-Based Materials," *Adv. Cem. Res.* 4:167-176 (2004)). On the other hand, the most effective carbonaceous fibers for structural enhancement of concrete are carbon microfibers and microfibers work better than macro- and nano-fibers for structural reinforcement. D. D. Chung, "Dispersion of Short Fibers in Cement," *J. Mater. Civ. Eng.* 17:379-383 (2005). However, the smaller the fiber diameter, the more difficult is its dispersion in a concrete mixture and, given the same fiber material and diameter, shorter fibers are easier to disperse. D. D. Chung, "Dispersion of Short Fibers in Cement," *J. Mater. Civ. Eng.* 17:379-383 (2005). For volume dosages below 1%, and approximately 7 µm diameter, carbon fibers with aspect ratios of about 860 provided performance superior to either longer or shorter fiber types in improving electrical conductivity of concrete, but high aspect ratio fibers are more difficult to disperse in concrete and adversely affect the workability of the mixture. D. D. Chung, "Dispersion of Short Fibers in Cement," *J. Mater. Civ. Eng.* 17:379-383 (2005). Shorter length and lower aspect ratio carbon fibers are easier to disperse, and they contribute a smaller effect on workability, so, despite being otherwise inferior to the 860-aspect ratio-fibers, carbon fibers with an aspect ratio of about 430 have been found to exhibit good performance in improving electrical conductivity of ECON. Hambach et al., "Carbon Fibre Reinforced Cement-Based Composites as Smart Floor Heating Materials," *Compos. Part B Eng.* 90:465-470 (2016).

In both normal concrete and ECON, the mix design variables such as cement content, aggregate-to-cement volume ratio, and coarse-to-fine aggregate volume ratio (C/F) exert a significant influence on the electrical conductivity of the concrete. Wen et al., "Double Percolation in the Electrical Conduction in Carbon Fiber Reinforced Cement-Based Materials," *Carbon N.Y.* 45:263-267 (2007); Baeza et al., "Triple Percolation in Concrete Reinforced with Carbon Fiber," *ACI Mater. J* 107:396-402 (2010); and C. Shi, "Effect of Mixing Proportions of Concrete on its Electrical Conductivity and the Rapid Chloride Permeability Test (ASTM C1202 or ASSHTO T277) Results," *Cem. Concr. Res.* 34:537-545 (2004). In addition to the conventional applications of chemical admixtures—such as improvement of workability, air entrainment, etc.—they can be used for engineering the internal environment of concrete to boost electricity conduction; for instance, calcium nitrite-based corrosion inhibitor admixtures can change the electrical conductivity of concrete. Söylev et al., "Corrosion Inhibitors for Steel in Concrete: State-of-the-Art Report," *Constr. Build. Mater.* 22 609-622 (2008) and ACI committee 350, Letter Ballot 350-A-11-01: Fibers and Corrosion Inhibiting Admixtures (2011). While, sodium-based corrosion inhibitors tend to decrease the compressive strength of concrete, calcium compounds do not exert any reducing effect on concrete strength properties; in fact, calcium nitrite, which is an anodic corrosion inhibitor, has been found to increase the 28-day compressive strength of concrete. Hansson et al., "Corrosion Inhibitors in Concrete-Part I: the Principles," *Cem. Concr. Res.* 28:1775-1781 (1998). Due to the presence of different ionic entities within the pore solution, it acts as the primary medium for ion/charge transfer within the concrete. The principal ions in the pore solution that enable the flow of electricity are $Ca^{2+}$, $K^+$, $Na^+$, $SO_4^{2-}$, and $OH^-$. Forde et al., "The Conduction of Electricity Through Concrete," *Mag. Concr. Res.* 33:48-60 (1981). Hence, the ionic composition of pore solution and the ion concentration in the pore solution play an important role in electricity conduction by concrete. Snyder et al., "Estimating the Electrical Conductivity of Cement Paste Pore Solutions from $OH^-$, $K^+$ and $Na^+$ Concentrations," *Cem. Concr. Res.* 33:793-798 (2003). It was reported, that when calcium nitrite is added to the mix water of concrete, the concentration of nitrite in the pore solution is comparable to the mix water, i.e., the majority of the nitrite is diffused in the pore solution. Furthermore, at high calcium nitrite contents, hydroxyl ions concentration in the pore solution is increased due to competitive adsorption of nitrite ions on the surface of cement hydration products. Liang et al., "Nitrite Diffusivity in Calcium Nitrate-Admixed Hardened Concrete," *Cem. Concr. Res.* 33:139-146 (2003) and Tritthart et al., "Nitrite Binding in Cement," *Cem. Concr. Res.* 31:1093-1100 (2001). Therefore, calcium nitrite admixture tends to enhance electricity conduction by increasing the ion concentration in the pore solution of concrete.

Ice and snow accumulation on paved surfaces has the potential to reduce pavement surface skid resistance and thereby cause hazardous conditions that may lead to traffic accidents. McCartney, S. "The Case for Heated Runways: Researchers Seek Ways to Warm Snowy Airport Surfaces," *Wall Street Journal*, Febr. 19, 2014 and *Airport Winter Safety and Operation.* Advisory Circular 150/5200-30C. Federal Aviation Administration, U.S. Department of Transportation (2008). The use of deicing chemical agents or deployment of snow removal equipment ("SRE") to remove snow/ice can cause damage to pavement structures, corrosion to overall airplane and vehicles, foreign object damage ("FOD") to aircraft engines as well as leading to undesirable environmental issues. Xi and Olsgard. "Effect of De-icing Agents (Magnesium Chloride and Sodium Chloride) on Corrosion of Truck Components," Final Report for Report No. CDOT-DTD-R-2000-10. Colorado Department of Transportation (Denver, Colo.) (2000). It is also typically costly and time-consuming. Anand et al., "Economic Assessment of Heated Pavements for the Minneapolis-St. Paul International Airport," *The Proceedings of ASCE International Conference on Transportation and Development*, pp. 28-139 (2016).

Heated pavement systems ("HPS") represent alternative options for melting ice and snow. Electrically heated pavement systems ("EHPS") melt ice and snow using resistive cables embedded in regular concrete or electrically-conductive concrete ("ECON"). The use of resistive cables embedded inside concrete structures has been applied in the past to deicing of snow and ice in Oregon, Texas, and Pennsylvania; in those applications the performance of electrical cable was sometimes found inadequate due to the high power density required (Zenewitz, J. A. "Survey of Alternatives to the Use of Chlorides for Highway Deicing," Report No. FHWA-RD-77-52. Federal Highway Administration, U.S. Department of Transportation (Washington, D.C.) (1977)) and damage to electrical cables or associated sensing elements for triggering the system. Joerger and Martinez, "Electrical Heating of 1-84 in Land Canyon, Oreg.," Report No. FHWA-OR-RD06-17. Oregon Department of Transportation (Salem, Oreg.) (2006).

One method for construction of ECON heated pavements calls for placement of installation accessories prior to pouring the concrete. Therefore, they have so far been primarily constructed in two-lift procedures, where a first layer of concrete is poured and hardened, installations (electrodes, sensors, piping, and wiring) are placed, and then the second layer of concrete is poured. Precast concrete paving ("PCP") technology makes the production of such systems significantly faster and more reliable. Quality control is more crucial in the case of heated pavements than regular pavements. ECON systems may entirely, or to a considerable degree, loose their functionality because of poor consolidation of concrete. Therefore, precast technology is a highly reliable way of constructing these systems.

Precast concrete has demonstrated satisfactory performance in bridges, pavements, buildings, and airfield construction. It provides high strength, low permeability, and low cracking potential features since the panels are prepared off-site where quality control can be more effectively implemented. Using a precast concrete technique instead of cast-in-place for construction of pavements can expedite the construction process by eliminating the need for concrete strength-gaining time. Merritt et al., "Construction of the California Precast Concrete Pavement: Demonstration Project," Report No. FHWA-IF-06-010, FHWA, U.S. Department of Transportation (Washington, D.C.) (2004) and Priddy et al., "Review of Precast Portland Cement Concrete Panel Technologies for Use in Expedient Portland Cement Concrete Airfield Pavement Repairs," *Transportation Research Board 92th Annual Meeting Compendium of Papers*, No. 13-2956 (2013). The precast concrete technology enables rapid repair of pavement facilities and can be beneficially applied in situations where extended road closures could increase road congestion and result in increased lost work time, fuel consumption, and user-delay costs. Kohler et al., "Precast Concrete Pavements and Results of Accelerated Traffic Load Test," *The Proceeding of the International Conference on Optimizing Paving Concrete Mixtures and Accelerated Concrete Pavement Construction and Rehabilitation*, pp. 263-281 (2004). A study has shown that estimated daily user-delay costs for a four-lane divided facility carrying 50,000 vehicles per day can be as high as $383,000 per day for 24-hour lane closure, compared to only $1,800 per day for nighttime-only lane closure. Priddy et al., "Review of Precast Portland Cement Concrete Panel Technologies for Use in Expedient Portland Cement Concrete Airfield Pavement Repairs," *Transportation Research Board 92th Annual Meeting Compendium of Papers*, No. 13-2956 (2013).

Little has been done or documented with respect to precast concrete construction using ECON technology in airfield and highway pavements. The precast concrete technique was used to rehabilitate a taxiway at LaGuardia airport, New York during September 2002. The selection of precast concrete as a rehabilitation option is due to the fact that the precast concrete approach could reduce construction downtime. Chen et al., "Precast Concrete (PC) Pavement Test on Taxiway D-D at LaGuardia Airport," *Airfield Pavements: Challenges and New Technologies*, pp. 447-483 (2003).

An important benefit of using precast concrete technique for HPS is that it provides alternative options for constructing HPS in new or existing pavements and can accelerate construction procedures. Precast heated concrete panel using ECON technology has the potential to expedite construction work and provide better heat distribution since the precast heated concrete panel would be constructed off-site where quality control and quality assurance can be applied. In addition, the precast heated concrete panel can be tested in terms of heat distribution before transferring them to the job-site. A wet-on-wet process can be achieved between the ECON and PCC layers when precast concrete technology is used, which holds an advantage over two-lift paving and concrete overlay.

The present application is directed to overcoming these and other deficiencies in the art.

SUMMARY

A first aspect of the present application relates to a concrete pre-mix composition comprising a cementitious material and a plurality of conductive carbon microfibers mixed with said cementitious material, wherein said conductive carbon microfibers are present in the concrete pre-mix composition in an amount such that, when said concrete pre-mix composition is hydrated to form concrete and cured, the conductive carbon microfibers are dispersed in the cured concrete in an amount of 0.75% to 2.00% of total mass of the concrete.

A second aspect of the present application relates to a concrete composition comprising the concrete pre-mix composition disclosed herein and water in an amount sufficient to form concrete.

A third aspect of the present application relates to a method of producing an electrically conductive concrete composition comprising providing the concrete composition disclosed herein; forming the concrete composition into a desired shape; and curing the formed concrete composition.

A fourth aspect of the present application relates to an electrically conductive cured concrete form comprising a cured concrete matrix and a plurality of conductive carbon microfibers, wherein said conductive carbon microfibers are dispersed in the cured concrete matrix in an amount of 0.75% to 2.00% of the total mass of the electrically conductive cured concrete form and are positioned to effect resistance heating of the cured concrete form upon application of an electrical current.

A fifth aspect of the present application relates to a system for heating pavement comprising an upper layer comprising the electrically conductive concrete form disclosed herein; a plurality of electrodes positioned relative to said upper layer so that electrical current can flow between the electrodes and through the concrete form in said upper layer; a lower layer comprising a concrete composition positioned below and in contact with said upper layer; and a power supply connected to the plurality of electrodes.

An ECON heated pavement system (referred to herein as "HPS") works by applying an electric current through electrodes embedded in the ECON layer as top layer. Because the ECON has lower electrical resistivity than normal concrete, it behaves like a conductor of electricity. The main components of the ECON HPS of the present application are the ECON layer, the plain PCC layer, electrodes, a power supply, temperature sensors, and control system. The main components of ECON are carbon microfibers in minor volume fraction, coarse and fine aggregates, cementitious materials, water, conductivity-enhancing admixture, other admixtures depending on the construction practice (e.g. air-entraining admixture, set retarder, etc.), and, possibly, a viscosity-modifying admixture and fiber-dispersive agent. The proposed mixture composition of ECON, proposed mixture design method, the proposed system design, and examples of the demonstration are presented herein.

Electrically conductive concrete mixture compositions according to the present application can comprise minor volume fractions of carbon microfiber in an amount of 0.75% to 1% of the total volume of the concrete. The electrically conductive concrete may be made with carbon microfibers with aspect ratio of 400 to 1,800 as electrically conductive additive. No other electrically conductive material is required as a mixture component. The electrically conductive concrete addresses not only the adequacy of electrical conductivity, but also unprecedentedly solves the problem of heating uniformity in light of mixture cohesiveness. This is the first time that a factor other than electrical conductivity (e.g., factors such as distribution of cementitious material and carbon microfibers, mass percent of the carbon microfibers, type of carbon microfibers, and carbon microfiber size) is taken into account as a key parameter of the performance of ECON HPS. In particular, factors such as the mixture consistency, cohesiveness (e.g., uniformity of the mix), rheological properties, as well as pore structure of hardened concrete are all measurable factors in determining electrical conductivity of the present electrically conductive concrete.

The mixture composition of electrically conductive concrete of the present application is designed through a multi-factor approach that accounts for individual and synergic effects of multiple factors on properties of ECON including, for example, mass percent of the conductive additive, aspect ratio of the conductive additive, and size of the conductive additive. This is unprecedented because the existing knowledge is based merely on the electrically conductive additive type and dosage rate. A chemical admixture may also be provided to improve the electrical conductivity of the electrically conductive concrete. In one embodiment, the electrically conductive concrete can be cured by carbon dioxide during precast production process to improve electrical conductivity. The electrically conductive concrete can also be modified by supercritical carbon dioxide to improve the electrical conductivity, while, sequestering a quantity of carbon dioxide inside the concrete panels.

The electrically conductive concrete of the present application ensures performance adequacy through the entire service life which, based on the type of structure and location of the project, may be between 20 and 40 years.

The present application further provides system design, including the proposed type and configuration of all key elements of ECON HPS made with the electrically conductive concrete, as well as material production and ECON HPS construction procedures for the electrically conductive concrete and the system design. The material composition of the electrically conductive concrete and the ECON HPS system design, together provide a predictable system, the behavior of which can be pre-analyzed and numerically modelled with high accuracy prior to construction.

The present application further provides precast heated concrete panels developed by integrating ECON. In the precast heated concrete panels using ECON, the total thickness is divided into two layers; the top layer is a thin ECON layer and the bottom layer is a thick portland cement concrete (PCC) layer. The electrical resistivity of ECON should not be more than 1,000 'Ω-cm at 20° C. to provide sufficient heating. The thickness of the EON layer is recommended to be in the range of 5 to 10-cm. The purpose of using only a thin ECON layer is to lower overall construction costs and to heat the surface as much as required to melt snow and ice without having to also heat additional concrete above the ECON layer. A third layer of electrically insulating but thermally conductive polymer or polymer-cementitious material with a thickness of 1-25 mm can optionally be applied on top of the electrically conductive concrete for the sake of safety. A third layer of electrically insulating but thermally conductive polymer or polymer-cementitious material with a thickness of 1-25 mm can be applied on top of the electrically conductive concrete for the sake of safety. The PCC layer can be placed after positioning dowel bars and providing slots for load transfer to adjacent slabs. Electrodes are anchored to the bottom layer using nylon rods. Each precast heated concrete panel contains two electrodes located at its edges to provide electrical connectability. The number of electrodes and their spacing can be determined and designed to provide sufficient heat generation to prevent snow and ice accumulation based on the required energy density for each specific project site. The ECON layer is placed after anchoring and securing the electrodes while the bottom layer is still wet to enhance the bond between the two layers. The electrodes are connected to an alternating current (AC) supply to power the conductive concrete to generate heat due to the resistance of the ECON layer. The electrically conductive concrete can be cured by carbon dioxide in the precast production process to improve electrical conductivity. The electrically conductive concrete can also be modified by supercritical carbon dioxide to improve the electrical conductivity, while, sequestering a quantity of carbon dioxide inside the concrete panels.

BRIEF DESCRIPTION OF THE DRAWINGS

FIG. 4A shows FDA dosage-fiber content coupled effect, FIG. 4B shows CEA dosage-fiber content coupled effect, FIG. 4C depicts fiber length-fiber content coupled effect, and FIG. 4D shows fiber length-C/F coupled effect.

FIG. 10A is a top view of the ECON system, while FIG. 10B is a cross-sectional view of the ECON system taken along the line B-B of FIG. 10A. FIG. 10C shows the ECON system and components to control it.

FIG. 26A shows a plan view of slabs and FIG. 26B shows the cross section of a slab with embedded sensors.

DETAILED DESCRIPTION

Figure 1:
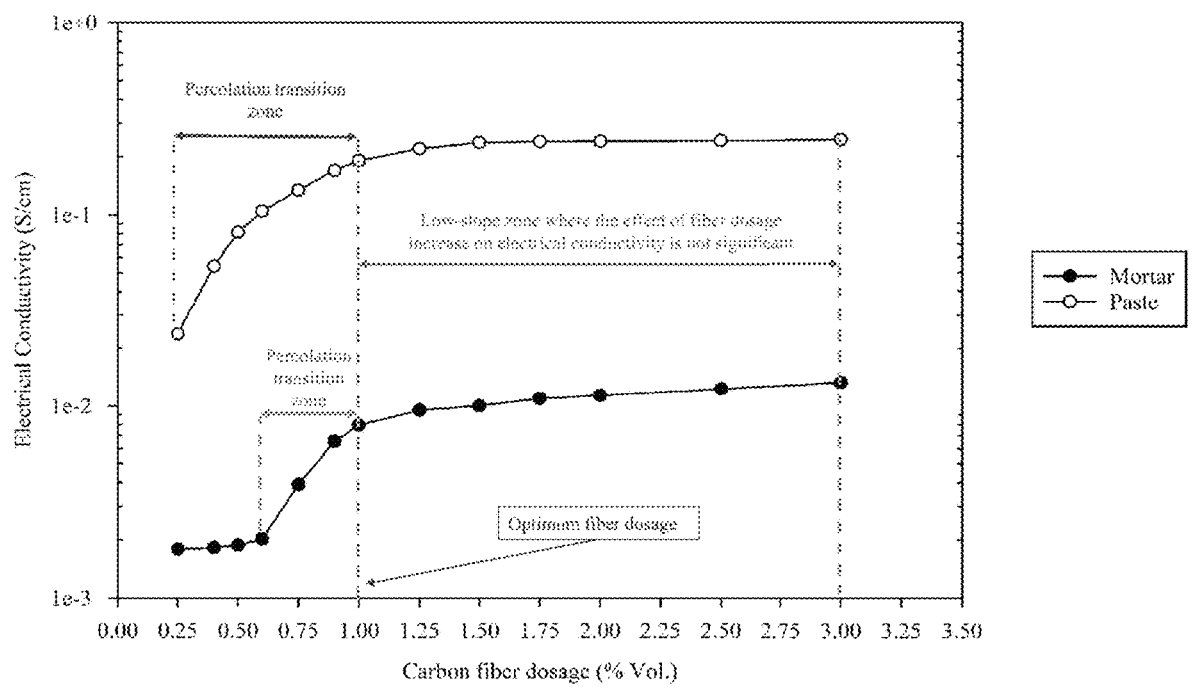
FIG. 1 shows the percolation threshold and optimum volume fraction of carbon microfibers in cementitious paste and mortar.

A first aspect of the present application relates to a concrete pre-mix composition comprising a cementitious material and a plurality of conductive carbon microfibers mixed with said cementitious material, wherein said conductive carbon microfibers are present in the concrete pre-mix composition in an amount such that, when said concrete pre-mix composition is hydrated to form concrete and cured, the conductive carbon microfibers are dispersed in the cured concrete in an amount of 0.75% to 2.00% of total mass of the concrete.

The concrete pre-mix composition, in accordance with the present application, may relate to a dry mix that includes cementitious material and a plurality of conductive carbon microfibers. The dry mix may include powder and granules and may include components such as finely divided cement particles (e.g., portland cement), sand, and gravel, among other aggregates. Dry concrete pre-mix consists of a dry mixture of cement ground to a very fine power, sand, and gravel of a particular size range (e.g., an aggregate).

The carbon microfibers useful in accordance with the present application may include, for example, microfibers that have an aspect ratio of length (l)/diameter (d) between 400 and 1,800. The aspect ratio (referred to herein as "s") is an important characterizing parameter of short fiber composites and is defined as the ratio between the length (l) and the diameter (d) of the fibers used as reinforcement. The value of s can vary depending on microfiber type and design. Aspect ratios can affect properties such as the strain to failure and toughness. A higher aspect ratio will result in lower values of strain at failure and toughness, due to angular particles inducing crack formation. The aspect ratio of the conductive carbon microfibers of the present application may be, for example, about 400, 450, 500, 550, 600, 650, 700, 750, 800, 850, 900, 950, 1,000, 1,050, 1,100, 1,150, 1,200, 1,250, 1,300, 1,350, 1,400, 1,450, 1,500, 1,550, 1,600, 1,650, 1,700, 1,750, 1,800, or any value between 400 and 1,800. The aspect ratio may be, for example, in the range of between 800 and 1,800, between 800 and 900, or, alternatively, between 400 and 500. In one embodiment, the conductive carbon microfibers have an aspect ratio of length (l)/diameter (d)) between 400 and 1,800.

In one embodiment of the present application, the pre-mix composition comprises a mineral aggregate mixed with the cementitious material. The mineral aggregate of the present application may include a fine mineral aggregate that is, for example, between 75 and 9,500 microns. Alternatively, the mineral aggregate may include a coarse mineral aggregate that is, for example, between 300 and 37,500 microns. The pre-mix composition may include fine mineral aggregate only, coarse mineral aggregate only, or any combination of both coarse and fine mineral aggregates. The fine mineral aggregate in accordance with the present application includes, but is not limited to, crushed rocks, sand, and combinations thereof. The coarse mineral aggregate in accordance with the present application includes, but is not limited to, coarse gravel, limestone, quartzite, granite, recycled concrete cement, recycled geomaterials such as recycled asphalt aggregates, recycled asphalt pavement (RAP), or recycled asphalt shingles (RAS), and any combination thereof.

The cementitious material in accordance with the present application may include, but is not limited to, portland cement, synthetic and by-product supplementary cementitious materials, natural pozzolans, and combinations thereof. Examples of useful types of cement include but are not limited to ordinary portland cement, portland-limestone cement, portland-slag cement, portland pozzolan cement, ternary blended cement, rapid hardening cement, quick setting cement, low heat cement, sulphate resisting cement, blast furnace slag cement, high alumina cement, white cement, colored cement, air Entraining Cement, expansive cement, and hydrographic cement.

The pre-mix of the present application provides a cementitious composition and carbon microfibers that achieve high electrical conductivity that require fiber percolation through the cementitious matrix. The volume fraction of carbon microfibers may be equal to, greater than, or less than the value which forms a continuous path of fibers touching on another. The range of fiber content at which electrical conductivity abruptly increases is known as the percolation transition zone (or percolation threshold).

The conductivity of the respective composite shows a dramatic change, by several orders of magnitude, around the threshold. This percolation phenomenon can be expressed by the following equation:

$$\sigma \alpha \sigma_m (\varphi - \varphi_c)^t \qquad \text{Equation 1}$$

where $\sigma$ and $\sigma_m$ are the conductivities of composite and conductive phase, $\varphi_c$ is the threshold value of the volumetric fraction of the conductive phase, and t is a constant that is independent of the microstructure of the material.

The threshold value, $\varphi_c$, is a microstructure-dependent parameter. The most important factor influencing this parameter is the size of the conductive phase.

According to percolation theory, there are many clusters consisting of conductive particles in the composite when the volumetric fraction of the conductive phase is less than the threshold value, i.e. $\varphi < \varphi_c$. The average size of clusters can be expressed as follows $$L_{av} \propto \frac{1}{(\phi_c - \phi)^v} \qquad \text{Equation 2}$$

where $L_{av}$ is the average size of all clusters, and v is a positive constant.

It can be seen that $L_{av} \to \infty$ when $\varphi \to \varphi_c$. This implies that the conductive phase will become a continuous phase when the threshold value of $\varphi$ is reached. The composite will then become conductive. In one embodiment, the conductive carbon microfibers are electrically conductive.

Electrical properties of concrete are of concern in some applications where inadequate resistivity of concrete affects electrical signaling systems, such as railway ties, or in structures in which concrete is used for protection from stray currents. Electrical properties of concrete are also of interest in such applications as cathodic protection of reinforced concrete; electrical grounding; deicing of airport runways, and bridge decks, by electrical heating; and non-destructive testing of concrete.

Conventional concrete is a dense hard hydrated mass produced from mixtures of portland cement, coarse aggregate, fine aggregate, and water. Concrete mixtures generally use only sufficient water to make the mixture placeable and to yield hardened concrete having a compressive strength of at least 8.3 MPa (1200 psi) after 28 days. Portland cement is a well-known cement that upon mixing with water binds or unites the other materials present in the mixture into concrete. The portland cement used in the present application is typically a Type I, II, III, IV and V portland cement, or some combination thereof. The coarse aggregate may include particles such as gravel, granite, limestone, shale, and the like. The fine aggregate employed in portland cement concretes is most often sand (silica) comprised of particles less than about 0.375 inches (9.5 millimeters) in size, typically equal to or less than about 0.1875 inches (4.76 millimeters) in size.

In one embodiment, the carbon microfibers of the present application may include but are not limited to a polyacrylonitrile (PAN)-based carbon microfibers, Pitch-based virgin carbon microfibers, or recycled carbon microfibers, or any combination thereof. In a preferred embodiment, the carbon microfibers are polyacrylonitrile (PAN)-based carbon microfibers. The carbon microfibers may range from between 3 and 15 mm in length. For example, the carbon microfibers may be between about 3 and about 7 mm in length, between 5 and 10 mm in length, and between 8-15 mm in length. The carbon microfibers may be, for example, 3 mm, 4 mm, 5 mm, 6 mm, 7 mm, 8 mm, 9 mm, 10 mm, 11 mm, 12 mm, 13 mm, 14 mm, 15 mm, or any variation in length between 3 and 15 mm.

The microfibers may be rectangular in shape with a deformed or corrugated surface to insure a bond with the concrete. Carbon products are commercially available and have good quality control. U.S. Pat. No. 6,825,444, which is hereby incorporated by reference in its entirety, discloses a conductive concrete composition.

The volume fractions of carbon microfibers in the concrete mix may be optimized to provide the required conductivity and adequate mechanical strength. A range for achieving optimal mechanical strength and uniform, stable heating is a concrete mixture containing carbon microfibers is between 0.5% to 5% by total mass, or between 0.5% to 3% by total mass. More particularly, the conductive carbon microfibers may be present in an amount 0.80% to 2.2% by total mass. In one embodiment, the conductive carbon microfibers may be present in an amount of about 0.80%, about 0.85%, about 0.90%, about 0.95%, about 1.0%, about 1.1%, about 1.2%, about 1.3%, about 1.4%, about 1.5%, about 1.6%, about 1.7%, about 1.8%, about 1.9%, about 2.0%, about 2.1%, or about 2.2%. Mixtures in these ranges will provide good conductivity, high mechanical strength and a smooth finished surface. Mixtures with less than these amounts of fibers may not as efficiently conduct an electrical current and therefore may not as efficiently heat the surface of a concrete composition. Mixtures with more than these amounts of fibers and particles may create a rough surface. The workability and surface finishability of mixtures in these ranges are similar to those of conventional concrete.

The concrete pre-mix may further include one or more additives. The additives may be, for example, conductivity-enhancing additives, viscosity-modifying additives, or air-entraining additives. The additives may, for example, be calcium nitrite or aqueous solutions of the compounds of alkali and alkaline earth metals, or a combination thereof. Calcium nitrite-based corrosion inhibitor admixtures may be used to modify the electrical conductivity of the concrete. Sodium-based corrosion inhibitors may also be used, but tend to decrease the compressive strength of the concrete. Calcium-based corrosion inhibitors, on the other hand, do not exert any reducing effect on concrete strength properties and may actually increase the compressive strength of concrete by increasing the ion concentration in the pore solution of concrete. See, e.g., Hansson et al., "Corrosion Inhibitors in Concrete-Part I: the Principles," *Cem. Concr. Res.* 28:1775-1781 (1998), which is hereby incorporated by reference in its entirety.

The pre-mix of the present application may further contain an admixture such as calcium carbonate, fly ash, blast furnace slag, clay, air entraining agents, water reducing agents, etc. The applicable types of admixtures are not restricted to these materials. The admixture is contained in an amount of 500 parts by weight or less, and preferably 100 parts by weight or less for every 100 parts by weight of the pre-mix composition.

In one embodiment, the pre-mix composition may further include a fiber-dispersive agent. The fiber-dispersive agent may be, for example, methyl cellulose, carboxymethyl cellulose, ethyl cellulose, ethyl methyl cellulose, hydroxypropyl cellulose, silica fume, latex, acrylic, and combinations thereof. In a preferred embodiment, the fiber-dispersive agent includes methyl cellulose, which may optionally be used in a dosage rate of between 0.0% and 0.5% by weight, for example, 0.2% by weight, of the materials used to prepare the cement composition described herein. The fiber-dispersive agent may be present in an amount less 1.0% by weight of the composition, preferably less than 0.5% by weight of the composition. For example, the fiber-dispersive agent may be present at less than about 0.4% by weight of the composition, less than 0.3% by weight of the composition, less than 0.2% by weight of the composition, less than 0.1% by weight of the composition, or less than 0.05% by weight of the composition.

The pre-mix composition may optionally contain some further electrically conducting material such as iron ore, copper ore, or taconite. Since the electrical conductivity of copper is about six times that of iron, copper-rich aggregates may be used if increased conductivity is desired. Using conductive aggregates will reduce the volume of steel particles and fibers required to maintain stable electrical conductivity.

A second aspect of the present application relates to a concrete composition comprising the concrete pre-mix composition disclosed herein and water in an amount sufficient to form concrete.

The cementitious material and conductive carbon microfibers of this aspect of the present application are similar to those described above.

In various embodiments, the composition is produced as a precast heated concrete panel and then transported to a desired location, or alternatively, may be produced at the desired location of application. One important benefit of using precast concrete technique is that it provides alternative options for constructing heated pavement systems in new or existing pavements and can accelerate construction procedures. Precast heated concrete panel using ECON has the potential to expedite construction work and provide better heat distribution since the precast heated concrete panel would be constructed off-site where quality control and quality assurance can be applied. In addition, the precast heated concrete panel can be tested in terms of heat distribution before transferring them to the job-site. A wet-on-wet process can be achieved between the ECON and PCC layers when precast concrete technology is used, which holds an advantage over two-lift paving and concrete overlay.

In one embodiment, the water-to-cementitious mass ratio (referred to herein as "W/C") may be between 0.1 and 1.0, preferably between 0.25 and 0.5. For example, the W/C may be about 0.25, about 0.30, about 0.35, about 0.40, about 0.45, or about 0.50. In one embodiment, the W/C may be between 0.38 and 0.4 in the absence of a viscosity-modifying agent. In other embodiments, the W/C may be greater than 4.0 in the presence of a viscosity-modifying agent for maintaining cohesion. A high range water reducing agent may be used, and if used, is in most embodiments, applied in a dosage rate of 50% or less of the maximum dosage recommended by the manufacturer.

The carbon microfibers may be present in the composition in an amount between 0.75% to 1% total volume of the concrete composition. For example, the carbon microfibers may be about 0.75% volume, about 0.80% volume, about 0.85% volume, about 0.90% volume, about 0.95% volume, or about 1% volume of the concrete composition. In a preferred embodiment, the carbon microfibers are present in an amount of 0.75% total volume of the concrete composition. Other volumes of the carbon microfibers below 0.75% and above 1% may be useful in the concrete composition described herein, depending on properties of the concrete composition such as electrical conductivity, volume of mortar and paste, fluidity of the paste portion, and overall cohesion of the mixture.

The water may be present in the composition in an amount between 4.0% to 12.0% of the total mass and the cementitious material is present in an amount between 10.0% to 50.0% of the total mass. For example, the water may be about 4.0%, about 4.5%, about 5.0%, about 5.5%, about 6.0%, about 6.5%, about 7.0%, about 7.5%, about 8.0%, about 8.5%, about 9.0%, about 9.5%, about 10.0%, about 10.5%, about 11.0%, about 11.5%, or about 12.0% of the total mass. The water may be present, for example, in a range of between about 4.0% to 12.0%, between about 5.0% to 12.0%, between about 6.0% to 12.0%, between about 7.0% to 12.0%, between about 8.0% to 12.0%, between about 9.0% to 12.0%, between about 10.0% to 12.0%, and between about 11.0% and 12.0%. The cementitious material may be about 10%, about 11%, about 12%, about 13%, about 14%, about 15%, about 20%, about 25%, about 30%, about 35%, about 40%, about 45%, or about 50% of the total mass. The cementitious material may be present in a range of, for example, between about 15% to 50%, between about 20% to 50%, between about 25% to 50%, between about 30% to 50%, between about 35% to 50%, between about 40% to 50%, and between about 45% to 50%.

To prepare the dry concrete pre-mix of the present application for use in construction and paving projects, a pre-determined volume of water is added to the dry pre-mix, and thoroughly mixed with the water to form a thick, viscous slurry which may then be poured into formworks at a work site. The water may chemically react with the constituents of the portland cement, typically anhydrous tricalcium silicate, tricalcium aluminate, dicalcium silicate and tetracalcium aluminoferrite, to form a solid gel of needle-like crystals that comprise an interlocking framework which binds the aggregate and sand particles. When these reactions have been driven to completion, in a process referred to as curing, the concrete slurry is transmitted into a substantially strong, stone-like solid consisting of a matrix of cement crystals interspersed with aggregates and sand particles.

The strength, durability, and appearance of finished or cured electrically conductive concrete in accordance with the present application depends strongly on the thoroughness with which the pre-mix ingredients and water are mixed prior to pouring the concrete slurry. Therefore, electrically conductive concrete in accordance with the present application is often mixed by a machine, either by a motor driven drum at a work site or in central batching and mixing plants, with the fresh concrete being taken to a job site in a revolving drum mounted on a ready-mix truck. However, small batches of electrically conductive concrete may also be mixed by homeowners and other individuals. For these uses, building supply stores and similar establishments sell dry concrete pre-mix in paper bags, typically containing 60 or 90 pounds of material.

A customary method for utilizing individual bags of dry concrete pre-mix for small jobs includes first pouring a pre-determined quantity of water into a mixing container such as a wheelbarrow or shallow rectangular mixing tray. Next, a bag of dry concrete pre-mix may be opened, and the contents of the bag dumped into the mixing container, on top of the water. The water and dry concrete pre-mix, the latter consisting of finely powdered cement (e.g., portland cement), sand, and aggregate, the latter usually consists of gravel of a particular size range, are then mechanically worked to thoroughly mix all the ingredients. The most commonly used method for mixing small batches of concrete consists of repeatedly inserting the blade of a long handled implement such as a hoe into the material in the mixing container, and drawing the hoe repeatedly through the material to intermingle dry concrete pre-mix ingredients with water in the container.

The composition may also include particulate matter including a sorbent and a contaminant absorbed, adsorbed or entrapped by the sorbent where the sorbent and/or contaminant provide an electrical pathway throughout the concrete for conduction of electricity, without a severe deleterious effect upon mechanical properties, such as compressive strength. In such an embodiment, the amount of portland cement, aggregate, water, and particulate matter including a sorbent can be varied in the above weight percentages depending on the physical properties desired in the concrete. Likewise, the composition of the portland cement, aggregate, and particulate matter including a sorbent can be varied depending on the physical properties desired in the concrete.

A third aspect of the present application relates to a method of producing an electrically conductive concrete composition comprising providing the concrete composition disclosed herein; forming the concrete composition into a desired shape; and curing the formed concrete composition.

The cementitious material and conductive carbon microfibers of this aspect of the present application are similar to those described above.

In one embodiment, the method further includes providing an additive selected from the group consisting of a conductivity-enhancing additive, a viscosity-modifying additive, and an air-entraining additive, and mixing the additive with the concrete composition before said forming, in accordance with the previously described aspects.

The method may further include providing a fiber-dispersive agent and mixing the fiber-dispersive agent with the concrete composition before said forming, in accordance with the previously described aspects.

In another embodiment, the method further includes providing a water reducing agent and mixing the water reducing agent with the concrete composition before said forming, in accordance with the previously described aspects.

The application further relates to an electrically conductive cured concrete form produced according to the aspects described herein.

In the presence of an air-entraining additive, water may be applied along with said air-entraining additive to the coarse aggregate. The carbon microfibers, conductivity-enhancing additive, and fine aggregates may be subsequently added and mixed to achieve uniformity. This mixing step may take between about 15 seconds to about 5 minutes (e.g., 30 seconds to 3 minutes) depending on whether a ready-mix concrete plant or truck mixer is used. Cementitious materials, water-reducing agent, and additional water may then be added to the mixer for at least 3 minutes.

A fourth aspect of the present application relates to an electrically conductive cured concrete form comprising a cured concrete matrix and a plurality of conductive carbon microfibers, wherein said conductive carbon microfibers are dispersed in the cured concrete matrix in an amount of 0.75% to 2.00% of the total mass of the electrically conductive cured concrete form and are positioned to effect resistance heating of the cured concrete form upon application of an electrical current.

The electrically conductive cured concrete and carbon microfibers of this aspect of the present application are as described above. The carbon microfibers of this aspect of the present application are dispersed in a cured concrete matrix in an amount of 0.75% to 2.00% of the total mass of the electrically cured concrete form. The carbon microfibers may be, for example, about 0.75%, about 0.80%, about 0.85%, about 0.90%, about 0.95%, about 1.00%, about 1.05%, about 1.10%, about 1.15%, about 1.20%, about 1.25%, about 1.30%, about 1.35%, about 1.40%, about 1.45%, about 1.50%, about 1.55%, about 1.60%, about 1.65%, about 1.70%, about 1.75%, about 1.80%, about 1.85%, about 1.90%, about 1.95%, or about 2.00% of the total mass of the cured concrete form.

A fifth aspect of the present application relates to a system for heating pavement comprising an upper layer comprising the electrically conductive concrete form disclosed herein; a plurality of electrodes positioned relative to said upper layer so that electrical current can flow between the electrodes and through the concrete form in said upper layer; a lower layer comprising a concrete composition positioned below and in contact with said upper layer; and a power supply connected to the plurality of electrodes. A third layer of electrically insulating but thermally conductive polymer or polymer-cementitious material with a thickness of 1-25 mm can be applied on top of the electrically conductive concrete for the sake of safety.

The system may, for example, include an electrically conductive concrete layer referred to herein as an "upper layer", a plain cement layer (e.g., portland cement concrete or slipform concrete) referred to herein as the "lower layer", electrodes, a voltage source, a control unit, and temperature sensors. The plain cement layer may, in certain embodiments, be reinforced or non-reinforced, depending on project-specific structural design. The electrically conductive concrete layer is shown and identified as 12 in FIGS. 10A-10C and is referred to as the "upper layer". The "lower layer", which may contain plain cement layer (e.g., portland cement concrete or slipform concrete) is shown and identified as 14 in FIGS. 10A-10C. Likewise, electrodes 6, voltage source 2, control unit 4, wire 8, temperature sensors 32, base layer 20, subgrade layer 22, and PVC conduit 18 are identified in these figures. In one embodiment, a third layer (i.e., a "top layer") of electrically insulating but thermally conductive polymer or polymer-cementitious material with a thickness of 1-25 mm can optionally be applied on top of the electrically conductive concrete for the sake of safety.

Upper layer 12 of the system includes electrically conductive concrete as described above. Because the electrically conductive concrete has lower resistivity than normal concrete, it behaves like a conductor of electricity. The upper layer may, in one embodiment, be between 1 centimeter and 6 inches deep, for example about 9 centimeters deep or about 3.5 inches deep, depending on the characteristics of the slab. The depth of upper layer 12 is highly variable. The optional top layer of electrically insulating but thermally conductive polymer or polymer-cementitious material can be applied on top of the electrically conductive concrete for safety.

Figures 10A, 10B:
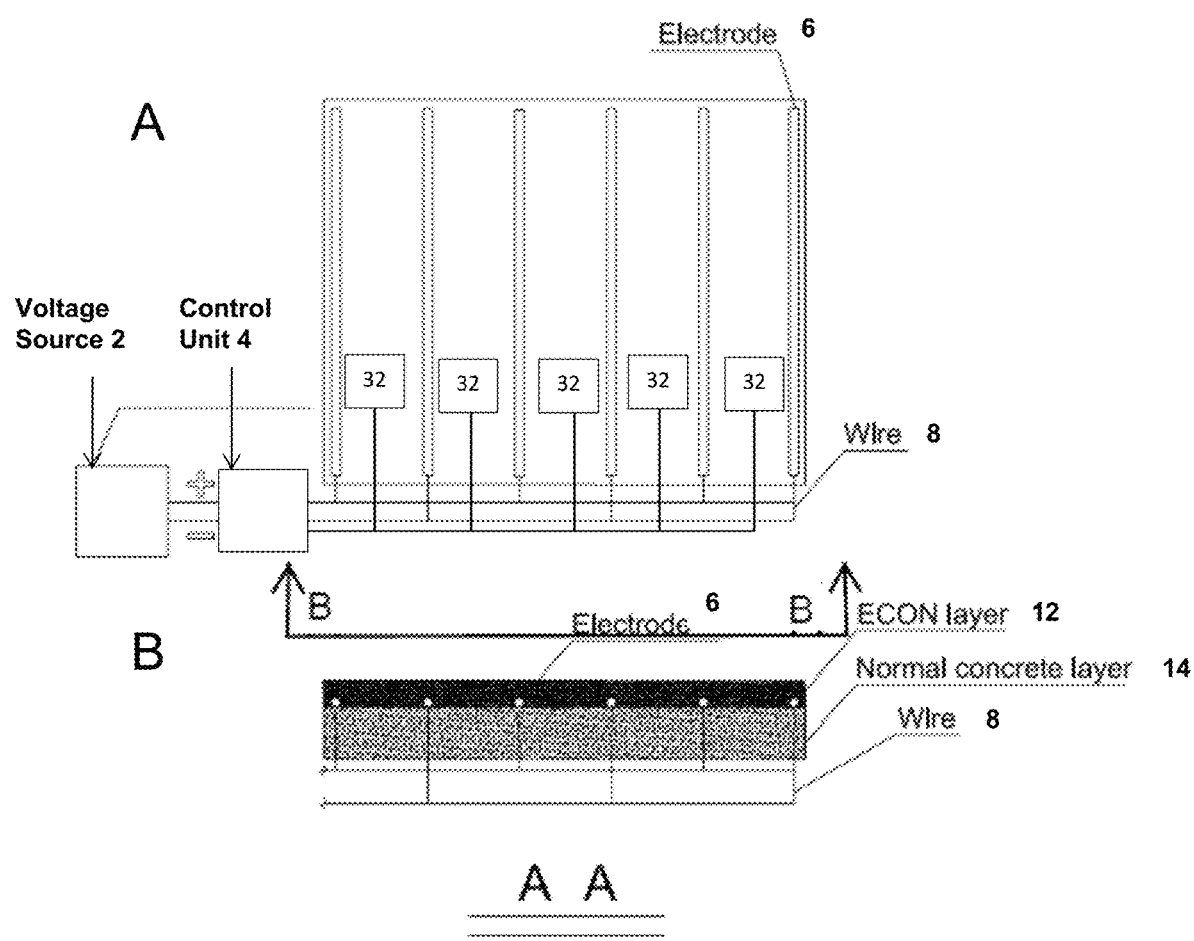
FIGS. 10A-10C show an ECON system.
Figure 10C:
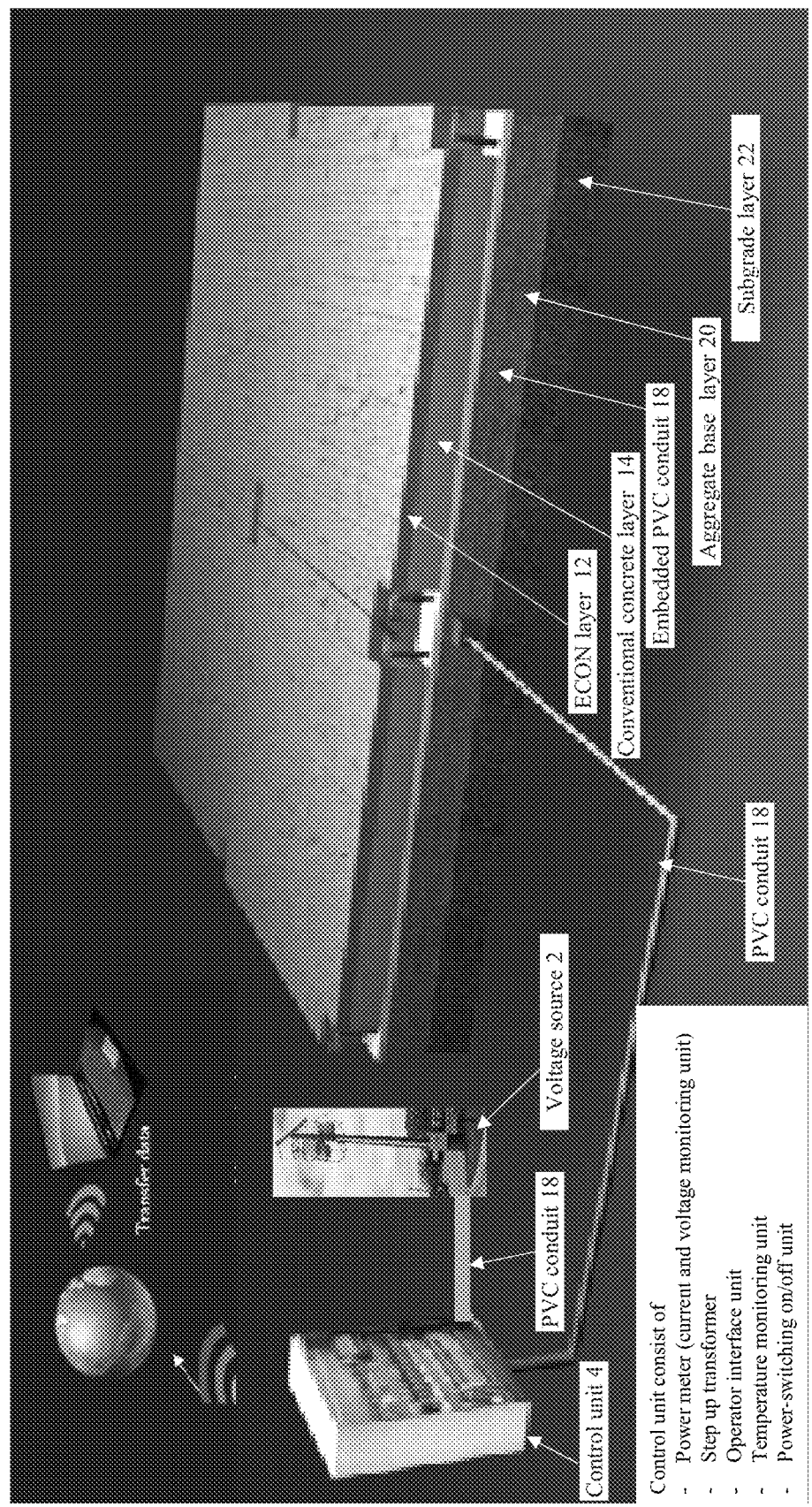

In one embodiment, as shown in FIG. 10C, the system further includes base layer 20 which is below and in contact with lower layer 14. Base layer 20 may be between about 10 centimeters and 10 inches deep, for example 20 centimeters deep, depending on the characteristics of the slab. The system may further include subgrade layer 22 which is below and in contact with base layer 20. In one embodiment, lower layer 14 may range from between 3 centimeters to 10 inches deep, for example about 10 cm deep or about 6.5 inches deep, depending on the characteristics of the slab. The depth of both lower layer 14 and base layer 20 are highly variable. FIG. 10C illustrates the connection between voltage source 2 (e.g., an electricity supply utility) and control unit 4. The connection between the voltage source and the control unit can be made through electricity wires (or cables) in a PVC conduit.

The plurality of electrodes 6 may be positioned relative to upper layer 12 containing the electrically conductive concrete so that electrical current is able to flow between the plurality of electrodes 6 and through upper layer 12. The current flowing through the concrete is used to generate heat by conversion of electrical energy into heat as described supra. Electrodes 6 can be in the form of a smooth circular bar conduit, a flat bar conduit, a hollow circular conduit, and any combination thereof. Electrodes 6 may, in one embodiment, be stainless steel electrodes. Electrodes 6 may range anywhere between 0.5 inches to 2.0 inches in diameter for a smooth circular bar electrode, $3/16$ inch to 1.0 inch in thickness for a flat bar electrode, and $1/8$ inch to 1.0 inch thick for a hollow circular bar electrode. Nylon may be used to anchor electrodes 6 and prevent movement during placement of the electrically conductive concrete layer as well as prevent leakage into the ground due to its resistance to corrosion and insulating properties. Electrodes 6 may be anchored to the lower layer.

In one embodiment, the electrically conductive concrete may be formed of a precast heated concrete panel using electrically conductive concrete technology described herein and further comprising an electrically conductive concrete, a portland cement concrete, electrodes, dowel bars, and slots. In one embodiment, the electrically conductive concrete comprises carbon fibers that produce an ECON mixture with an electrical resistivity of 1,000 'Ω-cm or less at 20° C.

In one embodiment of the precast heated concrete panel, embedded electrodes in the ECON layer are connected to alternative current (AC) to generate heat due to resistive heating. A thin ECON layer (top layer) is placed on a thick PCC layer (bottom layer). At least two electrodes are placed on the PCC layer before placing the ECON layer. Smooth stainless steel 316L is used as electrodes due to its resistance to corrosion.

In one embodiment, the precast heated concrete panel includes dowel bars and slots to transfer loads between panels. In another embodiment, the electrically conductive concrete can be cured by carbon dioxide in the precast production process to improve electrical conductivity. In yet another embodiment, the electrically conductive concrete can be modified by supercritical carbon dioxide to improve the electrical conductivity, while, sequestering a quantity of carbon dioxide inside the concrete panels.

Figures 22A, 22B, 22C:
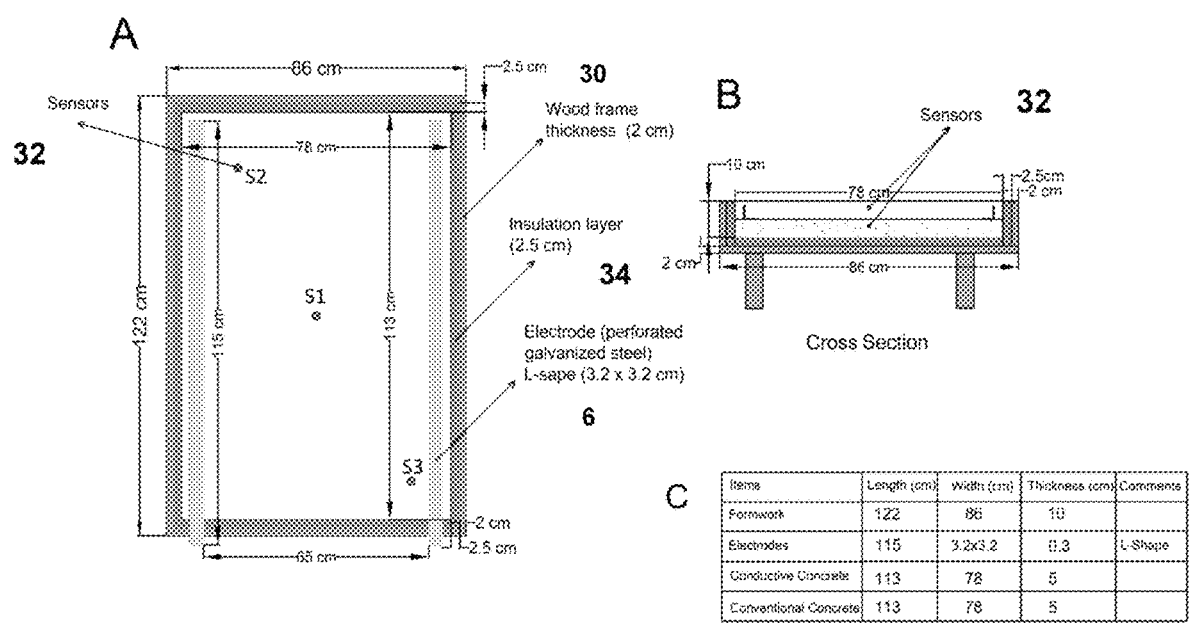
FIGS. 22A-22C depict the dimensions and configuration of a laboratory-scale ECON HPS slab.

In one embodiment of the system described herein, electrodes 6 are between 3 and 6 feet apart from one another. Other ranges of electrode spacing may be useful, both less than 3 feet apart and more than 6 feet apart, depending on the properties of the electrically conductive concrete such as thickness, slab size, required amount of electric power, and design current flow (which is designed based on the amount of snow/ice that needs to be melted and associated power density requirements). The power density requirement may be determined based on a number of factors including rate of snowfall, air temperature, relative humidity, wind speed, dimensions of the slab, and pavement characteristics. The slab may be surrounded by wood frame 30, as shown in FIG. 22A, and can contain further insulation layer 34. The wood frame may, in one embodiment, be removed once the slab is fully formed. Wood frame 30, as shown in FIG. 22A, is useful for providing structural support when forming and curing the concrete composition.

Figure 16:
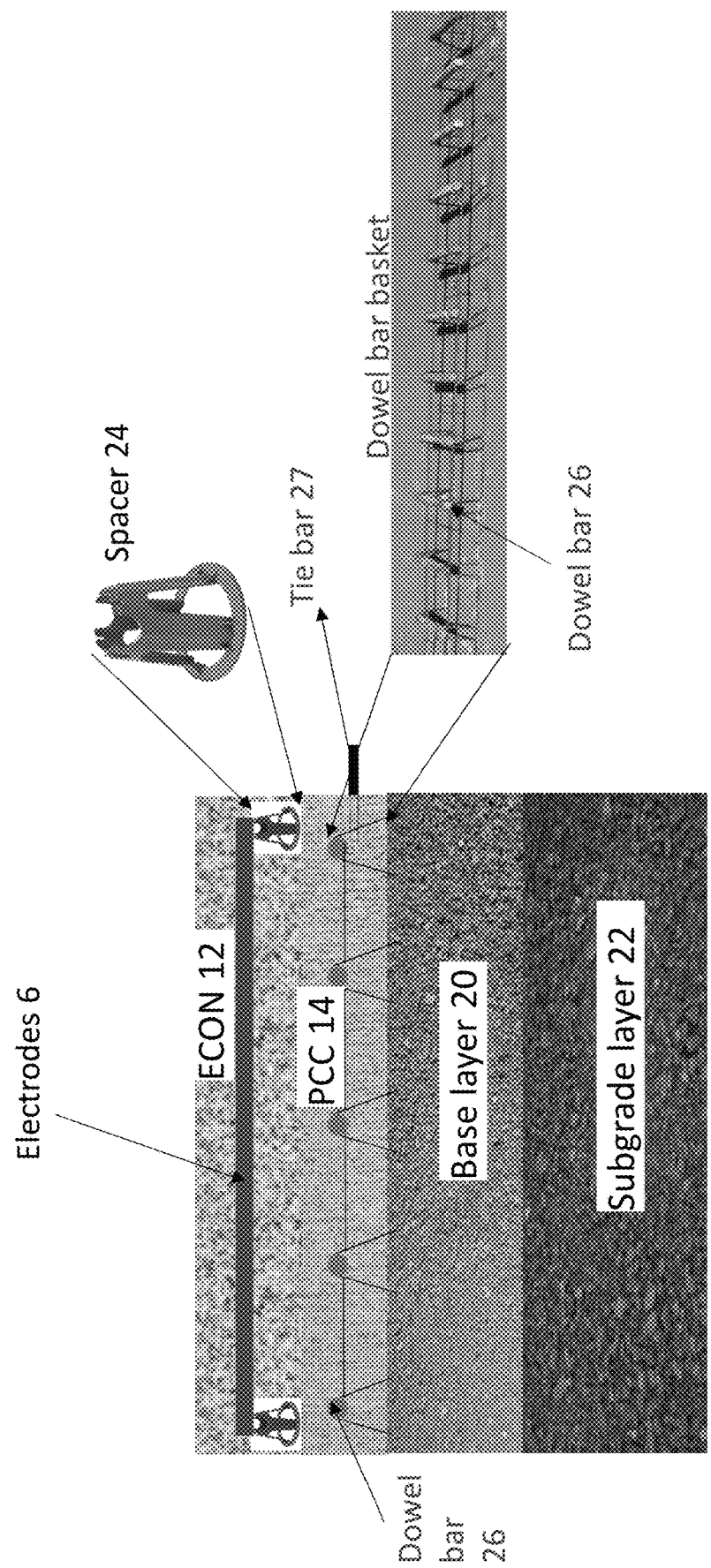
FIG. 16 depicts a cross-sectional view of part of a pavement system, showing the use of spacers to bring electrodes closer to the ECON surface.

In one embodiment, as shown in FIG. 16, spacers 24 may optionally be used to bring electrodes 6 close to the surface of the concrete. The use of spacers 24 may increase the efficiency of heat generation.

The system may further include a plurality of dowel bars 26 and a plurality of tie bars beneath the lower layer 14. As shown in FIG. 16, dowel bars (also referred to as dowels) are short steel bars that provide a mechanical connection between slabs without restricting transverse joint movement. A dowel bar basket (also referred to as dowel basket) is an assembly of dowel bars to hold those at the specified height prior to concrete placement. Tie bars as recited herein include, for example, short deformed steel bars placed in longitudinal joints for connecting slabs. Tie bar baskets as shown herein is an assembly of tie bars 27 (similar to a dowel bar basket). Dowel bars and tie bars are illustrated in FIGS. 17-20.

The dowel bars 26 and tie bars 27 cover base layer 20, so that electrodes 6 may be installed above the surface of base layer 20. Dowel bars 26 may be short steel bars that provide a mechanical connection between slabs without restricting horizontal joint movement. Dowel bars 26 may increase load transfer efficiency by allowing the leave slab to assume some of the load before the load is actually over it. This reduces joint deflection and stress in the slab(s). Rod 36, as shown in FIG. 26B, can be made of a durable material, such as stainless steel and may be placed vertically within a slab to provide support for the load.

As shown in FIG. 10C, the system may further include one or more conduits 18 in communication with a junction box which may be housed in the voltage source 2 and adjacent to control unit 4. The conduits 18 may be formed of any suitable material, including, for example, PVC, which can be used to protect and house wires 8 (which are shown in FIG. 10A) leading to electrodes 6 and sensors 32. Conduits 18 may be placed inside a trench for PVC conduits 28.

As shown in FIG. 10A, temperature sensors 32 can detect the temperature of the concrete slab at multiple and various points throughout the slab. Sensors 32 are connected to control unit 4 to permit voltage source 2 be turned on and off depending on the temperature of the slab. As a result, the slab will be heated or not heated.

Besides voltage source 2 and control unit 4, the system of FIG. 10A-10C can include, for example, a power meter which monitors current and voltage from voltage source 2. A power switching unit can be used to turn the power on or off. Voltage source 2, control unit 4, the power meter, and power switching unit can be housed together.

Temperature sensors 32 may transmit the temperature of upper layer 12 (or other layers such as lower layer 14) to a data acquisition system to determine the temperature of the respective layer of the heating pavement system, as shown in FIG. 10C. The data acquisition system may be connected to a computer or program which records the temperature of the layer of the heating pavement system and monitors changes in the temperature.

Figure 17:
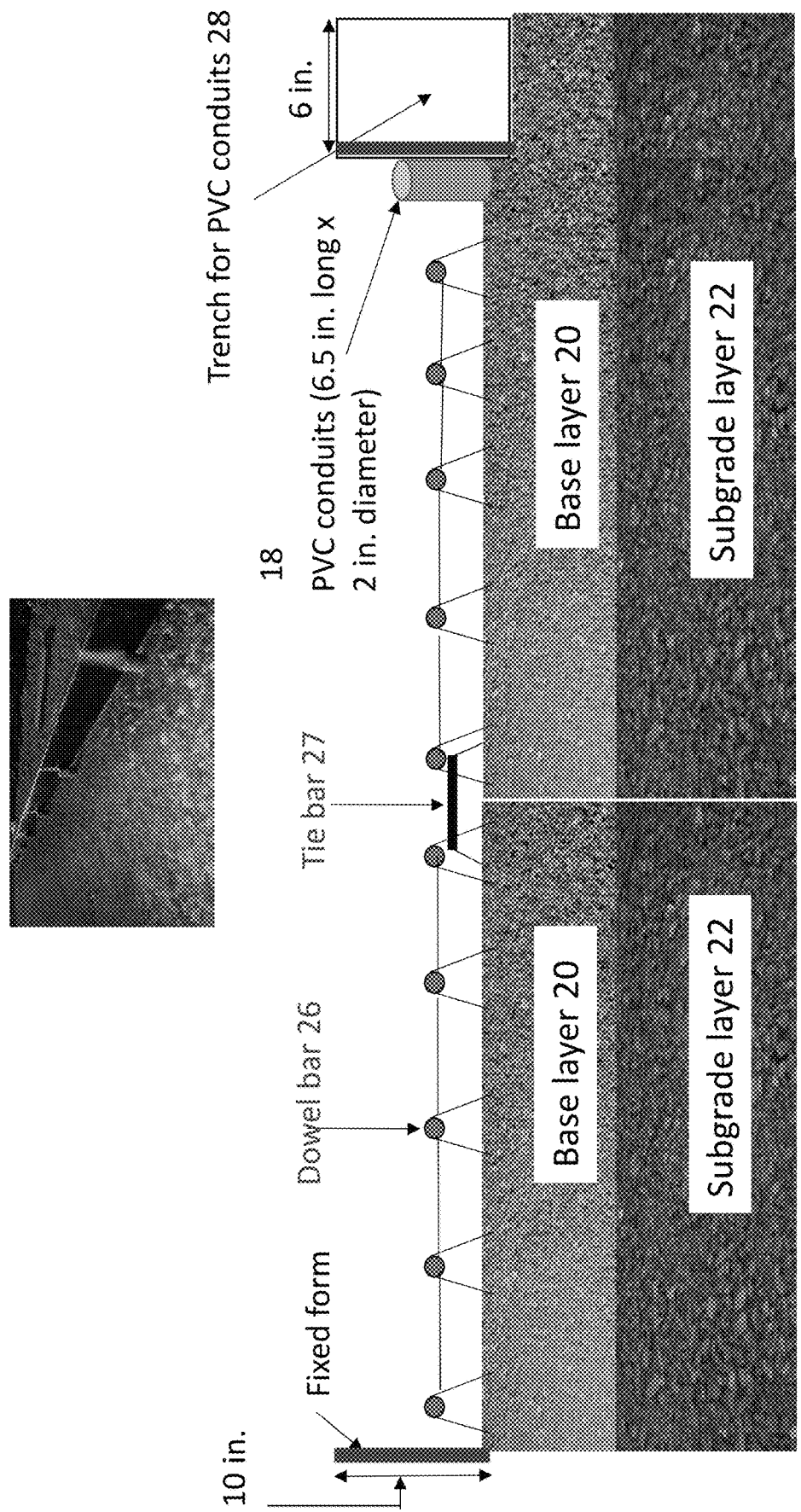
FIG. 17 depicts a cross-sectional view of part of a pavement system, showing the preparation of a base layer with installed dowel bar baskets, and PVC conduits (step 1).

The first step of preparing the ECON system in accordance with the present invention involves preparing base layer 20 with installed dowel bars 26, and PVC conduits 18, as shown in the cross-sectional view of FIG. 17. Base layer 20 is placed directly above subgrade layer 22. Dowel bars 26 may appear in any pattern directly above base layer 20, for example in a linear or random geometric pattern. PVC conduit 18 may be adjacent to trench 28 for PVC conduit 18 with trench 28 placed anywhere throughout the ECON system. Trench 28 may be, for example, between 6 and 10 inches high and about 6 inches in diameter. PVC conduit may be, for example between 4 and 6 inches long and between about 1 and 3 inches in diameter. The dimensions shown in this and subsequent figures can be altered to accommodate project-specific requirements.

Figure 18:
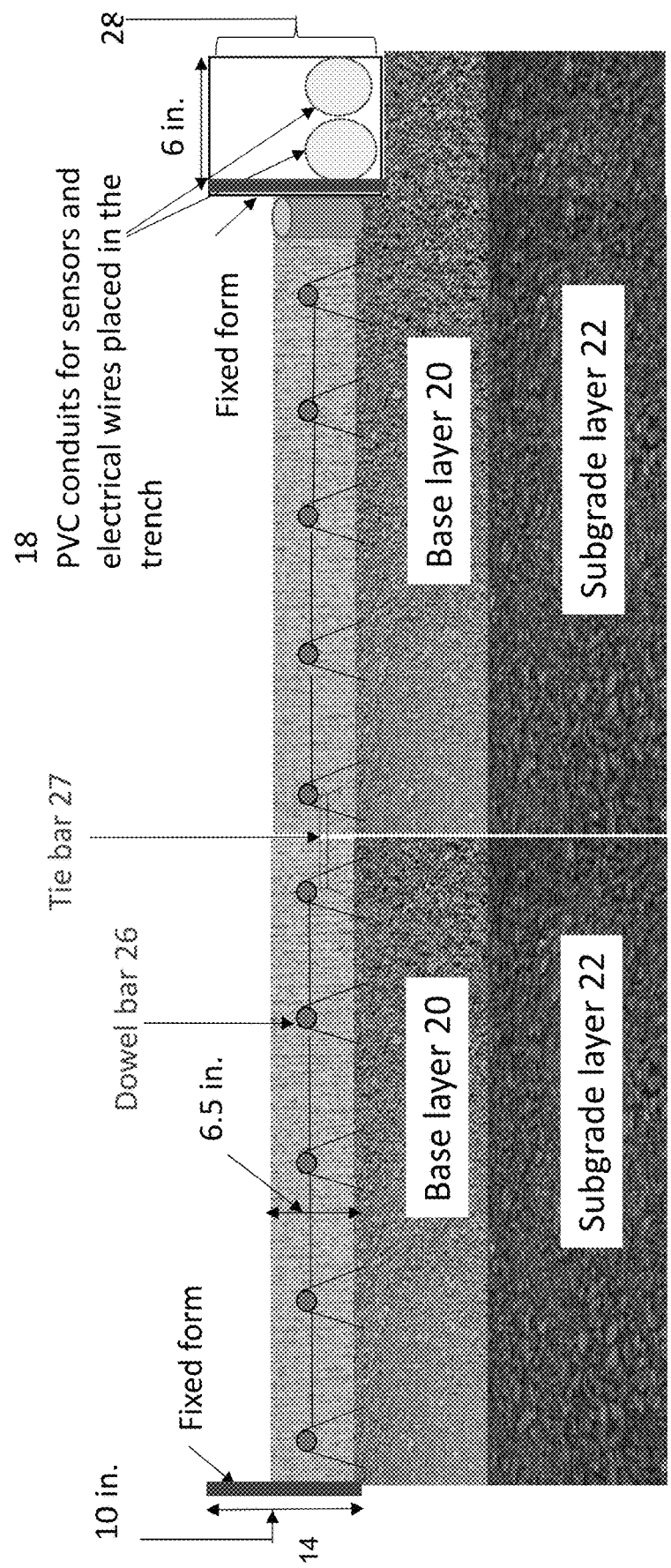
FIG. 18 shows a cross-sectional view of part of a pavement system, showing the placing of the portland cement concrete ("PCC") (step 2).

The second step of preparing the ECON system in accordance with the present invention involves placing of plain cement concrete 14, as shown in FIG. 18 above base layer 20, which is above subgrade layer 22. Plain cement concrete 14 is poured directly over base layer 20 and provides a cement layer around dowel bars 26 and PVC conduit 18. PVC conduit 18 may be placed in trench 28.

Figure 19:
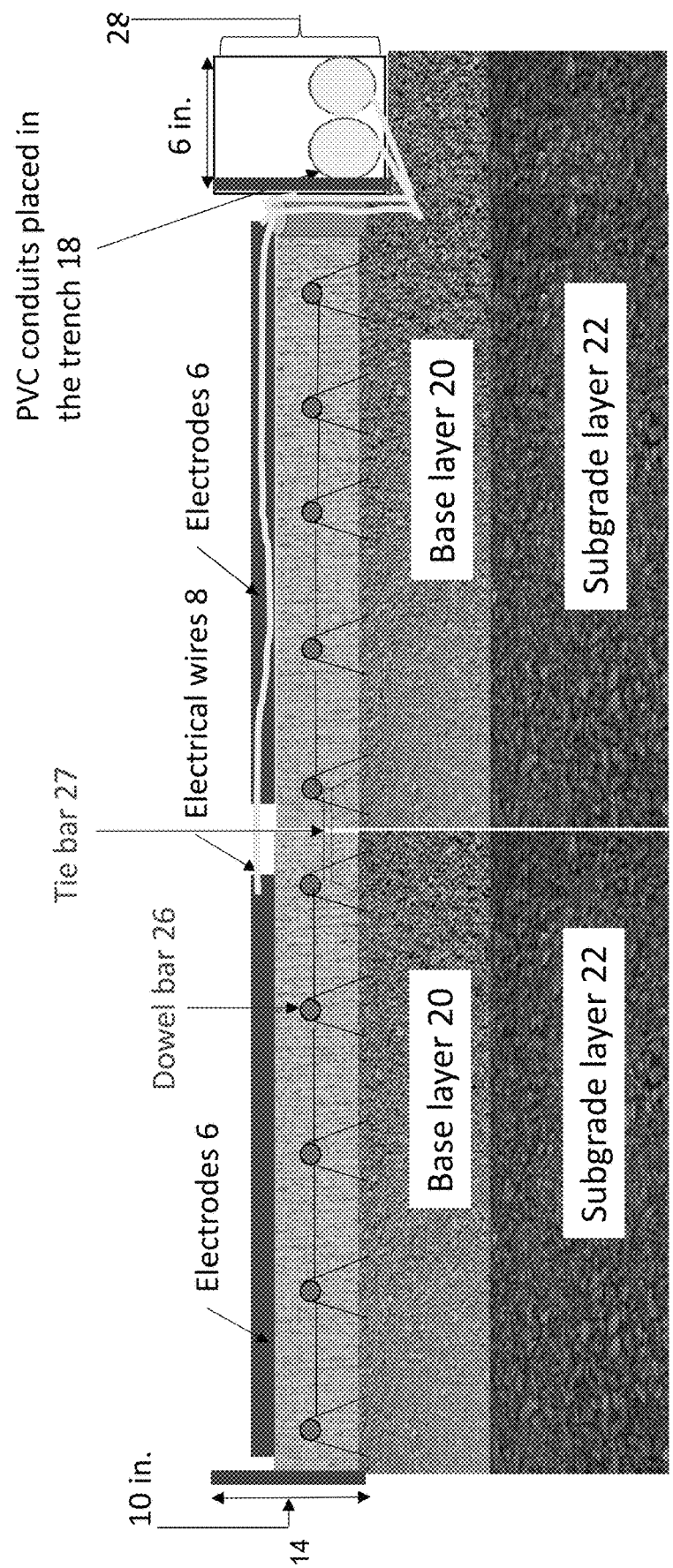
FIG. 19 depicts a cross-sectional view of part of a pavement system, showing the placing of the electrodes and sensor system, and making electrical connection for electrodes (step 3).

The third step of preparing the ECON system in accordance with the present invention, as shown in FIG. 19, involves placing of electrodes 6 and sensors 32 above plain cement concrete 14, which is above base layer 20 and subgrade layer 22. This third step further involves making electrical connections for electrodes 6 using, for example, electrical wires 8. Electrodes 6 and electrical wires 8 may be placed directly above plain cement concrete layer 14 and are passed through PVC conduit 18 directly into trench 28. Electrodes 6 may be any suitable distance apart, for example between 3 and 6 feet apart from one another. The suitable spacing for electrodes 6 will vary depending on the properties of the ECON system, such as slab thickness, slab size, required electrical power, and current flow which is based on the amount of snow/ice to be melted.

Figure 20:
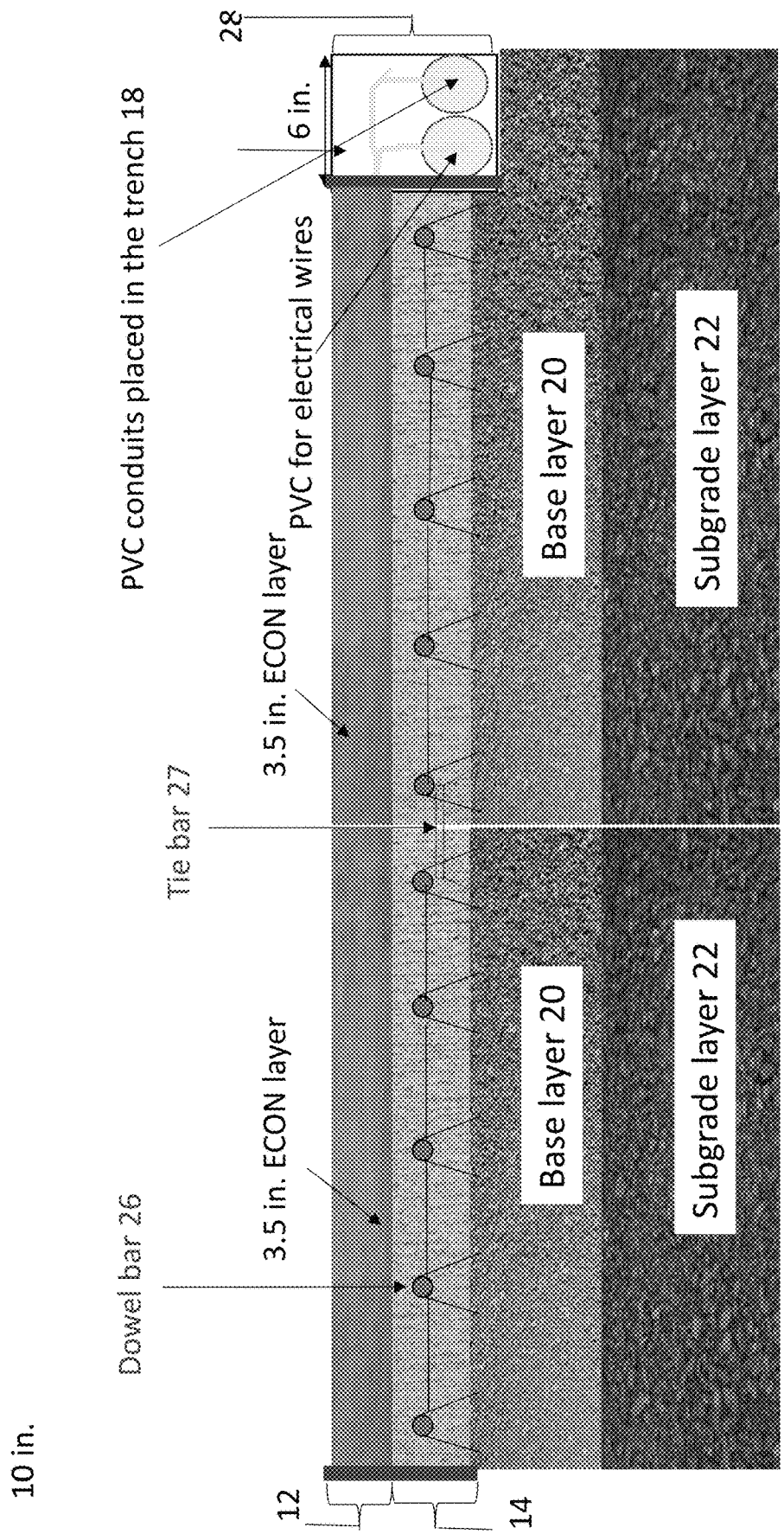
FIG. 20 shows a cross-sectional view of part of a pavement system, showing the placing the ECON layer (step 4).

The fourth step of preparing the ECON system, as shown for example in FIG. 20, involves placement of ECON layer 12 above plain cement concrete layer 14, which is directly above base layer 20 which is directly above subgrade layer 22. The ECON layer may be poured directly over electrodes 6 and sensors 32 and may cure directly around electrodes 6 and sensors 32. Trench 28 may remain free of cement and may contain PVC conduits 18, electrodes 8, and electrical wires 8. Nylon materials may optionally be used to anchor and fix electrodes 8 to prevent movement during the placement of ECON layer 12 and also prevent current leakage into the ground because of its resistance to corrosion and insulating properties. Electrodes 6 may be anchored to plain cement concrete layer 14.

Figure 21:
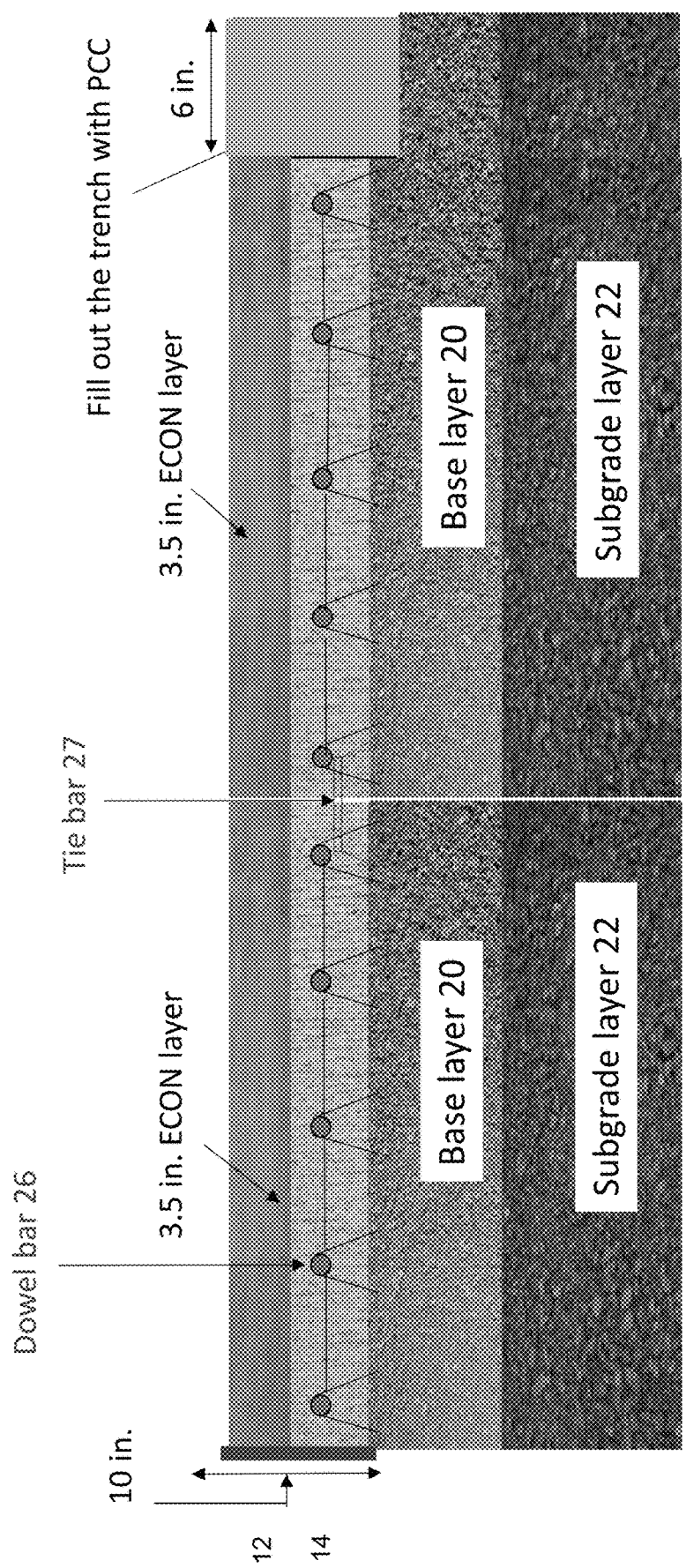
FIG. 21 illustrates a cross-sectional view of part of a pavement system, showing the filling out the trench with PCC (step 5).

The fifth step of preparing the ECON system of the present invention is shown in FIG. 21 and illustrates the filling out trench 28 with plain cement concrete that is not conductive. The ECON system then may be allowed to cure.

The dimensions and configuration of a laboratory-scale ECON HPS slab are exemplified in FIGS. 22A-22C. A prepared slab is depicted in FIGS. 22A-22B and shown surrounded by wooden frame 30 which may optionally be removed after the slab is fully prepared.

Figure 28:
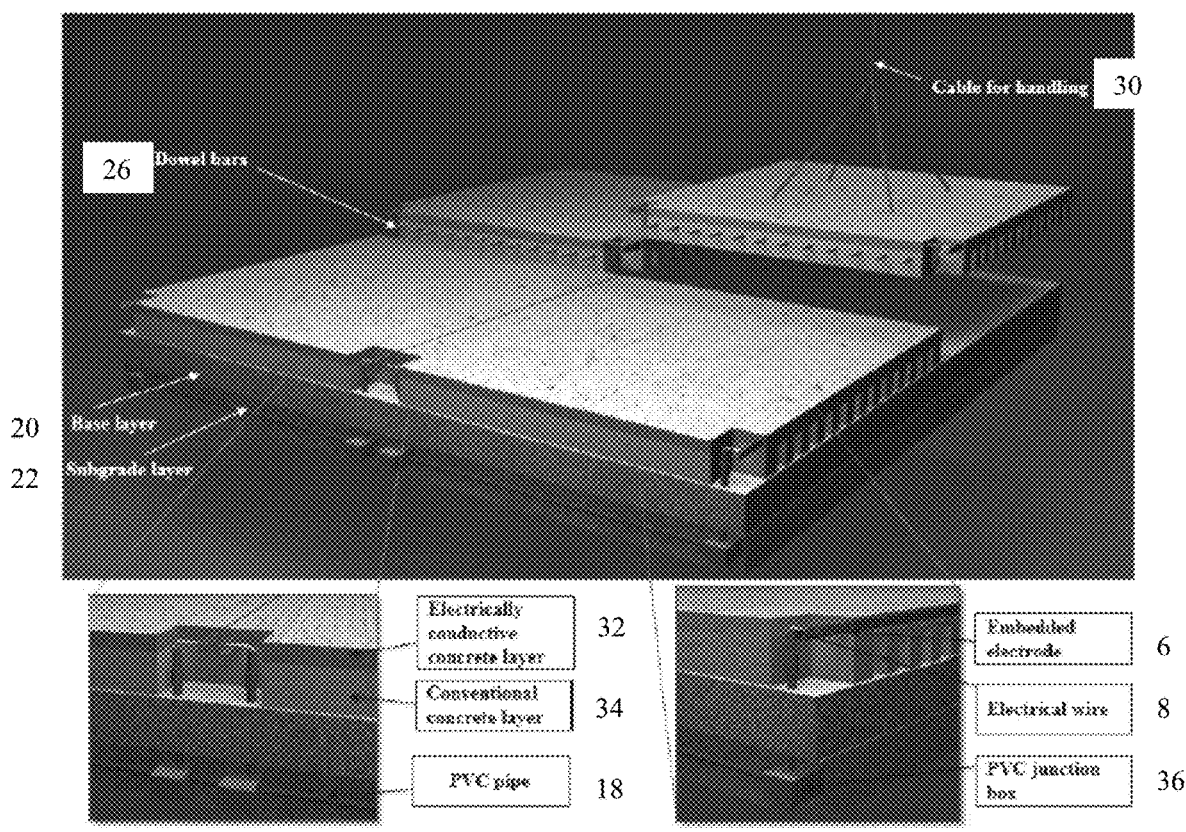
FIG. 28 shows three-Dimensional (3D) renderings for construction of precast heated concrete panel using electrically conductive concrete technique.

In one embodiment, as shown in FIG. 28, the system includes ECON HPS construction with the precast concrete technique. A thin ECON slab 32 can be precast with a conventional concrete slab 34 to construct a large-scale ECON heated slab by two-lift approach. Further included is base layer 20 which is below and in contact with a conventional concrete slab at lower layer 34. Base layer 20 may be between about 10 centimeters and 10 inches deep, for example 20 centimeters deep, depending on the characteristics of the slab. The system may further include subgrade layer 22 as described in previous aspects and embodiments, which is below and in contact with base layer 20. In one embodiment, the lower layer conventional concrete slab 34 may range from between 3 centimeters to 10 inches deep, for example about 10 cm deep or about 6.5 inches deep, depending on the characteristics of the slab. The depth of both lower layer 34 and base layer 20 are highly variable. FIG. 28 illustrates cable 30 for handling placement of thin ECON slab 32 (i.e., the upper slab) and placement of the conventional concrete slab 34 (i.e., the lower slab). The connection between the voltage source and the control unit can be made through electricity wires (or cables) in a PVC conduit.

The precast construction may further include a plurality of dowel bars 26 and a plurality of tie bars beneath the conventional concrete slab (i.e., lower layer) 34. As shown in FIG. 28 and as described in previous aspects and embodiments, dowel bars (also referred to as dowels) are short steel bars that provide a mechanical connection between slabs without restricting transverse joint movement. A dowel bar basket (also referred to as dowel basket) is an assembly of dowel bars to hold those at the specified height prior to concrete placement.

As described in the previous aspects, dowel bars 26 cover base layer 20, so that embedded electrodes 6 may be installed above the surface of base layer 20. Dowel bars 26 may be short steel bars that provide a mechanical connection between slabs without restricting horizontal joint movement.

Moreover, electrodes 6 and electrical wires 8 may be placed directly above the conventional concrete layer 34 and are passed through PVC conduit/pipe 18. PVC junction box 36 may be used to accommodate electrical wires 8 for the electrode system 6. Electrodes 6 may be any suitable distance apart, for example between 3 and 6 feet apart from one another. The suitable spacing for electrodes 6 will vary depending on the properties of the ECON system, such as slab thickness, slab size, required electrical power, and current flow which is based on the amount of snow/ice to be melted.

The system of the present application unexpectedly solves the problem of heating uniformly in light of mixture cohesion. The system of the present application, for the first time, accounts for a factor other than electrical conductivity as a key parameter of the performance of electrically conductive concrete (e.g., factors such as, but not limited to, distribution of cementitious material and carbon microfibers in cement, mass percent of the carbon microfibers, carbon microfiber type, and carbon microfiber size). The present application provides a predictable system, the behavior of which can be pre-analyzed and numerically modelled with high accuracy prior to construction.

EXAMPLES

The following examples are provided to illustrate embodiments of the present application but they are by no means intended to limit its scope.

Figure 2:
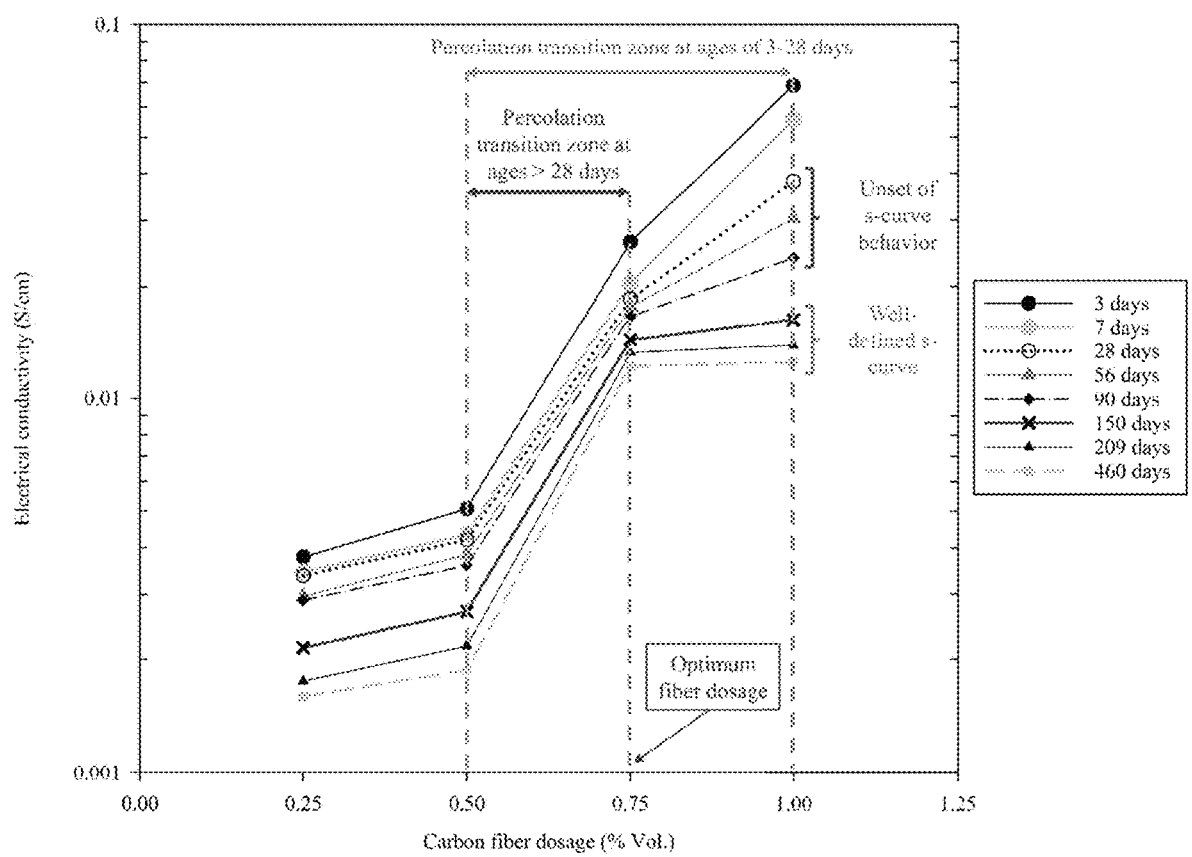
FIG. 2 shows percolation threshold and optimum volume fraction of carbon microfibers in concrete measured at different ages.
Figures 3A, 3B, 3C, 3D, 3E:
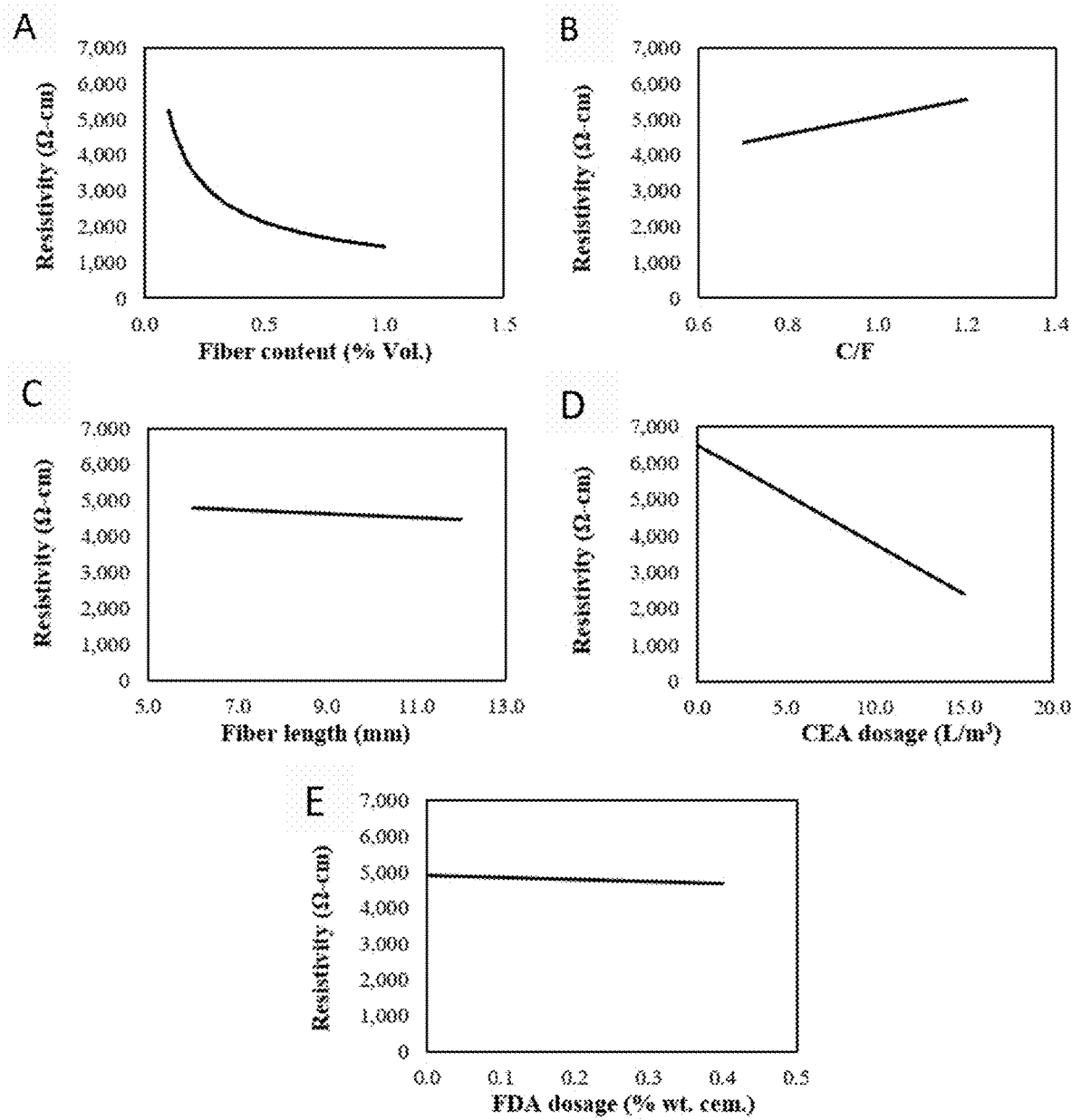
FIGS. 3A-3E exhibit individual effects of variables for electrical resistivity response.
Figures 4A, 4B, 4C, 4D:
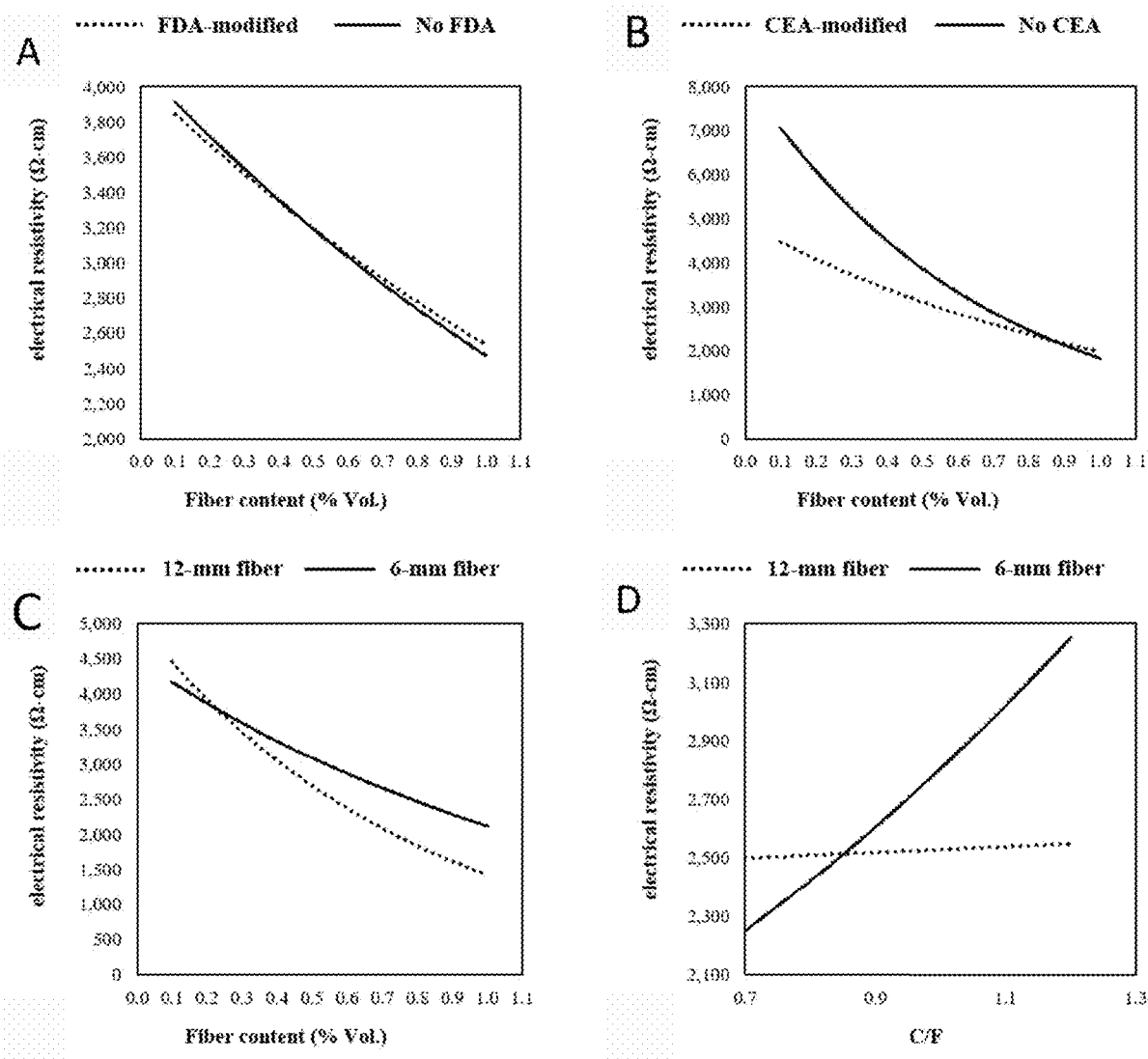
FIGS. 4A-4D illustrate synergic effects of variables on electrical resistivity response.
Figures 5A, 5B, 5C, 5D, 5E:
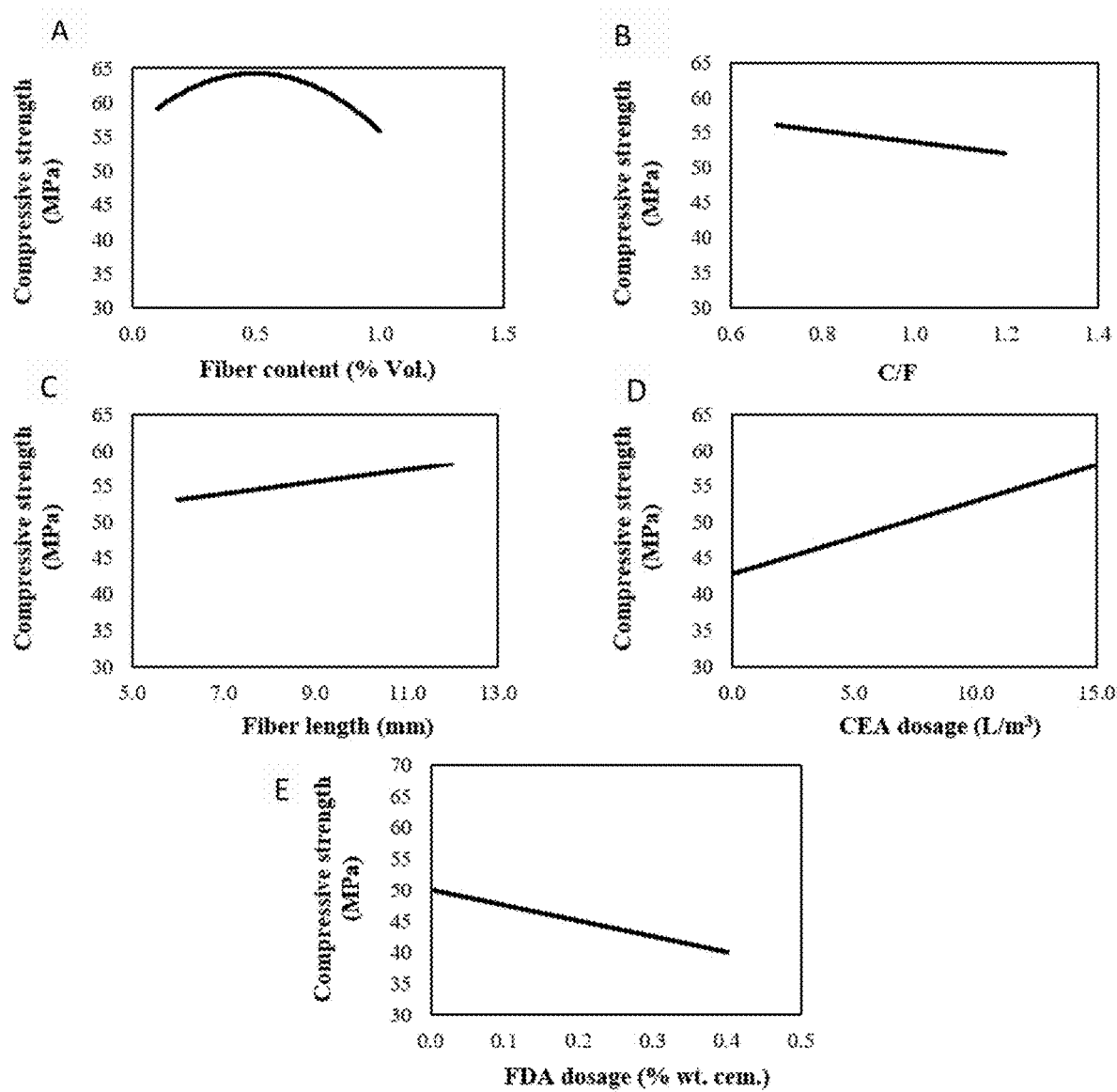
FIGS. 5A-5E show individual effects of variables on compressive strength of ECON.
Figures 6A, 6B, 6C, 6D, 6E:
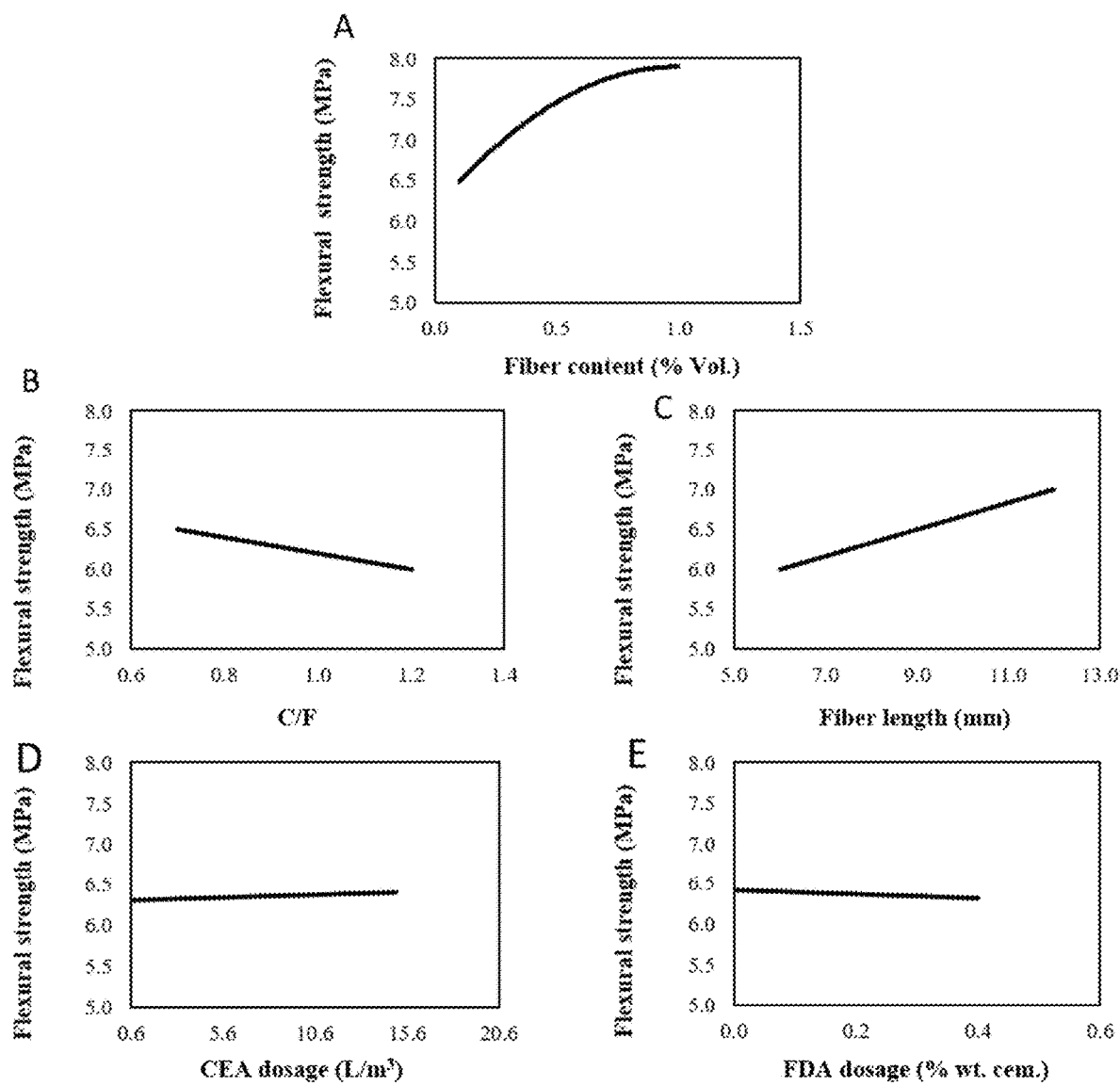
FIGS. 6A-6E show individual effects of variables on flexural strength of ECON.
Figure 7A:
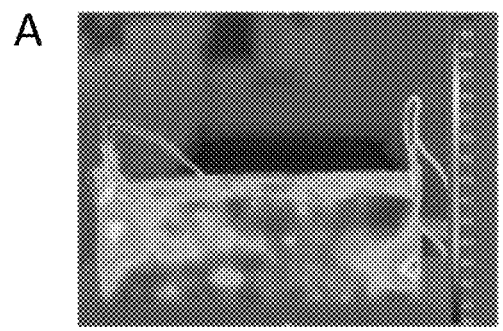
FIGS. 7A-7D illustrate heating performance of ECON beams with poor-cohesion and good-cohesion mixtures.
Figure 7B:
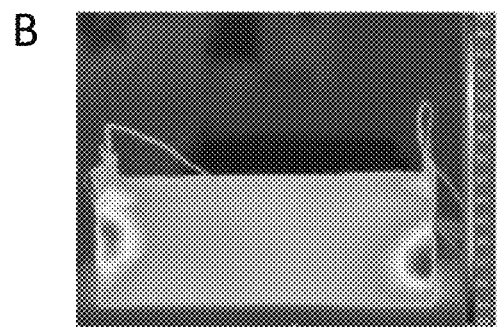
Figure 7C:
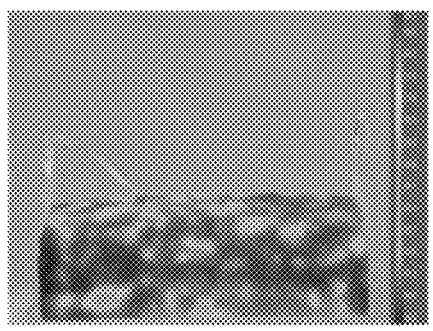
Figure 7D:
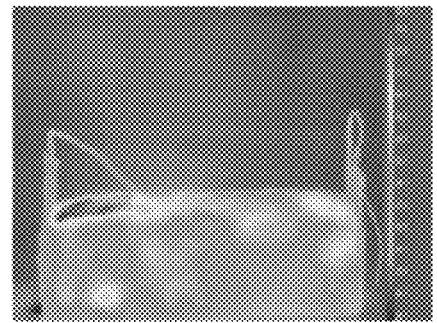
Figures 8A, 8B:
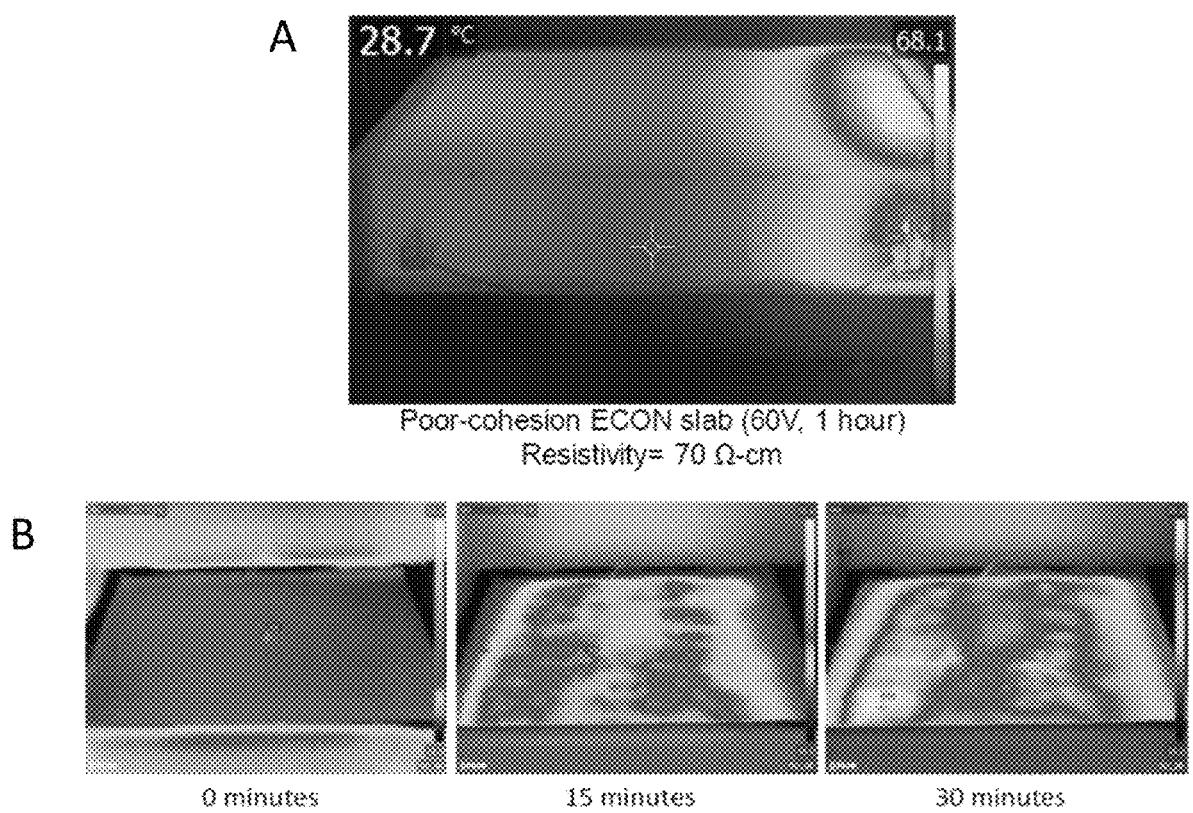
FIGS. 8A-8B describe heating performance of ECON beams prepared with poor-cohesion and good-cohesion mixtures.

Example 1—Mixture Composition and Method for Design and Production of Electrically Conductive Concrete Optimum carbon fiber dosage is defined as a carbon fiber volume above which additional fiber does not exert significant improvement on conductivity. This optimum fiber content is known as the percolation threshold. The percolation threshold of carbon microfibers in different cementitious composites, i.e., cementitious paste, mortar, and concrete, are given in FIG. 1 and FIG. 2. The unprecedented method for determining the optimum carbon microfiber fraction in an electrically conductive concrete (for application in HPS) is proposed in here, that is based on measurement of electrical resistivity with variation of carbon fiber dosage rate at ages later than 90 days, if the concrete specimens are constantly cured in appropriate temperature and moisture conditions. Therefore, based on the results, it is concluded that unlike the currently available recipes for ECON, there is no need for using carbon microfibers in dosages greater than 1% of the total concrete volume and the optimum carbon fiber volume fraction is 0.75% of the total volume of concrete.

The mixture composition can be proposed only in light of the individual and synergic effects of different mixture components on the electrical, mechanical, and rheological properties of concrete. The main variables influencing the mixture characteristics are given in Table 1. The individual and synergic effects of the main variables on electrical resistivity (i.e., the reciprocal of electrical conductivity) are shown in FIGS. 3A-3E and FIGS. 4A-4D. FIGS. 5A-5E and FIGS. 6A-6E, respectively, which present the individual effects of the main ECON mix design variables on compressive strength and flexural strength.

TABLE 1

Main Variable Influencing the ECON Properties.

| Variable | Unit | Levels | | Variable Type |
|---|---|---|---|---|
| Carbon Fiber Content | % of total mix volume (% Vol.) | 0.1 | 1.0 | Continuous |
| Carbon Fiber Length | Mm | 6.0 | 12.0 | Categorical |
| C/F | N.A. | 0.7 | 1.2 | Continuous |
| FDA dosage | % of the cement weight | 0.0 | 0.4 | Continuous |
| CEA dosage | kg/m$^3$ | 0.0 | 15.0 | Continuous |

Note:
N.A.—Not Applicable.

As far as the ECON mixture composition is concerned, the performance of an HPS is not only dependent on electrical conductivity of the concrete as already reported in the existing literature and existing patents, but also significantly influenced by the fluidity of the paste portion of the ECON and overall cohesion of the mixture. As seen in FIGS. 7A-7D and FIGS. 8A-8B, poor cohesion of ECON results in non-uniform heating and heat concentration in the vicinity of electrodes even with very high electrical conductivity. The ECON mixtures with good cohesion and electrical conductivity that is lower than that of poor-cohesion mixtures provided superior performance in terms of heat generation and heat distribution. The application described herein uniquely provides ECON mixture compositions that, with any given electrical conductivity, provide acceptable heating performance.

Figure 9:
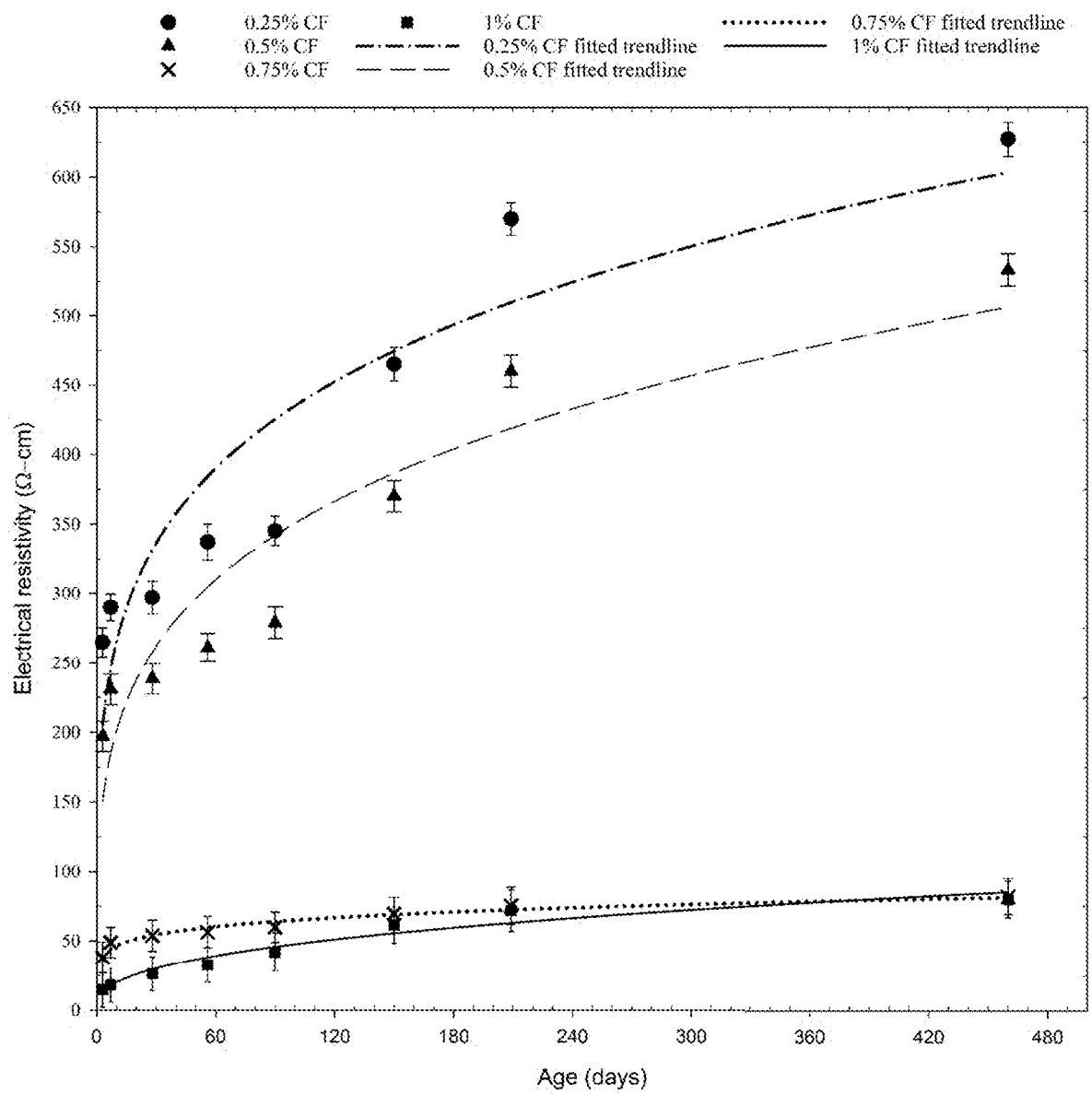
FIG. 9 shows evolution of electrical resistivity with age in ECON containing different carbon microfiber volume fractions.

The ECON mixture composition proposed for application in an electrically-heated pavement system include 0.75-1% (Vol.) carbon microfiber with optimum fiber volume fraction of 0.75% (Vol.). The carbon microfiber which is used as electrically conductive additive should be polyacrylonitrile (PAN)-based and may have an aspect ratio between 800 and 900. An alternative fiber composition is the combination of 0.75% carbon microfiber with aspect ratio of 800-900 and 0.25% carbon microfiber with aspect ratio of 400-500. Application of calcium nitrite solution as conductivity-enhancing admixture is proposed. Methyl cellulose in a dosage rate of 0.2% by weight of cementitious materials can be used as fiber-dispersive agent (FDA). If paste is defined as water and cementitious materials, the volume ratio of paste to voids-in-aggregate should be between 2-3 (depending on the selected mixture composition) in order to attain adequate workability. Water-to-cementitious mass ratio (W/C) should be between 0.38 and 0.4 in absence of viscosity-modifying agent to maintain the cohesion of the ECON mixture. If W/C is greater than 0.4, the use of viscosity-modifying agent is mandatory for maintaining the required cohesion. The W/C should not exceed 0.42 and the high range water reducing (HRWR) agent should not, under any circumstances, be used in a dosage rate greater than 50% of the maximum dosage recommended by the manufacturer. The proposed mixture composition ensures that the ECON maintains its serviceability during the design service life that conforms to pavement standards (20-40 years), and its longevity could be extended well beyond the 20-40 year pavement standard. As shown in FIG. 9, if the carbon microfiber is within the proposed range and the mixture composition is within the given limits, the electrical resistivity of the ECON will be acceptably low throughout the service life. As seen in the figure, the rate of resistivity increases in ECON with carbon microfiber dosage rates of 0.75% and 1% becomes very slow before the first year of continuous hydration. Therefore, with adequately low electrical resistivity, adequate performance during the whole service life is ensured.

The general steps in the mixing procedure proposed for ECON production include, but not limited to, the following steps. First, coarse aggregate with a portion of water is fed into the mixer. If air-entraining admixture (AEA) is to be used, it should be added with the water in this step. In presence of AEA, the mixture should be mixed until foam appears on the aggregates. In the absence of AEA, the next step can immediately follow the first. Second, carbon fiber, conductivity-enhancing agent, and fine aggregates are added and mixed to achieve uniformity. In laboratory-scale, this step takes at least 3 minutes of mixing. In a ready-mix concrete plant or truck mixer, 30 seconds-3 minutes would be adequate. Third, cementitious materials, water-reducing agent, and the rest of water are fed into the mixer and mixed for at least 5 minutes. It should be mentioned that this mixing procedure can be altered if required. However, it is recommended to keep with the recommended mixing sequence for optimum mixture properties.

Example 2—System Design

A schematic presentation of an ECON HPS system and its control/connection systems are provided in FIGS. 10A-10C.

Figure 11:
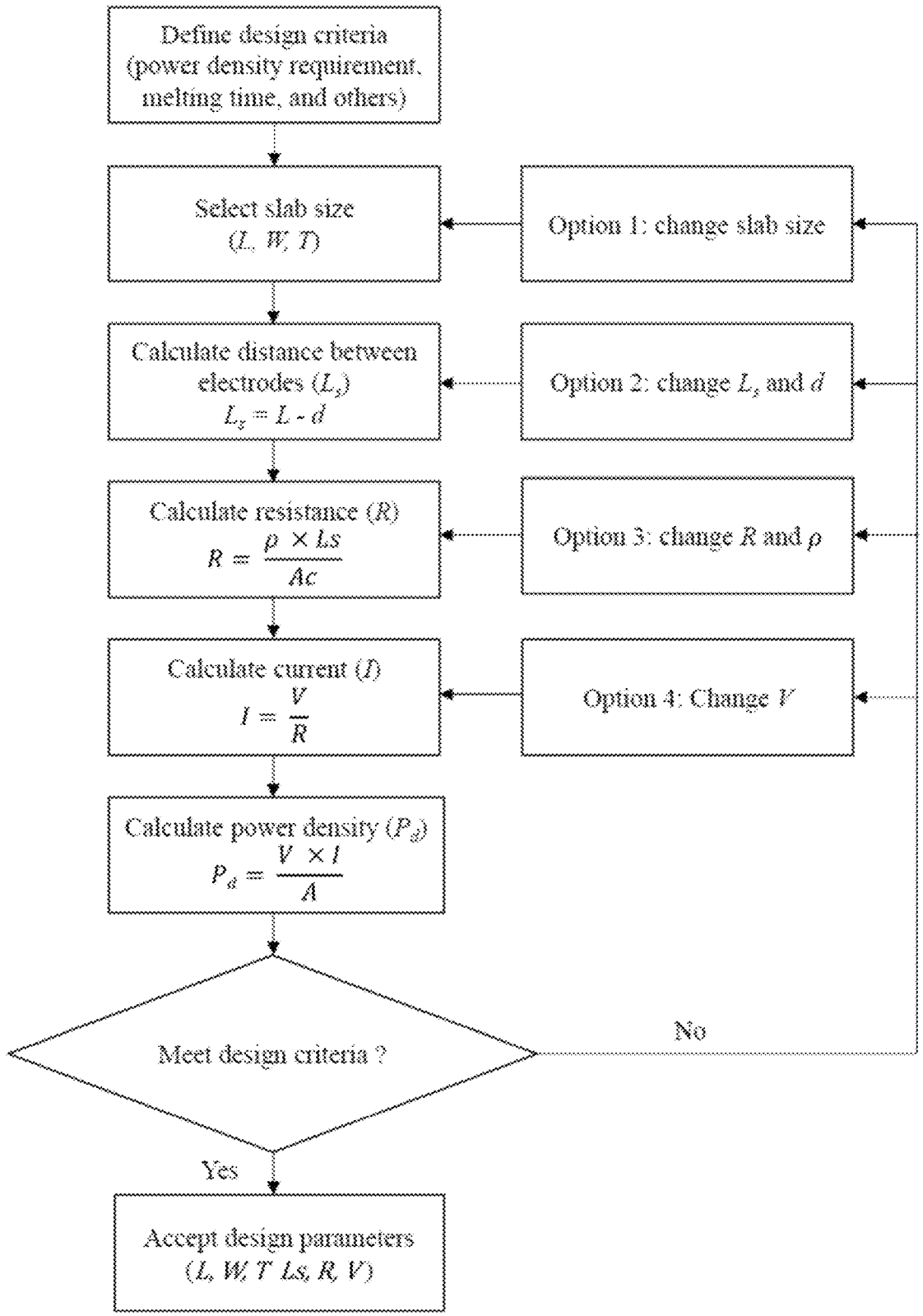
FIG. 11 is a design flow diagram for a large-scale ECON heated slab.

The design flow for a large-scale ECON heated slab is developed and illustrated in FIG. 11. The first step involves determining the design criteria, which include snow- and ice-melting time, amount of snow and ice to be melted, and the associated power density requirement. Design parameters to be determined include slab dimensions [i.e., length (L), width (W), and thickness (T)], the distance between electrodes ($L_s$), electrical resistance (R), and electric voltage (V). The slab dimensions should be selected with consideration of actual concrete design and construction practices. The slab surface area (A) is the product of length L and width W. The distance between electrodes $L_s$ can be calculated by subtracting the distance between the slab edge and the embedded electrode (d) from the slab length L. Electrical resistance R can be calculated by multiplying Ls by the resistivity (ρ) of ECON material and dividing the product by the cross section parallel to the electrodes ($A_c$) By selecting the electric voltage V, the electric current (I) and the power density ($P_d$) can be calculated with other design parameter values previously selected. If the calculated $P_d$ value does not meet the power density requirement, then the selected design parameter values should be revised to meet the power density requirement and additional design criteria.

To better understand this design procedure, an example is presented. The design criteria for snow- and ice-melting performance in this example are similar to those of the small-scale prototype ECON heating slab. For the small-scale prototype ECON heating slab (1.22 m long×0.86 m wide×0.1 m thick), 880 W/m² of $P_d$ is required to melt 2.5 cm of snow in 35 min. The dimensions of the large-scale ECON heated slab are 4.6 m long×4.6 m wide×35.5 cm thick, which is close to that of concrete slabs used in airport pavement construction. This large-scale slab consists of two layers: a 10-cm-thick ECON top layer and a 25.5-cm-thick bottom layer of conventional concrete.

According to the flow chart in FIG. 11, the other design parameters (including $L_s$, R, and V) can be selected. If 40 cm is selected for d for two electrodes (i.e., 20 cm for each electrode), then $L_s$ is calculated as 4.2 m. By using 50 Ω-cm for ρ (from ECON materials used in the prototype ECON slab), $L_s$ equal to 4.2 m, and an $A_c$ of 0.46 m² (4.6-m-wide× 0.1-m-thick ECON layer), the R can be calculated as 4.6Ω. If 300 V is selected for V, then I and Pd are calculated as 65 A and 920 W/m², respectively, for the large-scale ECON heated slab. The calculated Pd value of 920 W/m² is higher than the 880 W/m² required to melt 2.5 cm of snow in 35 min. It implies that accepting the design parameters determined in this example will melt snow more quickly than the selected design criteria (i.e., 35 min). Of course, the design parameters determined in this example can be revised if additional design criteria are required for each design parameter. In such case, a finite-element (FE) analysis tool could be integrated into the developed design flow to predict snow/ice melting time, heating performances and the associated power density for each of ECON slab design options and determine ECON slab design optimization for the given design criteria.

The ECON HPS components include ECON as a conductive paving material (heating element), electrodes, temperature sensors, power supply, control unit, and PVC conduits and junction boxes. ECON for melting ice and snow on the surface can be placed in a thin concrete layer on top of a thicker PCC layer in the HPS structure to save on construction costs while providing adequate pavement structural capacity. For activation and deactivation of the ECON HPS system under certain conditions, temperature sensors installed in the ECON layer are used to sense predetermined set point temperatures for turning the system 'on' and 'off' through a control system. The detailed description of each of the ECON HPS components is provided in the following subsections.

Plain portland cement concrete (PCC): Standard Concrete Pavement or Slip Form Concrete Pavement.

Standard concrete pavement can be utilized as the bottom layer in ECON HPS. It may be reinforced or non-reinforced. The PCC should be selected based on the project specifications, reinforced according to the project-specific structural design, placed within fixed forms, and adequately consolidated and finish.

Slipform concrete paving can be utilized as bottom layer in ECON HPS. It may be reinforced or non-reinforced concrete of the class required by the project specifications. Reinforcing, if needed, should be conducted according to the structural design. The slip form paving concrete is placed, consolidated, and finished without the use of fixed forms.

ECON.

Electrically conductive concrete produced according to the mixture composition and procedures given above in Example 1.

Dowel Bars and Tie Bars.

These components should be designed and used according to the project specifications. In addition, the dowel bars and tie bars should be covered by a PCC layer (bottom layer) so that electrodes could be easily installed on top of the surface of the PCC layer.

PVC Conduits Installation.

This should be practiced according to lighting specifications enforced by the authorities in the project location. Examples include highway lighting or airfield lighting standards. PVC conduits should be used to protect and house the wires for electrodes and sensors. The electrical wires of the electrodes should be placed into separate conduits to prevent interference between sensor signals.

Electrodes.

Figures 12A, 12B, 12C:
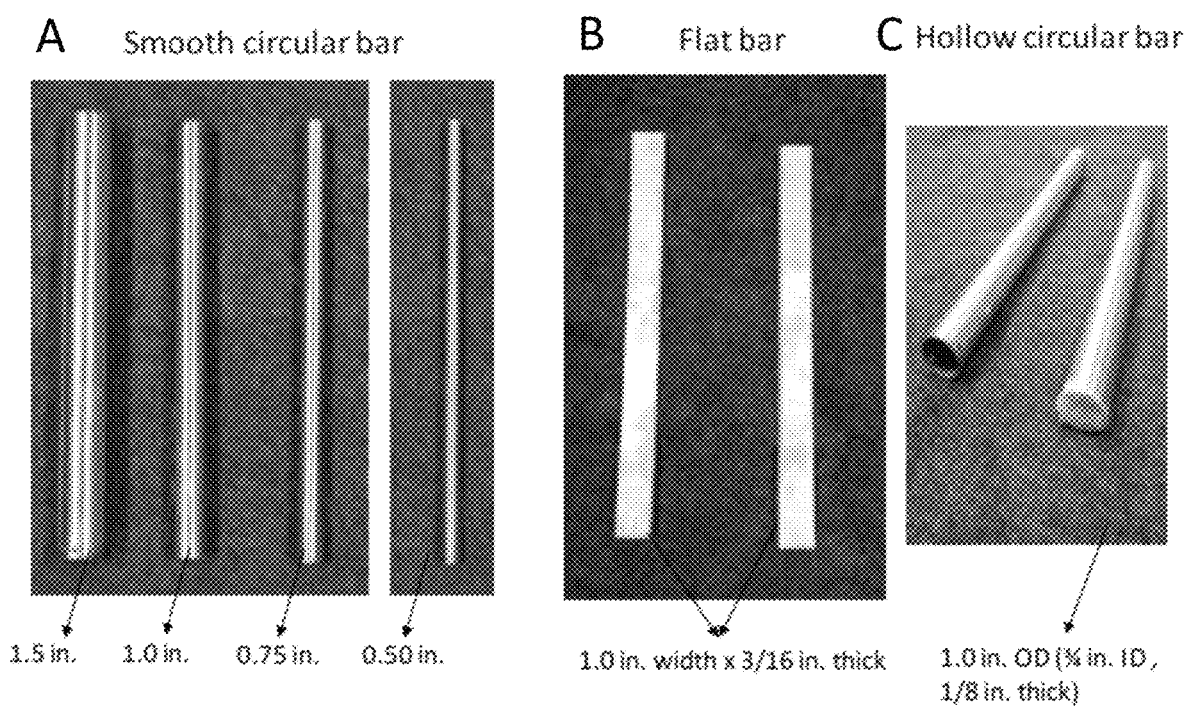
FIGS. 12A-12C show different types of electrodes proposed for application in the ECON layer.
Figure 13:
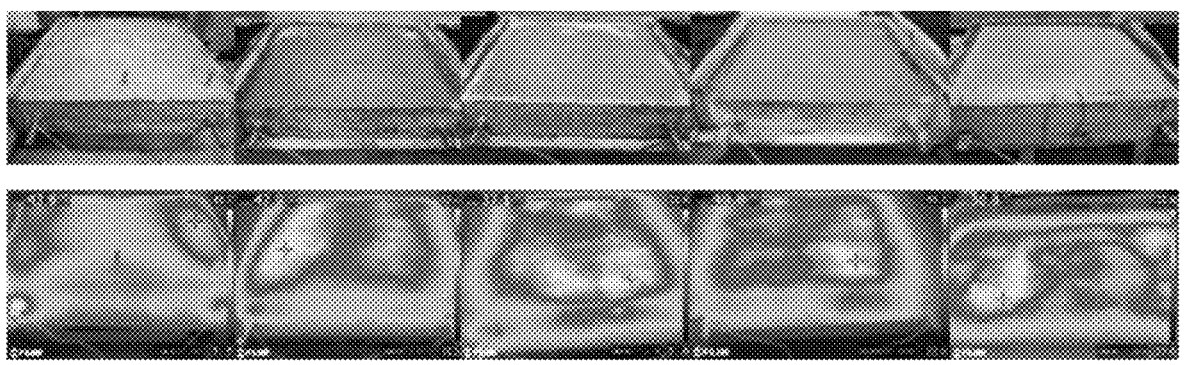
FIG. 13 compares heating performance of ECON with different electrode types.
Figure 14:
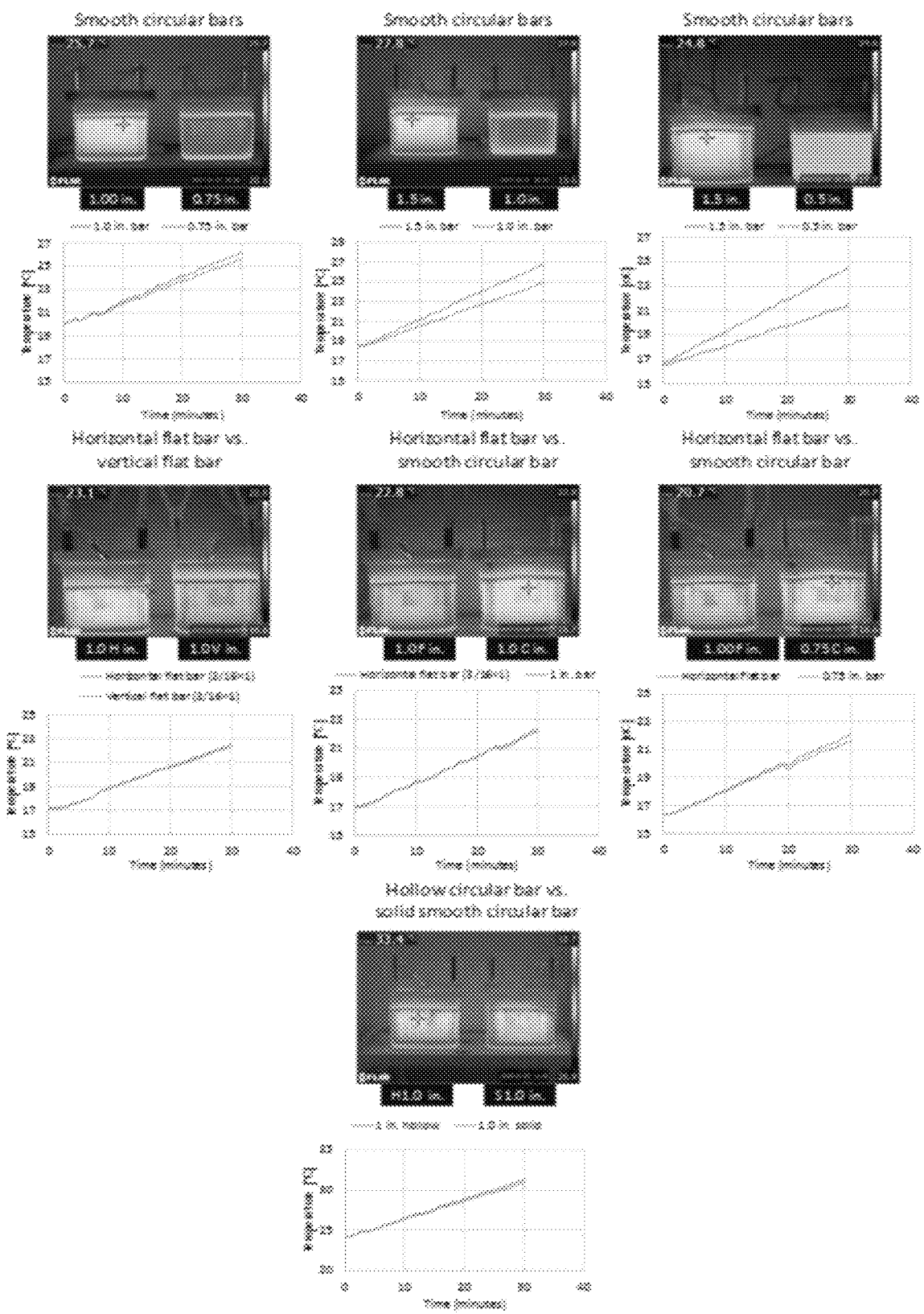
FIG. 14 is a comparison of the performance of different electrode types for heat generation application in electrolyte solution.
Figure 15:
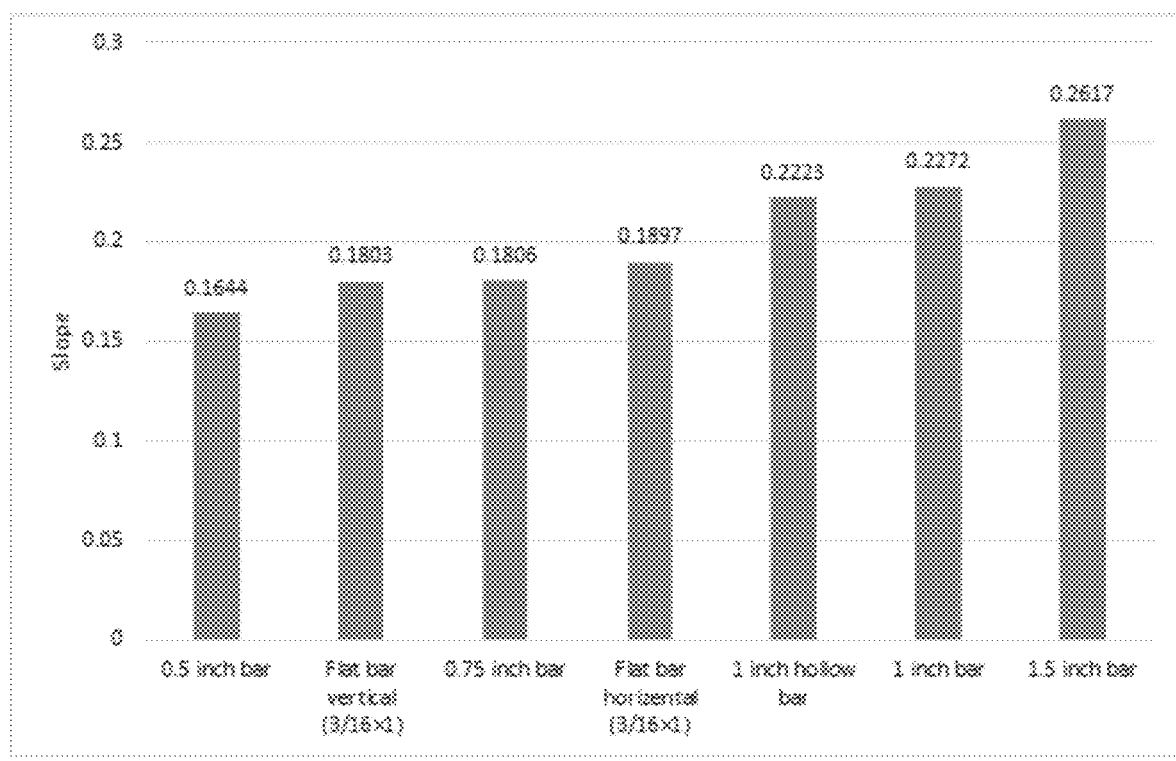
FIG. 15 shows the slope of temperature increase with time for different electrode types tested in electrolyte solution.

Stainless steel bar is recommended as an electrode since it is highly resistant to corrosion as well as it can allow ECON to contract and expand with less resistance and consequently would not cause any cracking potentials. Different types of stainless steel electrodes, as shown in FIGS. 12A-12C, can be used to apply electric power to the ECON layer. According to the results of electrode performance investigations shown in FIG. 13, FIG. 14, and FIG. 15, larger size of electrodes provide better heating performances.

Nylon materials could be used to anchor and fix the electrodes to prevent movement during the placement of the ECON layer, and it will also prevent current leakage into the ground because of its resistance to corrosion and insulating properties. The electrodes should be anchored to the PCC layer. After fixing the electrodes, electrical wires should be connected to the electrodes using gauge-ring wire connectors to provide power to the system. Spacers can be used to bring electrodes closer to the surface which will increase the efficiency of heat generation as shown in FIG. 16.

The electrode spacing of 3-6 ft. is proposed using experimental results and finite element modeling studies. The electrode spacing within the proposed range should be determined based on the ECON material properties, ECON thickness, slab size, the required amount of electric power, and the design current flow. The design current flow should be determined based on the amount of snow/ice to be melted and the associated power density requirements. The power density requirement (design load) can either be experimentally obtained or estimated using the steady-state energy balance equation for required pavement heat output that considers expected rate of snowfall, air temperature, relative humidity, wind speed, and dimensions as well as pavement material characteristics. A finite-element (FE) method can also be used as a tool for estimation of the required power density and the snow/ice melting time for ECON HPS.

Sensor System.

Sensor systems should be designed for measuring temperature and in the ECON HPS during operation for control purposes.

Electrical Connections for Electrodes.

This should be practiced according to the relevant electricity connection specifications in the project location.

Power Supply.

Appropriate power supply to provide 60 VAC for indoor and small-scale applications of ECON and 120-240 VAC for large scale pavement applications.

Control System.

The general set-up of the control system, used in conjunction with the temperature sensors, includes a relay placed between source and electrodes and a programmable logic controller (PLC) system.

Example 3—Construction Procedure

The proposed construction procedure, after the production of the ECON, is provided in five major steps in FIG. 17 through FIG. 21. The dimensions given in the figures are example dimensions. It should be mentioned that construction procedure can be altered according to the project-specific requirements and/or limitations. FIG. 10 provides a general overview of all steps involved in the ECON HPS construction procedure proposed by this application.

Example 4—Laboratory-Scale ECON HPS Demonstration

Figure 23:
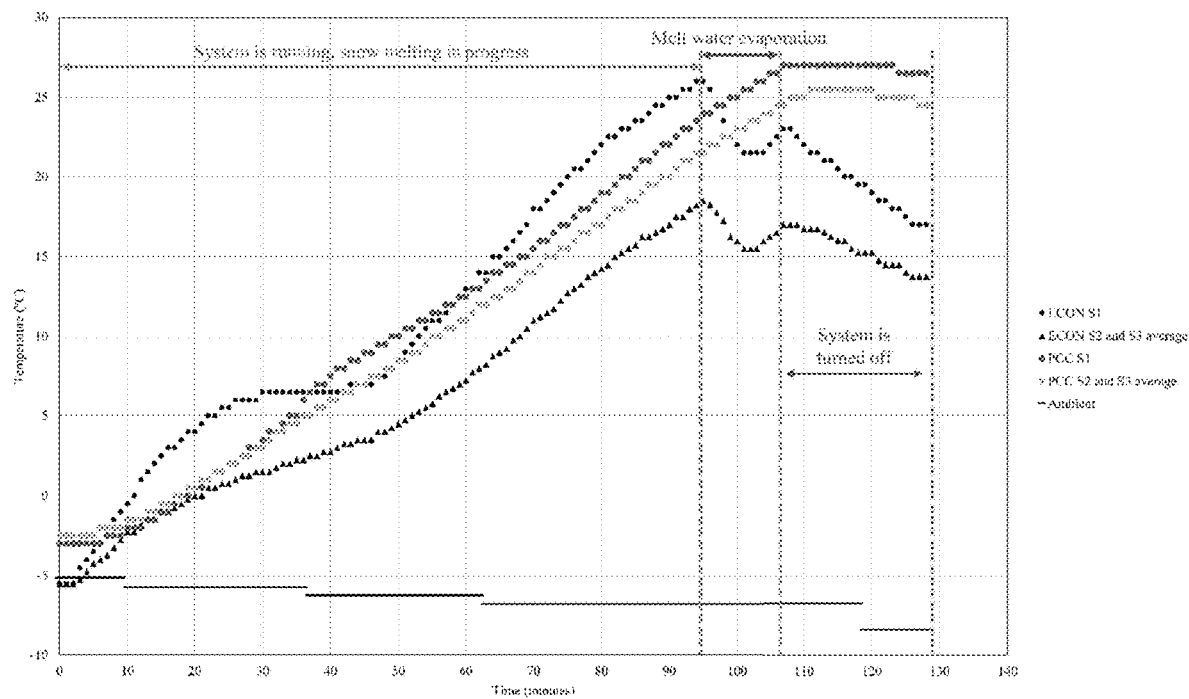
FIG. 23 shows a temperature profile of the ECON system during snow melting at 28-day age.
Figure 24:
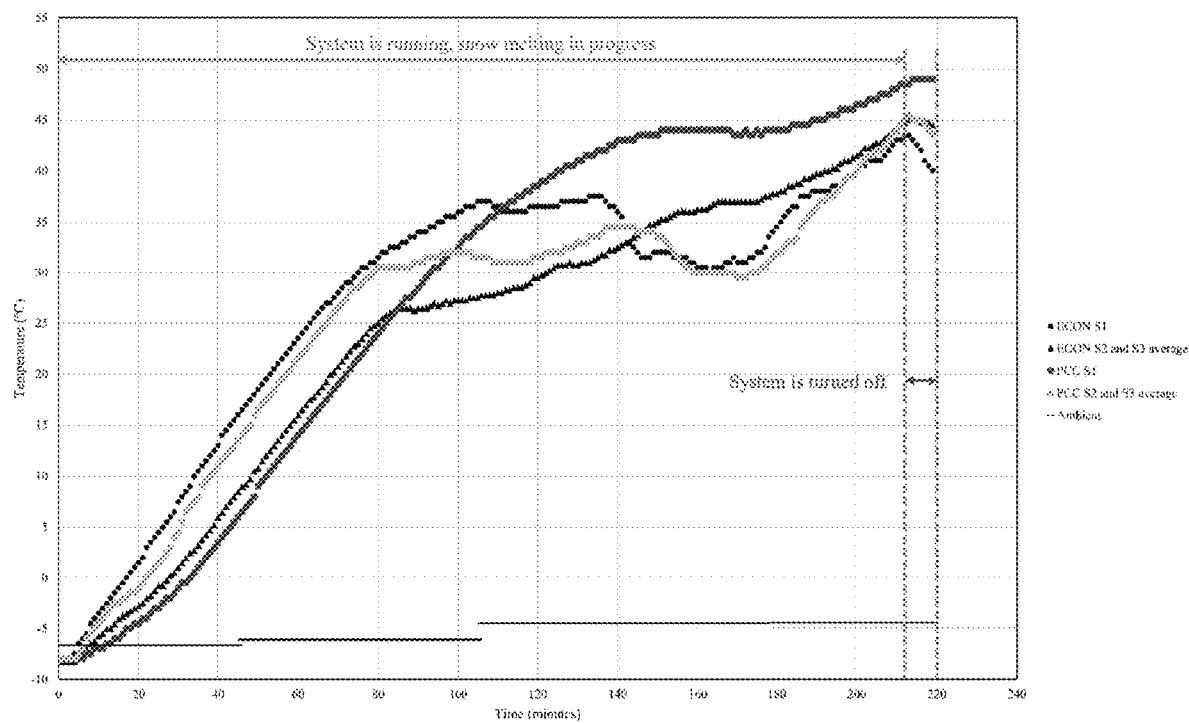
FIG. 24 illustrates a temperature profile of the ECON system during snow melting at 460-day age.
Figure 25A:
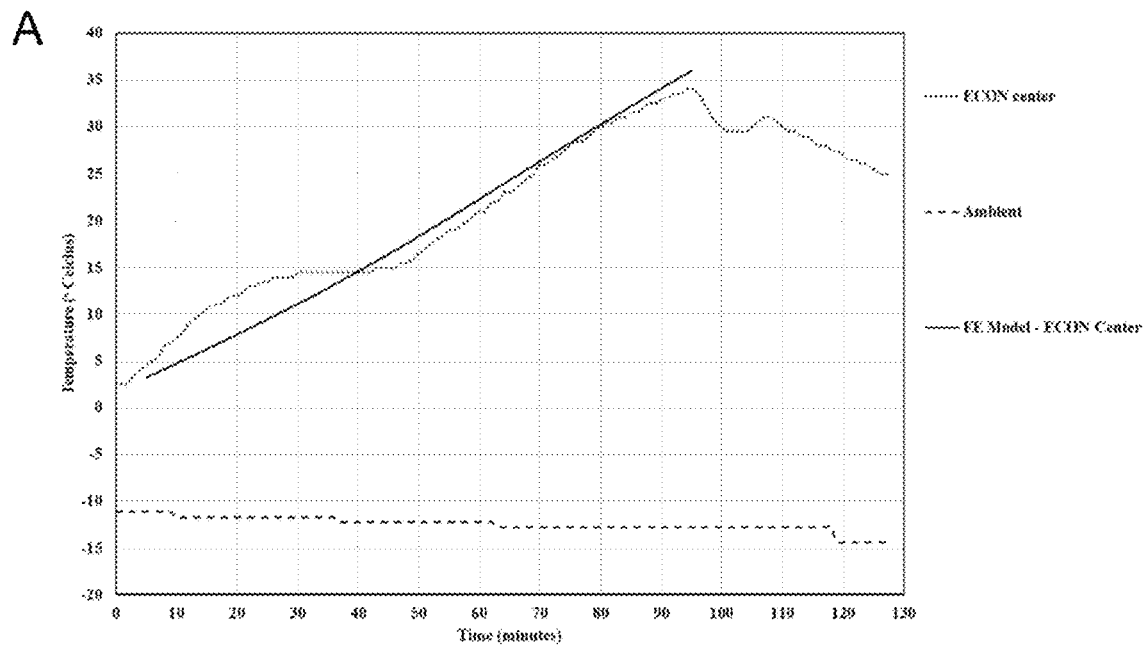
FIGS. 25A-25B show FE-Predicted and measured temperatures at the center of ECON layer at 28-day age (FIG. 25A) and temperature distribution in the slab cross section predicted by FE model (FIG. 25B).
Figure 25B:
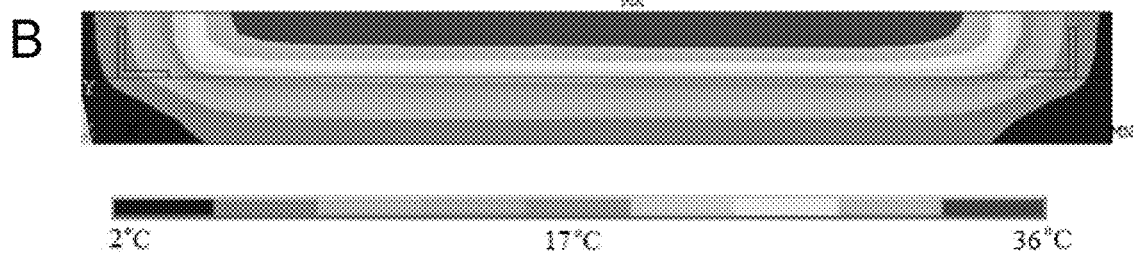

Using the mix design in Table 2, a prototype ECON HPS slab was built with system configurations of FIGS. 22A-22C and tested in different ages. Fiber dosage was based on the percolation threshold value. The slab was tested for snow melting performance in a temperature control chamber at two ages of 28 days and 460 days. The temperature profiles at the 28-day and 460-day ages are shown in FIG. 23 and FIG. 24, respectively. The voltage/current used in the experiment and energy consumption parameters at the two ages are given in Table 3. The FE model prediction for the performance of the slab at the age of 28 days is shown in FIGS. 25A-25B. The predicted versus measured time-temperature profile indicates that the system behavior using proposed material compositions and system design is fully predictable. This is a great advantage making the application of such systems reliable and controllable, while the design process is significantly facilitated because the performance of the designed system can be validated by computer modeling prior to construction.

TABLE 2

Mixture components and mixing proportions of the ECON used in production of laboratory-scale ECON HPS slab.

| Mix component | Volumetric fraction (% total volume of the mix) |
| --- | --- |
| Coarse aggregate | 40.04 |
| Fine aggregate | 31.49 |
| Cement | 9.28 |
| Fly ash | 2.92 |
| Water | 15.47 |
| Carbon fiber | 0.75 |
| Fiber-dispersive agent | 0.06 |

TABLE 3

Energy and power requirements for melting 6 cm-thick compacted snow layer.

| | Energy consumption | | | | Snow melting performance | | | | |
|---|---|---|---|---|---|---|---|---|---|
| Concrete age (days) | Voltage (V) | Current (A) | Power absorption (kW) | Power density (kW/m$_2$) | Snow melting duration (h) | Energy density for snow melting (kWh/m$_2$) | Input electrical energy (kJ) | Energy converted to heat (kJ) | Energy conversion efficiency in ECON (%) |
| 28 | 81.20 | 11.70 | 0.95 | 1.08 | 1.60 | 1.72 | 5472 | 3610 | 66 |
| 460 | 118.00 | 9.50 | 1.12 | 1.27 | 3.56 | 4.53 | 14367 | 7152 | 50 |

Example 5—Field Demonstration

Figure 26A:
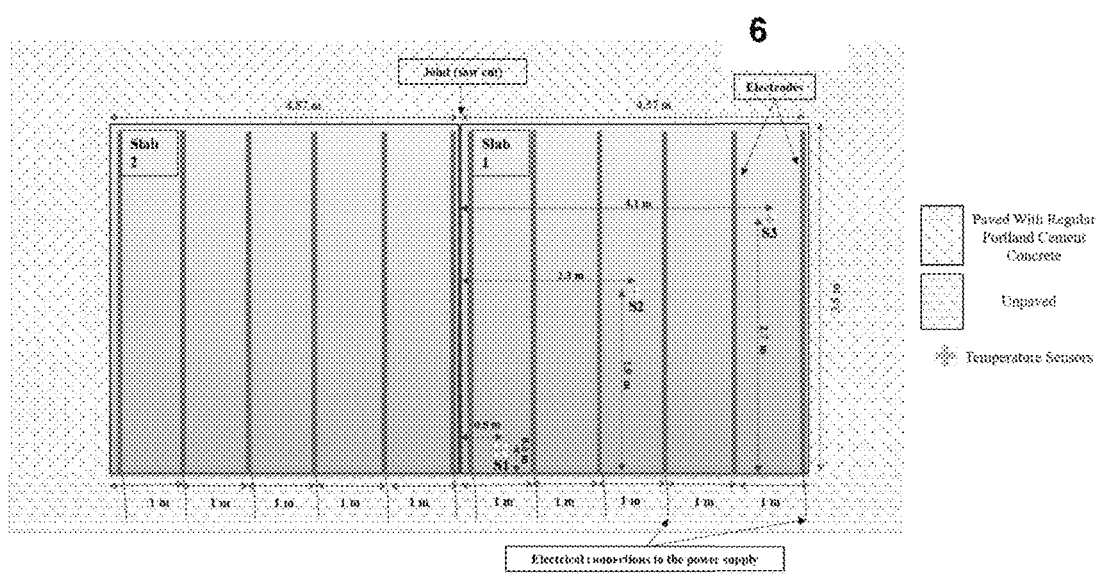
FIGS. 26A-26B show the system configuration and sensor locations for each slab.
Figure 26B:
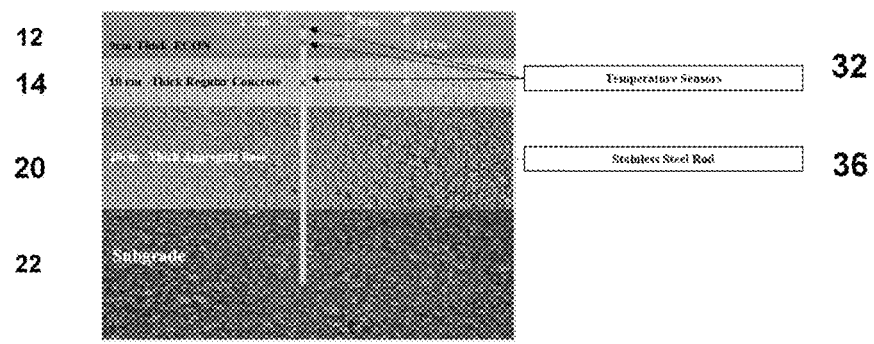
Figure 27A:
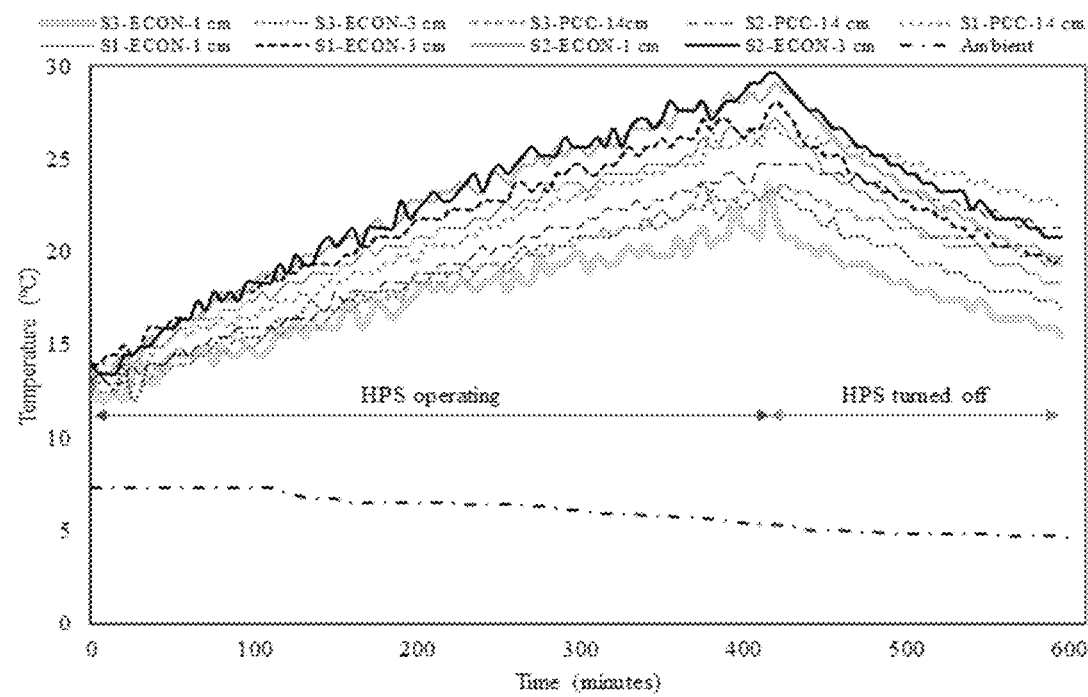
FIGS. 27A-27B show temperature (FIG. 27A) and current (FIG. 27B) profiles during the testing of the ECON slab.
Figure 27B:
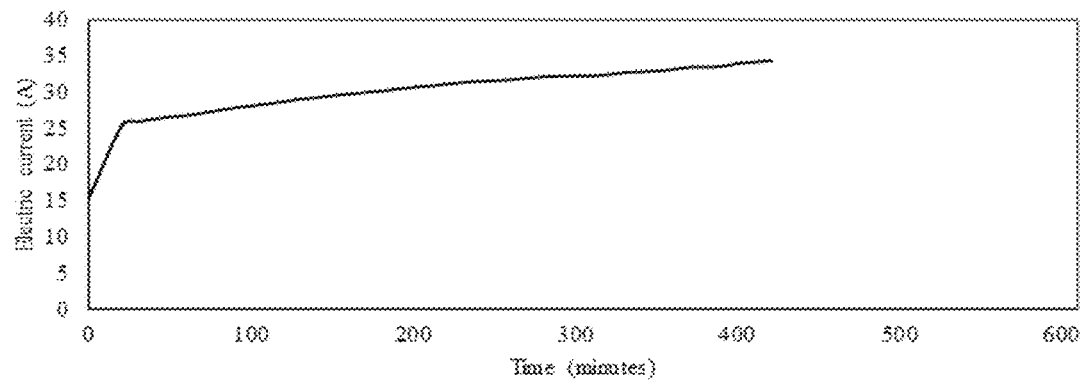

Two real size rigid pavement ECON HPS slabs were made in Des Moines International Airport (DSM) general aviation area using the mixture composition of Table 4 and the system configurations shown in FIGS. 26A-26B. This is believed to be the first implementation of ECON HPS in a U.S. airport and probably the first in the world. FIGS. 27A-27B shows the temperature and current profiles during a snow melting experiment. The energy consumption of slabs during snow melting at different ages and with different operation modes are given in Table 5. Anti-icing operation mode means that the system is turned on prior to the onset of the precipitation, and the deicing operation mode means that the system was turned on after the accumulation of snow on the surface. The material and system design proposed by this application is a predictable system that can be modelled by means of FE method with an acceptable degree of accuracy.

tion and visualization schematics to provide a clear understanding of its construction and operation. FIG. 28. illustrates ECON HPS construction with the precast concrete technique. A thin ECON slab 32 can be precast with a conventional concrete slab 34 to construct a large-scale ECON heated slab by two-lift approach. If needed, a thin ECON slab can be precast and placed on a newly constructed (or an existing) conventional concrete slab. An ECON mixture was developed with desirable electrical and mechanical properties for ant-icing and deicing applications. Abdualla et al., "System Requirements for Electrically Conductive Concrete Heated Pavements," *Transportation Research Record: Journal of the Transportation Research Board*, No. 2569, pp. 70-79 (2016) and Sassani et al., "Influence of Mix Design Variables on Engineering Properties of Carbon Fiber-Modified Electrically Conductive Concrete," *Construction and Building Materials* 152:168-181 (2017), which are hereby incorporated by reference in their entirety. Electrodes (6) carry electrical current into the

TABLE 4

Mixture composition of the ECON used in Des Moines International Airport demonstration.
Content (Kg/m3)

| Coarse aggregate (¾") | Intermediate aggregate (⅜") | Fine aggregate | Portland cement | Water | Carbon microfiber | Methyl cellulose | Calcium Nitrite 30% wt. solution | W/C | Carbon microfiber (% Vol.) |
|---|---|---|---|---|---|---|---|---|---|
| 594 | 296 | 673 | 475 | 200 | 18 | 1 | 25 | 0.42 | 0.75 |

TABLE 5

Snow melting performance of the slab at different ages.

| Age (days) | Average air temp. (° C.) | Wind speed (kmh) | Snow thickness (mm) | Average power density (W/m$^2$) | Operation time (hrs.) | Energy consumption (kWh/m$^2$) |
|---|---|---|---|---|---|---|
| 43[a] | −4 | 13 | 30 | 334 | 7.0 | 2.37 |
| 89[d] | −10 | 23 | 13 | 344 | 1.5 | 0.54 |
| 103[d] | −10 | 21 | 38 | 312 | 3.5 | 1.08 |
| 119[d] | −6 | 27 | 20 | 355 | 2.5 | 0.86 |
| 136[d] | −6 | 21 | 33 | 334 | 2.0 | 0.65 |

Note:
[a] denotes anti-icing experiment;
[d] denotes deicing experiment.

Example 6—ECON Precast Variant

Description of ECON Technology.

Two Conceptual designs for real, large-scale ECON HPS construction projects were developed with 3-D artist rendi- ECON, and heat is generated through resistive heating. Each ECON panel contains two electrodes in the edges to provide the electricity that will be converted to heat during ECON operation. The polyvinyl chloride conduit and junction box 36, designed to house and protect the electrical wire 8 and temperature sensors, can be embedded in the subgrade layer.

Construction Materials.

The overall components of the ECON comprise of conductive paving materials (heating elements), electrodes, a power supply, a control unit, and temperature sensors. An ECON mixture was developed with desirable electrical and mechanical properties for ant-icing and deicing applications. Sassani et al., "Influence of Mix Design Variables on Engineering Properties of Carbon Fiber-Modified Electrically Conductive Concrete," *Construction and Building Materials* 152:168-181 (2017), which is hereby incorporated by reference in its entirety.

System Design Criteria.

The selection of electrode spacing can be achieved using a design flow (Abdualla et al., "System Requirements for Electrically Conductive Concrete Heated Pavements," *Transportation Research Record: Journal of the Transportation Research Board*, No. 2569, pp. 70-79 (2016), which is hereby incorporated by reference in its entirety) that meets the design criteria, including the amount of snow/ice to be melted and the associated power density requirement. The power density requirement (design load) can either be experimentally obtained or estimated using the steady-state energy balance equation for required pavement heat output that considers expected rate of snowfall, air temperature, relative humidity, wind speed, and dimensions as well as pavement material characteristics. "ASHRAE Handbook—HVAC Applications American Society of Heating, Chapter 51—Snow Melting and Freeze Protection," American Society of Heating, Refrigeration and Air-Conditioning Engineer, Inc. (Atlanta, Ga.) pp. 51.1-51.20 (2015) and "Airside Use of Heated Pavement Systems," Advisory Circular 150/5370-17. Federal Aviation Administration, U.S. Department of Transportation (2011), which are hereby incorporated by reference in their entirety. A finite-element (FE) method can also be used as a tool for estimation of the required power density and the snow/ice melting time for ECON HPS. Abdualla et al., "Development of a Finite Element Model for Electrically Conductive Concrete Heated Pavements," Presented at 96th Annual Meeting of the Transportation Research Board (Washington, D.C.) (Jan. 8-12, 2017), which is hereby incorporated by reference in its entirety.

Power Supply and Control System.

The ECON HPS can be operated using either a 120V or a 210V power source, based on system design parameters such as electrode spacing and ECON materials properties. For activation and deactivation of the ECON system under certain conditions, temperature sensors installed in the ECON layer are used to sense predetermined set-point temperatures for turning the system 'on' and 'off' should be defined.

Figure 29:
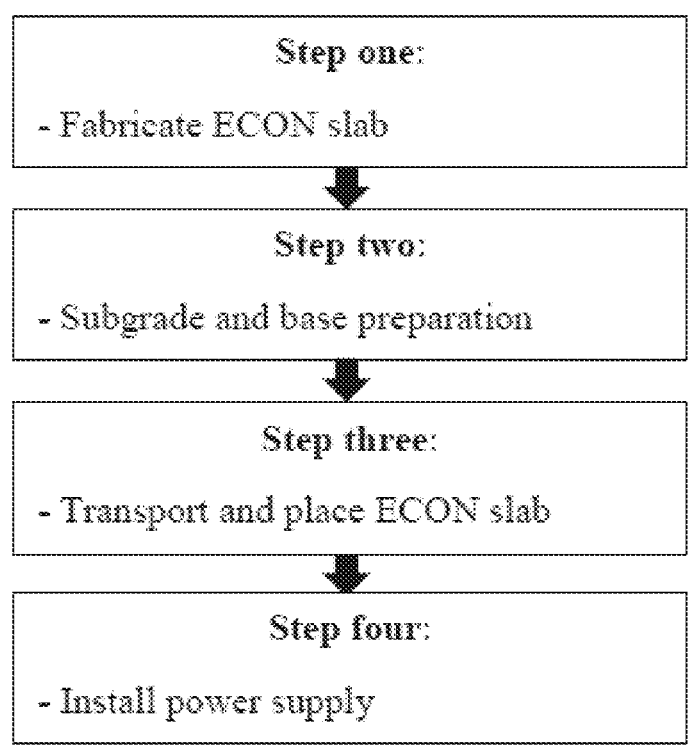
FIG. 29 shows the work sequence of precast heated concrete panel using ECON.

Example 7—Construction Procedures of Precast Heated Concrete Panel Using ECON Technology The work sequence required for constructing precast heated concrete panel using ECON is presented in FIG. 29. The major difference between the construction of precast heated concrete panel using ECON and that of a typical precast concrete installation is that precast heated concrete panel using ECON requires electrodes embedded in the ECON layer to allow current to pass through the ECON layer and thereby release heat that warms the paved surfaces and melts ice and snow. The construction sequence for ECON HPS using precast concrete involves the following four major steps as described in FIG. 29.

Figures 30A, 30B, 30C, 30D, 30E:
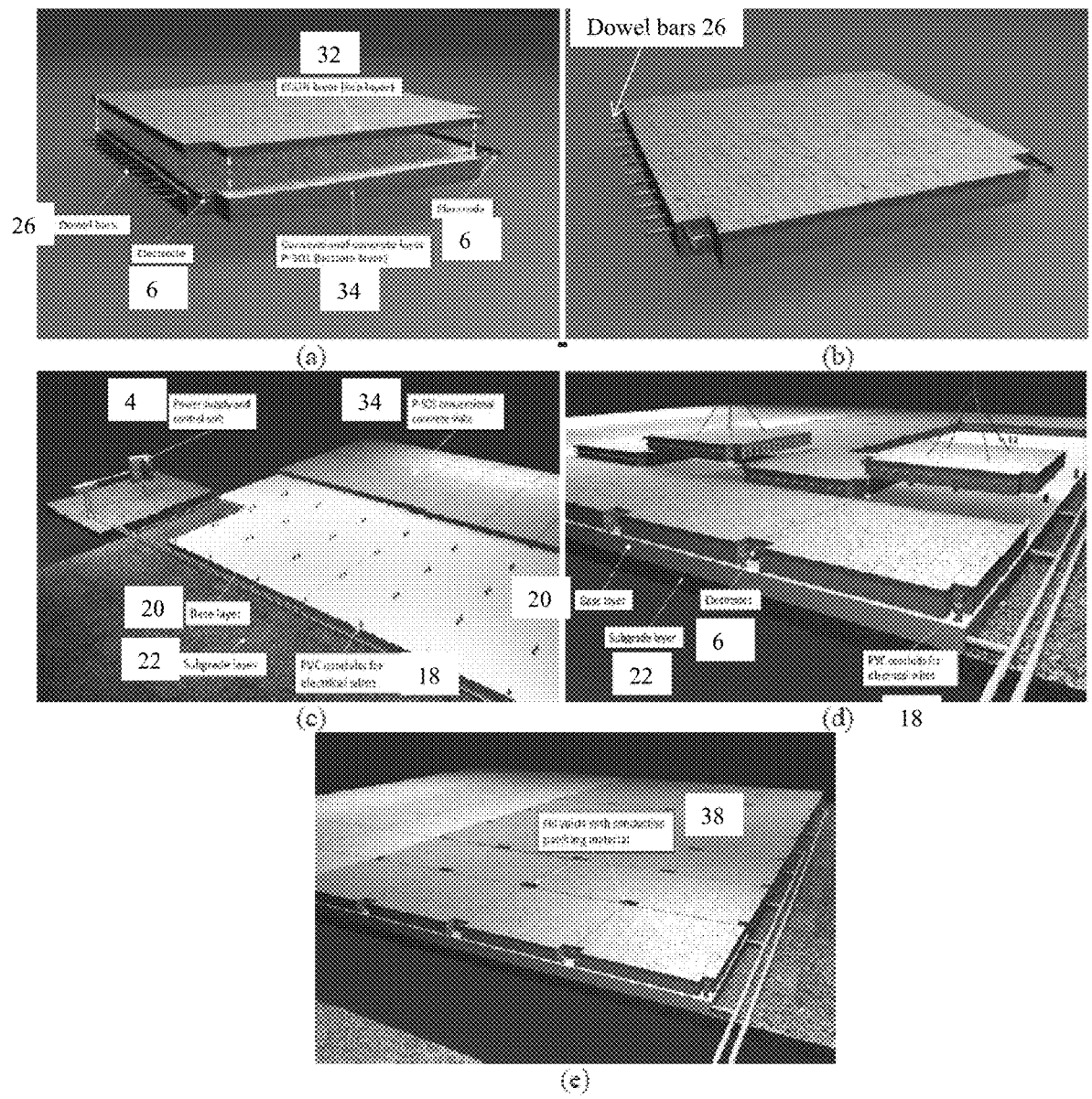
FIGS. 30A-30E show 3D renderings on construction steps of precast heated concrete panel using ECON: preparation of precast ECON panel (FIG. 30A), fabricated precast ECON panel (FIG. 30B), preparing the base layer and installing PVC conduits and junction box (FIG. 30C), place precast ECON panels and connect electrical wires to the electrode systems (FIG. 30D), and fill voids with conductive patching materials (FIG. 30E).

In Step 1, ECON slab 32 is fabricated off-site. The ECON slab 32 can be fabricated using off-site construction as shown in FIG. 30A and FIG. 30B. The slab containing ECON layer 32 may be placed above a slab containing conventional concrete (i.e., bottom layer) 34. The precast construction may further include a plurality of dowel bars 26 beneath the conventional concrete slab (i.e., lower layer) 34. Moreover, electrodes 6 and electrical wires 8 may be placed directly above the conventional concrete layer 34. The ECON layer is generally 5 to 10 centimeters in thickness to reduce ECON slab construction costs and to primarily heat only the top ECON surface.

In Step 2, the base layer 20 is prepared and PVC conduits 18 are installed. The subgrade layer 22 and base layer 20 are prepared and compacted to meet the required density and install PVC conduits 18 and junction box 36 to accommodate the electrical wires 8 for the electrode system (see FIG. 30C). The installation of PVC conduits 18 can be accomplished after preparing the base layer 20. Trenching should be provided for installation of PVC conduits 18 whose positions should align with electrodes 6 so that wires 8 can be connected to the electrodes 6. An alternative option for installing the PVC would be that the PVC could be placed at the bottom of the base layer 20 while sitting on top of the subgrade layer 22; this option is used for in-pavement lighting conduit.

In Step 3, the precast heated concrete panel using ECON is placed. The precast ECON panels are transferred into the construction site and placed on the prepared base layer 20. The precast ECON panel has dowel bars 26 and slots like those in a traditional precast panel to transfer mechanical loads. The ECON slab includes two electrodes 6 embedded in ECON layer 32 to provide connections to electrical wires 8 after placing the ECON panel. The exposed electrodes at the edges (FIG. 30D) of the ECON panels should be placed above the PVC conduits 18 so that such electrical connections can be made.

In Step 4, the power supply and the control unit 4 are installed. The power supply system can be specified based on the designed energy density sufficient to heat the ECON surface to prevent ice and snow accumulation. All electrical wires should be connected to the electrode system and tested before filling voids above the exposed electrodes (FIG. 30E), after which the voids can be filled with conductive patching concrete 38. The voids of the dowel slots may be filled with grout as in traditional precast panels. The grout can be pumped through a dowel grout port and a bedding grout port. Mallick et al., "Harvesting Heat Energy from Asphalt Pavements: Development of and Comparison Between Numerical Models and Experiment," *International Journal of Sustainable Engineering* 5 (2):159-169 (2012), which is hereby incorporated by reference in its entirety.

Although preferred embodiments have been depicted and described in detail herein, it will be apparent to those skilled in the relevant art that various modifications, additions, substitutions, and the like can be made without departing from the spirit of the application and these are therefore considered to be within the scope of the application as defined in the claims which follow.

What is claimed:

1. A concrete pre-mix composition comprising:
   a cementitious material;
   a plurality of conductive carbon microfibers mixed with said cementitious material, wherein said conductive carbon microfibers are present in the concrete pre-mix composition in an amount such that, when said concrete pre-mix composition is hydrated to form concrete and cured, the conductive carbon microfibers are dispersed in the cured concrete in an amount of 0.75% to 2.00% of total mass of the concrete, and wherein the conductive carbon microfibers have an aspect ratio of length (l)/diameter (d) between 400 and 1,800; and
   an additive selected from the group consisting of a conductivity-enhancing additive, a viscosity-modifying additive, and an air-entraining additive, wherein the additive comprises calcium nitrite, aqueous solutions of the compounds of Alkali and Alkali Earth metals, or a combination thereof.

2. The concrete pre-mix composition of claim 1 further comprising:
   a fiber-dispersive agent.

3. The concrete pre-mix composition of claim 2, wherein the fiber-dispersive agent is selected from the group consisting of methyl cellulose, carboxymethyl cellulose, ethyl cellulose, ethyl methyl cellulose, hydroxypropyl cellulose, silica fume, latex, acrylic, and combinations thereof.

4. The concrete pre-mix composition of claim 2, wherein the fiber-dispersive agent is present in an amount less than 0.5% by mass of the composition.

5. A concrete composition comprising:
the composition of claim 1 and
water in an amount sufficient to form concrete.

6. A method of producing an electrically conductive concrete composition comprising:
providing the concrete composition of claim 5;
forming the concrete composition into a desired shape; and
curing the formed concrete composition.

7. The method of claim 6 further comprising:
providing a fiber-dispersive agent and
mixing the fiber-dispersive agent with the concrete composition before said forming.

8. The concrete pre-mix composition of claim 1, wherein the cementitious material is selected from the group consisting of portland cement, synthetic and by-product supplementary cementitious materials, natural pozzolans, and combinations thereof.

9. The concrete pre-mix composition of claim 1, wherein the conductive carbon microfibers comprise a polyacrylonitrile (PAN)-based carbon microfiber, a Pitch-based virgin carbon microfiber, a recycled carbon microfiber, or a combination thereof.

10. The concrete pre-mix composition of claim 1, wherein the conductive carbon microfibers are between 3 and 15 mm in length.

* * * * *